United States Patent
Bitterly et al.

(10) Patent No.: US 11,465,918 B2
(45) Date of Patent: Oct. 11, 2022

(54) WATER PURIFICATION SYSTEM AND PROCESS

(71) Applicant: Steve Bitterly, Canoga Park, CA (US)

(72) Inventors: Steve Bitterly, Canoga Park, CA (US); Jack Bitterly, Woodland Hills, CA (US)

( * ) Notice: Subject to any disclaimer, the term of this patent is extended or adjusted under 35 U.S.C. 154(b) by 0 days.

(21) Appl. No.: 16/979,148

(22) PCT Filed: Mar. 6, 2019

(86) PCT No.: PCT/US2019/021043
§ 371 (c)(1),
(2) Date: Sep. 8, 2020

(87) PCT Pub. No.: WO2019/173535
PCT Pub. Date: Sep. 12, 2019

(65) Prior Publication Data
US 2020/0399143 A1 Dec. 24, 2020

Related U.S. Application Data

(60) Provisional application No. 62/639,399, filed on Mar. 6, 2018.

(51) Int. Cl.
*C02F 1/04* (2006.01)
*B01D 1/22* (2006.01)
(Continued)

(52) U.S. Cl.
CPC .............. *C02F 1/048* (2013.01); *B01D 1/225* (2013.01); *B01D 1/289* (2013.01); *B01D 1/2887* (2013.01);
(Continued)

(58) Field of Classification Search
CPC .... C02F 1/048; C02F 1/06; C02F 1/08; C02F 2201/004; C02F 2301/063; C02F 2303/10;
(Continued)

(56) References Cited

U.S. PATENT DOCUMENTS

| | | |
|---|---|---|
| 3,136,707 A | 6/1964 | Hickman |
| 3,190,817 A | 6/1965 | Neugebauer et al. |

(Continued)

FOREIGN PATENT DOCUMENTS

| | | |
|---|---|---|
| CN | 1642608 A | 7/2005 |
| CN | 103180022 | 6/2013 |

(Continued)

OTHER PUBLICATIONS

International Search Report and Written Opinion for PCT Application No. PCT/ US19/21043, dated May 31, 2019. 18 pages.

(Continued)

*Primary Examiner* — Jonathan Miller
(74) *Attorney, Agent, or Firm* — SoCAL IP Law Group LLP; Michael D. Harris

(57) ABSTRACT

A small processor produces potable water from contaminated water. Its components mount in a hermetically sealed housing, which include a boiler-condenser assembly and a compressor unit. Contaminated water is injected onto one or more aluminum shells' inside surface of the boiler-condenser assembly. Shell rotation enhances boiling heat transfer by causing the water to form thin films on the shells' inside surface. Shell rotation also enhances condensing heat transfer by assisting in removing the purified condensate from the shells' outer surface. The change of phase heat of condensation energy from vapor to liquid transfers through the shells to the boilers to cause boiling. Vapor boiled inside the boiler chambers flows toward the compressor, which (Continued)

raises the vapor's pressure and temperature to drive the process. Shell rotation causes centrifugal force that holds and directs concentrated un-boiled remaining water on the shells' inside walls towards the output pumps. Wipers mounted adjacent each shell's boiler surface smooth contaminated water. Wipers adjacent the condenser surfaces help remove condensate from that surface to present a clean condenser for improved condensation.

30 Claims, 39 Drawing Sheets

(51) Int. Cl.
    *B01D 1/28*     (2006.01)
    *B01D 5/00*     (2006.01)
    *C02F 1/06*     (2006.01)
    *C02F 1/08*     (2006.01)

(52) U.S. Cl.
    CPC ........... *B01D 5/006* (2013.01); *B01D 5/0024* (2013.01); *B01D 5/0075* (2013.01); *C02F 1/06* (2013.01); *C02F 1/08* (2013.01); *C02F 2201/004* (2013.01); *C02F 2301/063* (2013.01); *C02F 2303/10* (2013.01)

(58) Field of Classification Search
    CPC ...... B01D 1/225; B01D 1/2887; B01D 1/289; B01D 5/0024; B01D 5/006; B01D 5/0075
    See application file for complete search history.

(56) References Cited

U.S. PATENT DOCUMENTS

| | | | |
|---|---|---|---|
| 3,274,076 A | 9/1966 | Watt | |
| 4,030,897 A * | 6/1977 | Pelzer | B01D 19/0052 95/249 |
| 4,455,135 A * | 6/1984 | Bitterly | B01J 3/006 208/400 |
| 4,863,567 A * | 9/1989 | Raley | B01D 1/0017 202/182 |
| 6,238,524 B1 * | 5/2001 | Zebuhr | B01D 1/223 159/18 |
| 6,261,419 B1 * | 7/2001 | Zebuhr | B01D 1/223 159/18 |
| 6,695,951 B1 * | 2/2004 | Bitterly | B01D 1/222 202/182 |
| 6,846,387 B1 * | 1/2005 | Zebuhr | B01D 1/222 159/15 |
| 6,908,533 B2 | 6/2005 | Zebuhr | |
| 7,427,336 B2 * | 9/2008 | Zebuhr | B01D 1/223 159/28.6 |
| 7,610,768 B2 | 3/2009 | Lubman et al. | |
| 7,540,944 B2 * | 6/2009 | Bitterly | B01D 1/222 203/22 |
| 8,858,758 B2 * | 10/2014 | Zebuhr | B01D 5/009 159/6.2 |
| 9,770,676 B2 * | 9/2017 | Zebuhr | B01D 1/227 |
| 2005/0045466 A1 | 3/2005 | Bitterly et al. | |
| 2005/0279620 A1 * | 12/2005 | Zebuhr | F28D 9/0018 202/182 |
| 2007/0102276 A1 | 5/2007 | Lubman et al. | |
| 2007/0170049 A1 | 7/2007 | Mansur | |
| 2012/0037488 A1 * | 2/2012 | Zebuhr | B01D 1/227 203/4 |
| 2013/0118714 A1 * | 5/2013 | Kaminski | F28D 7/103 165/104.19 |
| 2015/0075967 A1 | 3/2015 | Zebuhr | |
| 2016/0075967 A1 | 3/2016 | Gao et al. | |
| 2017/0348611 A1 * | 12/2017 | Zebuhr | C02F 1/08 |

FOREIGN PATENT DOCUMENTS

| | | |
|---|---|---|
| CN | 203296917 U | 11/2013 |
| CN | 104069645 A | 10/2014 |
| CN | 106422380 A | 2/2017 |
| CN | 112105429 A | 12/2020 |
| JP | 06241184 A | 8/1994 |
| RU | 2357809 C2 | 6/2009 |
| WO | 2012012397 A2 | 1/2012 |
| WO | 2014152448 | 9/2014 |
| WO | 2019173535 A1 | 9/2019 |

OTHER PUBLICATIONS

European Patent Office, Extended European Search Report for EP 19763851.3, dated Nov. 9, 2021, 10 total pages.
Intellectual Property Office of Singapore, Examiner's Written Opinion for 11202008605Q, dated Aug. 20, 2021, 8 total pages.
Intellectual Property Office of India, Examination Report for 202017039963, dated Dec. 29, 2020, 5 total pages.
Patent Cooperation Treaty, International Preliminary Report and Written Opinion for PCT/US2019/021043, dated Sep. 17, 2020, 12 total pages.
State Intellectual Property Office of People's Republic of China, First Office Action and Search Report for 201980027242.0, dated Dec. 23, 2021, 32 total pages.
Lustenader, E.L., et al., "The Use of Thin Films for Increasing Evaporation and Condensation Rates in Process Equipment," Nov. 1959, 297-307 pages, vol. 81, Journal of Heat Transfer.
Tleimat, B., "Rotary Evaporators," Jul. 26, 2006, 14 pages, Encyclopedia of Desalination and Water Resources, Eolss Publishers.
ROSPATENT The Federal Institute for Industrial Property of the Federal Service for Intellectual Property, Patents and Trademarks, Office Action for RU 2020132675/05(059500), dated Jun. 2, 2022, 19 total pages.
The Patent Office of the People's Republic of China, Office Action for CN 201980027242.0, dated Aug. 5, 2022, 16 total pages.

\* cited by examiner

WATER PURIFICATION SYSTEM AND PROCESS

RELATED APPLICATION

This application claims priority to International patent application No.: PCT/US19/21043, filed Mar. 6, 2019, titled WATER PURIFICATION SYSTEM AND PROCESS. Which claims priority to provisional application No. 62/639,399, filed Mar. 6, 2018, titled "Water Purification System and Process."

BACKGROUND

1. Field

Low cost and efficient, water purification system and process treats effluent or other contaminated water and other liquids and desalinates saltwater.

2. State of the Art

Applicants' U.S. Pat. No. 6,695,951 (2004) describes prior art water purification systems including those using distillation and reverse osmosis (RO). The patent also discusses the high energy and capital costs for systems that predate the '951 patent. Applicants incorporate those discussions and the rest of the '951 patent by reference.

The United Nations suggests 20 to 50 liters of water per person daily satisfies basic needs for drinking, cooking and cleaning. A United Nations report suggests at least 1.8 billion people use fecal-contaminated drinking water sources. Nearly 6,000 children die daily due to preventable water and sanitation-related diseases. Though the proportion of the global population with better drinking water sources increased from 76% to over 90% in the last 15 years, water scarcity still affects millions.

Applicants '951 patent teaches a system for generating safe drinking water from effluent or other contaminated water and saltwater. The patent's system relies on, but is not limited to, low-pressure, low-temperature boiling from a rotating, thin boiler-condenser shell. Rotation takes advantage of "centrifugal" forces, i.e., the apparent outward forces that urge rotating bodies away from the center of rotation. The rotational forces thin the fluid layer and enhance heat transfer. The system can boil water with less heat energy expenditure than conventional systems expend due to increased thermodynamic heat transfer. The system centrifugally assists condensate removal from the condenser, which also improves condensing.

Operating at the low temperature also maintains contaminants below temperatures that could cause adverse chemical reactions. The reactions form scale buildup that diminishes the boiler heat-transfer coefficient. The low temperature operation also prevents contaminants from turning into vapor and migrating with the boiled water vapor toward the condenser. The centrifugal forces also aid in preventing dissolved and suspended contaminants from migrating with the water vapor towards the condenser because these centrifugal forces keep contaminants in the waste stream and direct them along the boiler surface where they exit the processor as part of the wastewater output.

The systems described in applicants' earlier patent are complex. Their capital costs may be less than conventional distillation or RO systems, but each unit may be costly relative to the wealth of persons or groups of persons in developing countries. Government and NGO funds also may be inadequate to support these systems' use throughout developing countries.

Larger systems designed to provide clean water for many persons also might require infrastructure to distribute the water. If the system were at a site with access to electricity to run it, the system's owner would need pumps, valves, water mains, pipes and other components to distribute water to houses, apartments, businesses, government offices, hospitals, schools or communal outlets. Centralized systems also are subject to political control and can be targets for terrorists, criminals and political opponents. Persons or families could use smaller, less complex devices to purify water for themselves without depending on larger systems tied into centralized water distribution systems.

The '951 patent has subsystems and jet-spray nozzles that clean the boiler walls automatically. Designing the system so individual users could take apart their units and clean or replace components quickly and return them to operation without a long downtime may avoid the need for the '951 patent's cleaning system. Even if the owners of system would not work on their own system, it is likely that at least one person in the surrounding area could repair it. Some of the '951 patent's other subsystems also may be unnecessary in smaller, individually owned devices.

The '951 patent's thin boiler-condenser walls provided high efficiency but may be costly to machine or form. The earlier patent's system has concentric walls, which can provide a greater output in the same space. That design also allows an array of units to occupy less area for the same clean water output. Space occupied by each new unit may be less critical because persons usually have enough space for small units where they live or work.

Using a thin boiler-condenser wall thickness with metals with high heat conductivity is important. The wall thickness may be 0.004 in. to 0.015 in. ($\approx$0.10 mm to 0.38 mm) (unit conversions are approximations). Thicker walls are possible, but they increase material cost and impede conductive heat transfer. The heat conductivity for steel, a typical, conventional boiler wall, is about 25 BTU/(ft.xhr.x° F.) (43 W/m ° C.). That for aluminum is over five times higher, 136 Btu/(ft.xhr.x° F.) (235 W/m ° C.). Those figures are approximate because heat conductivity varies with temperature and alloying materials. Aluminum can be anodized to form a microscopic ($\approx$6.35×10$^{-6}$ mm) protective oxide film. The film prevents uncontrolled corrosion and oxidation, which decreases conductivity. Copper's heat conductivity is about twice that of aluminum, but aluminum is less costly (normally about ¼ of copper's price), is more available, lighter and may be easier to form.

Draining excess fluid and contaminants when the processor is off may be helpful. It can avoid contaminants from drying on the boiler-condenser walls or from having algae or fungi grow inside the processor. Circulating warm air or subjecting the processor to vacuum also enhances drying.

The system can use ordinary AC electrical power, but its low power needs may allow it to use solar-generated DC power, a 12 V DC vehicle battery or other sources of electricity.

Conventional processes used to make aluminum beverage cans (without a top or bottom) could form the boiler-condenser wall. United States companies manufacture about 100 billion (1×10$^{11}$) aluminum beverage cans yearly.

Applicants' systems can use thin-walled aluminum cylinders formed by impact extrusion. That process uses aluminum disks or slugs, which mount in a closed, cylindrical die. For can manufacturing, the aluminum usually is alloyed with small percentages of magnesium and manganese. A punch impacts the slug, which causes the aluminum to flow around the punch and form the cylindrical can. Additional processing finishes the can.

Other processes also fabricate aluminum cans. A cupping press cuts circular discs from sheet aluminum as shallow cups. The cups are drawn up into higher cups through a series of rings. When the cups reach their nominal height, the tops are cut off, so the cups are the same height. Again, additional processing finishes the can.

Twelve-ounce (355 ml) aluminum soft drink and beer cans with a 0.004 in. (0.10 mm) thick wall are standard in North America. The typical can's diameter is about 2.6 in. (6.6 cm). Standard European beverage cans are smaller and hold 330 ml (11.2 oz.). Different sized aluminum beverage cans exist, however. Brewers also sell beer in 16 oz. (473 ml), 24 oz. (710 ml) and 25 oz. (740 ml), but some so-called "energy drinks" use small, 250 ml (8.5 oz.) cans. Other sizes may be used, especially outside North America. Using larger size cans (height and diameter) for this process can deliver greater throughput.

Because cans are inexpensive, the boiler-condenser wall in a small water purification system could be an aluminum beverage can (without tops or bottoms). Their use could lower system fabrication costs because cans are so readily available.

Standard extrusion processes (i.e., forcing aluminum through a series of dies) also can create thin-walled aluminum cylinders for applicants' system. Using this process eliminates the need to cut off the bottom that forms during impact extrusion, but applicants' system and process could use "used" cans with their top and bottom cut off. Using some of the billions of cans created annually may be advantageous because they can be ready sources of inexpensive, thin-walled, aluminum cylinders. But aluminum cans are the most recycled consumer product with an average can containing 70% recycled metal. It may be advantageous to recycle cans and use recycled or new aluminum to make the walls for applicants' system.

Another possible method for constructing cylindrical shells of chosen diameter and length is to use thin sheet aluminum, 0.004 in. to 0.015 in. ($\approx$0.10 mm to 0.38 mm) thick, rolled around specific cylindrical molds. They may be spot-welded or glued together with a slight shell over-lap at the seam.

Whatever method makes the aluminum cylinders, forming new cylinders with proper diameters and heights probably is better than relying on used aluminum beverage cans. Multiplecylinder systems require cylinders of different diameters. Those systems may require cylinders made specifically for applicants' system.

Outside air pressure, acting on a vacuum container is 14.7 psia (101 kPa) at sea level. The wall thickness required to resist the crushing force acting inward on the walls increases disproportionately with the vacuum container's diameter. If the total volume under vacuum is small due to a container's relatively small diameter, the vacuum chamber's outer wall can be thinner and use lighter-weight materials without collapsing under outside air pressure. Using a ribbed housing also could reduce wall thickness. This smaller system may offer advantages over the system that the '951 patent teaches.

As the '951 patent teaches, minimizing the fluid thickness against the boiler surface significantly improves heat transfer to the fluid. By rotating the boiler wall fast enough, centripetal "g" loads cause the fluid to form a thin, almost uniform film, for example between about 0.001 in. and 0.002 in. (0.025 mm to 0.051 mm) against the boiler shell's surface.

SUMMARY

References to "contaminated water" mean water or other liquid—the application uses "water" and "liquid" interchangeably—having undesirable components. Saltwater is contaminated because the salt prevents people from drinking the water.

Applicants' small, low-cost processor converts saltwater, effluent or other contaminated water into potable water. The processer has two major subsystems, a boiler-condenser unit and a compressor unit. Both operate under low pressure of about 0.5 psia ($\approx$3.5 kPa or 1.0 in-Hg) at a commensurate 80° F. ($\approx$26.7° C.) inlet water temperature. Different inlet water temperatures cause different operating pressures commensurate with the saturation temperature—pressure. When this application uses "vacuum," it means low pressure, not a hard vacuum.

The boiler-condenser unit includes one or more thin-walled shells, preferably of aluminum. The shells rotate together at moderate speeds in the boiler-condenser unit. Each cylindrical shell has an inside surface, the boiler side. Each outside surface of the shells is the condenser side. The shells' rotation causes contaminated water directed into each shell's inside, boiler side to form a thin film. Wipers contacting or close to the boiler side may help form the thin film. This inlet contaminated water boils (heat of evaporation) on the shell's inside surface because the processor pressure gradually elevates from the initial vacuum pump-down conditions up to the fixed saturation pressure of the inlet water (typically at ambient temperature). The evaporating vapor from the boiler side flows into the compressor. The compressed vapor flows to the shells' condenser surfaces where it condenses. The phase-change back from vapor to liquid (heat of condensation) provides heat energy to the condenser surfaces. That energy is transferred across the shell from the condenser side to the boiler side. The heat of condensation on the condenser side produces the heat of evaporation on the boiler side (plus the additional entropy losses and small inefficiency losses from the processor).

Low friction wipers on each shell's outside may help remove condensate from the shell and may leave an exposed surface for new condensate to form. This enhances the condensing heat transfer coefficient substantially and improves overall thermodynamic efficiency, which reduces the required energy per unit mass of freshwater produced. The inside and outside wipers increase the overall heat transfer coefficient over conventional distillation heat transfer mechanisms. The wipers further act as automatic mechanical mechanisms to clean the boiling and condensing wall surfaces from particulate build-up and corrosion.

The compressor and boiler-condenser units are in vapor communication with each other. They may mount in the same housing, but if they mount in separate, spaced-apart housings, ducts can provide the vapor communication. Boiling at near vacuum produces vapor, which flows toward the compressor's upstream end. The system does not boil all incoming contaminated water. Some remains on the boiling surfaces and then flows as concentrated wastewater off the boiling surfaces. This is the Recovery Ratio=(Volume Fresh Out/Volume Input). The term "wastewater" also includes the contaminants remaining in the water. Because of boiling the incoming water, the contaminants are at a higher concentration in the wastewater than in the incoming contaminated water. The compressor increases the vapor's pressure typically about 0.04 psia to 0.15 psia (at ambient input temperatures), though higher or lower pressure increases may be advantageous. The vapor from the compressor is directed to the condenser surfaces of the shells where it condenses as freshwater. Structure in applicants' device collects the freshwater and directs vapor from the shells' boiler sides to the compressor and then to the shells' condenser side. Structure also directs the freshwater and wastewater to output pumps for storage.

Shell rotation enhances low-pressure boiling by increasing the boiling heat transfer coefficient. The rotation also enhances condensation (and the condensing heat transfer coefficient) because the condensate flings off the condenser surface so fresh vapor reaches the condenser surface more efficiently and quickly. Wipers, which help form thin films on the boiler surfaces and which remove condensate from the condenser surfaces, also enhance thermodynamic heat transfer coefficients and system throughput.

BRIEF DESCRIPTION OF THE DRAWINGS

FIG. 9 is an enlarged view of FIG. 8's right side.

DETAILED DESCRIPTION

Figure 1:
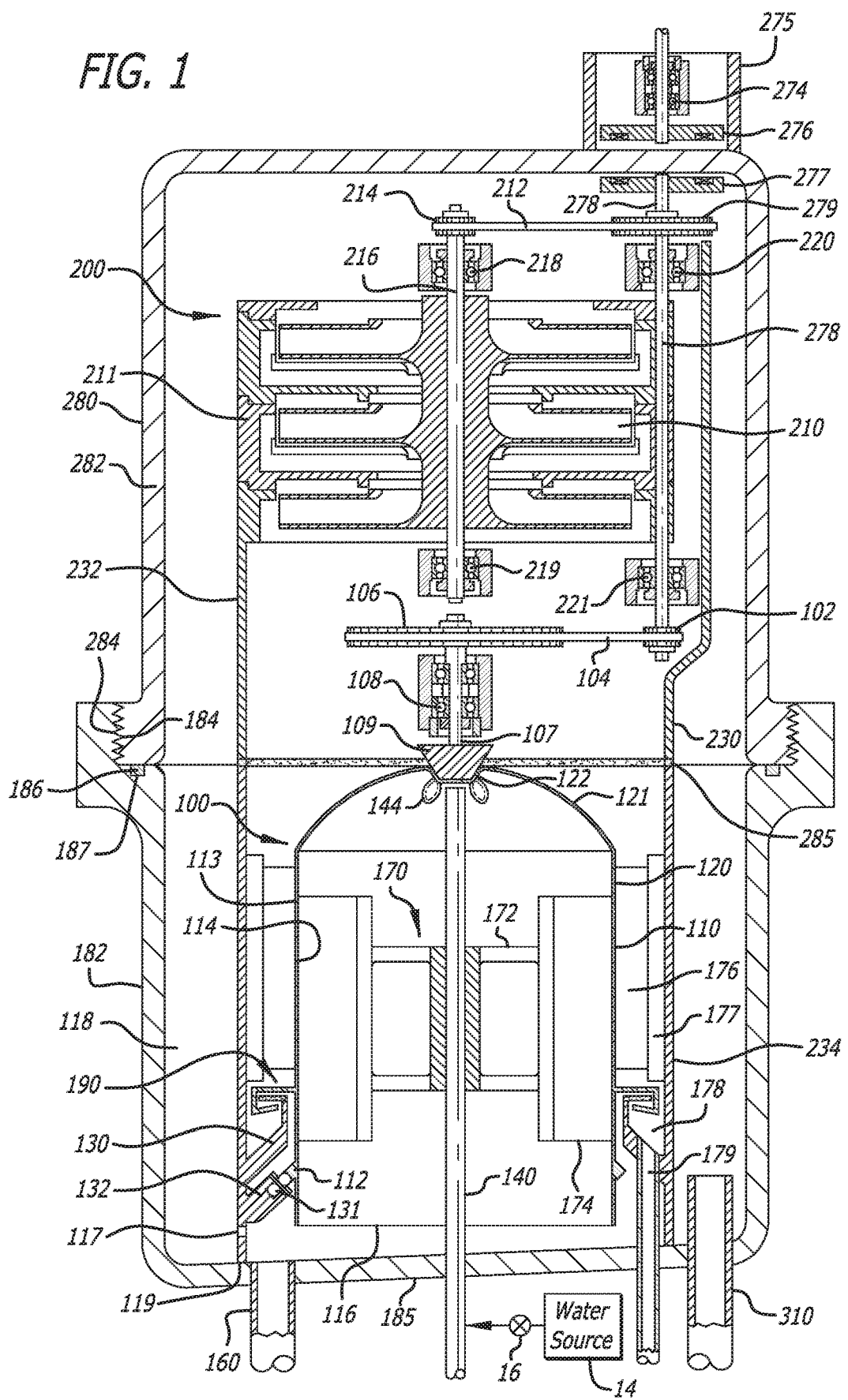
FIG. 1 is a sectional view of the water purification system where the blower assembly mounts above the condenser assembly in a housing.

Reference to components of one or more drawing figures doesn't mean the component is visible only in those figures. To avoid overcrowding of reference numerals, some components may not be numbered in all figures in which they are visible.

The Boiler-Condenser and Blower-Compressor Units of FIGS. 1-9: The water purification system 10 of FIG. 1 has two major components: (a) boiler-condenser unit 100 and (b) blower or compressor unit 200. See FIGS. 1, 2, 3 and 6. The two units can mount side-by-side or as FIG. 1 shows, above and below each other in a common housing. Having the components side-by-side and connected by ducting or other passages may cause heat losses and pressure drops from vapor moving between the components, but it may provide easier access to internal parts. Having the components in the same housing, however, should decrease heat losses and pressure drops. The applications reference to "a housing" refers to a single housing or multiple housings containing separate components.

The process may occur under 0.5 psia 3.5 kPa or 26 Torr) reduced pressure, which this application may call "vacuum" or "near vacuum," but other low pressures may be acceptable. The process could use pressures below 0.5 psia, but units operating at lower pressures must be more robust and are costlier to construct and operate. Vapor densities also are lower at lower pressures, which reduces mass flow.

Mounting the boiler-condenser unit below the compressor unit in the same housing also minimizes leak locations and cuts thermal loss. The processor in the drawings can maintain the low pressure without significant leaks in the system even though it uses low-cost parts with lower tolerances. This is possible because the process's sensitivity to slight pressure variations (leaks) is typically much less stringent than requirements for traditional vacuum chambers having harder vacuum.

Pumping down the system periodically can renew the desired pressure conditions. Renewed pump-down typically is required only occasionally, perhaps once or twice daily or even weekly. Required pump-downs only should take a few minutes.

The description refers to three sources of water: (1) incoming contaminated water, (2) processed potable water (also called "freshwater") and (3) wastewater. Wastewater remains when the potable water is processed out of the contaminated water. "Contaminated water" includes many liquids such as water containing microbes or salts from bodies of water. Well water may hold pesticides, fertilizers, heavy metals, contaminants from failed septic tanks and other chemicals. Some government or private water delivery systems may deliver water with few contaminates, but consumers may find the water contaminated.

Transferring Water into the Boiler-Condenser Unit: The FIG. 1 system connects to contaminated water source 14 (shown schematically). The water source can be spaced from the remaining components. For example, the water source could be a 55 gal. (208l) drum, a cistern, a tank or some other source of water outside a house, apartment or office. The processor's internal operating pressure is low, so having a significant pressure head to transfer the contaminated water into the processor is unnecessary. Under the normal, low-pressure operating conditions ($\approx$0.5 psia), a pressure head of 30 feet or more (34 feet is hard vacuum) is practical with no inlet pump. Under these conditions, only a throttle valve (needle valve) is needed to regulate the inlet flow to the desired inlet flow rates. A pump may supply the necessary pressure if the contaminated source is more than a 34-foot drop to the processor.

One could provide a holding tank near the system with a manual or powered pump at a more distant, larger source of contaminated water. The pump could operate when the holding tank requires refilling. If pipes are not available to carry water to a holding tank, people can carry the water in containers from the source.

Valve 16 (FIG. 1) controls the liquid flow from the source through a line or tube (not shown) into the boiler-condenser unit 100. A simple pinch valve may suffice because the water from the source typically is at a high-enough pressure to flow into the lower-pressure boiler-condenser unit, but the pressure head may vary as the holding tank fills and empties. The user may adjust the valve if it becomes clogged or worn. Computer control also may open, close and, in response to flow rate, adjust the valve in systems that are more sophisticated.

Having the components accessible for cleaning may be helpful because water from the source may contain solids, which could collect between the source and boiler-condenser unit 100. Providing a trap (not shown) upstream from the processor could catch sand and other heavy or undissolved contaminates. Particulates are unlikely to cause problems; they should pass from the processor through the waste stream with little or no effect on the processor. Valve 16 likely is the most sensitive component to particulate contaminates, but opening and then resetting the valve to the desired flow conditions should flush the valve clean. Under certain conditions, inexpensive compression pinch valves on plastic or Tygon® tubes can be used.

Mounting the Blower Unit Relative to the Boiler-Condenser Unit: Blower or compressor unit 200 mounts above boiler-condenser unit 100 in housing 280 in FIG. 1. The housing in FIG. 1 could have a one-foot ($\approx$30 cm) diameter, but its diameter depends on the diameter of the shell 110 and the parts surrounding the shell.

Housing 280 may be plastic due to plastic's low material and fabrication costs, but non-corrosive metals could be used instead. The plastic can be clear to allow one to view the internal components in operation. The housing's wall should be thick and strong enough to resist crushing force of atmospheric pressure acting on the housing's outside while the inside is under near-vacuum. Utilizing ribs in the housing could increase strength and reduces housing's weight and material cost.

Housing sections 182 and 282 connect to each other near midway between the top and bottom of combined housing 280. See FIG. 1. But the connection could be closer to the combined housing's top or to the bottom. Though the application refers to the top and bottom of the components because of how the drawings show them, the processor is not necessarily vertical and may be mounted horizontally or at other orientations.

Boiler-condenser housing section 182 and blower housing section 282 form combined housing 280. See FIG. 1. The former surrounds boiler-condenser unit 100 and the latter surrounds blower unit 200. The two housing sections could connect in many ways, but in FIG. 1, threads 284 on blower housing section 282 mate with threads 184 on boiler-condenser housing section 182. O-ring 186 in groove 187 enhances the leak-tight seal between the two housing units. The systems described in the drawings use many O-rings seated in grooves. The specification doesn't describe, and the drawings don't number all the O-rings or grooves. One of ordinary skill in the art will appreciate many grooves in the drawings, especially the smaller grooves, seat O-rings though the drawings show no O-ring, and grooves may not be numbered.

During operation, the inside of combined housing 280 is under near vacuum of about 0.5 psia 3.5 kPa) during operation. The single threaded connection 184/284 is the only potential leak area, but the design with a single connection having an O-ring seal decreases or eliminates leaking. One or more external clamps (not shown) may be secured to the structure at the threads to prevent a user from unscrewing the housing sections 182 and 282 accidently without first removing the clamps. Clamps also may improve the seal. After removing any clamps and unscrewing the housing sections, one has access to the components within combined housing 280.

The Blower: Blower or compressor unit 200 includes a multi-stage blower 210. See FIG. 1. A motor running the blower could mount inside housing 280, but it would be subject to vapors and could cause thermal variations in the housing. In addition, a source of electricity must extend through the housing to the motor. Therefore, applicants mount motor 274 in motor housing 275 outside the housing. See FIG. 1. The motor receives electric power from a source of power (not shown).

To avoid needing a seal in blower housing section 282 through which the shaft would extend, the motor shaft does not extend through the housing section. Any such seal, especially a rotating one, is a source of friction and potential vacuum leaks. The FIG. 1 system can use a magnetically coupled drive to avoid potential leaks. Motor 274 rotates outer magnetic coupler 276 adjacent the outside of blower housing section 282, and magnetic force from the outer magnetic coupler rotates the inner magnetic coupler 277. The motor may rotate about 2,000 rpm depending upon configuration and operating conditions. Such a motor uses relatively little electrical power during normal operation. The FIG. 1 system uses one motor 274 to drive blower 210 and shell 110, but it could use separate motors.

A user having a motor operating other equipment might use that motor's output instead of dedicated motor 274. Another source of rotational energy like a wind turbine or water wheel could act as a motor for the system especially with other structure to provide output at a desirable rpm. Such an outside system may be too complex to use instead of a simple, efficient, high-speed electric motor, however.

Parts mounted inside blower housing 282 have mounting structures. Inner magnetic coupler 277 attaches to and rotates shaft 278 (FIG. 1). The shaft rotates gear or pulley 279, which drives belt 212 to rotate gear or pulley 214. The specification refers to gears, pulleys and other circular drivers as "gears" though they may have no teeth. Gear 214 connects to and rotates drive shaft 216 of blower 210. Bearings such as bearing 218 and 219 support the drive shaft for rotation. Bearings 220 and 221 also support shaft 278. Even if not visible in the drawings or described in the text, rotating parts usually have bearings for friction reduction. Belts such as belt 212 may be flat or V-shaped to drive its gears or pulleys through friction, or the belts may be toothed to drive toothed gears or pulleys.

Gear 214 may be about one-fourth the diameter of gear 279, which causes gear 214 to rotate four times as fast as gear 279 rotates. If motor 274 rotates at 2,000 rpm, gear 214 rotates at 8,000 rpm. Shaft 216 extends from gear 214 into blower 210 where it rotates the blower at that speed. Changing the gears' diameters changes their mechanical advantage to arrive at a proper blower speed.

A gear train, friction drive or other drive could replace belt 212 and another belt 104 described below. Belt drives are quieter, cost less and are easier to replace than other drives. Their low cost allows the owner to have several replacement belts on hand if one belt breaks.

Shaft 278 (FIG. 1) passes through blower frame 211 and bearing 221, but it could be offset outside the blower frame. The shaft extends into gear 102. Shaft rotation rotates gear 102, which, through belt 104, rotates gear 106. Through additional structure described below, rotating gear 106 rotates boiler-condenser shell 110, which also is described below. The relative diameters of gears 102 and 106 and their mechanical advantage, rotate the boiler-condenser shell at about 250 rpm. For reference, a 13-cm radius shell rotating at 250 rpm produces centrifugal force of about 9.1 g (≈89 m/sec$^2$). Not that 1 system's 13-cm radius shell must rotate at 250 rpm. It probably could rotate more slowly.

The diameters of gears 279, 214, 102 and 106 in FIG. 1 are not necessarily to scale, but their diameters rotate blower 210 much faster than shell 110 rotates, e.g., 8,000 rpm for the blower versus 250 rpm for the shell. One can change the components' rotational velocities to account for the blower's specifications, the shell's diameter, the processing parameters and other factors.

Support insert 230 mounts inside combined housing 280. Two parts, upper support insert 232 around blower 210 and lower support insert 234 around boiler-condenser unit 100, form the combined support insert. The lower member attaches to base 185 of boiler-condenser unit housing section 182, and the upper member sits above the lower member. See FIG. 1.

Structure such as O-ring 285 at the top of the lower member may mate with structure at the bottom of the upper member to attach the members and prevent them from sliding relative to each other and provide a low-pressure seal created by the differential pressure produced by the blower. O-ring 285 need not create a hard seal; it positions members 234 and 232 relative to each other. Using an H-shaped ring is possible. Such a ring (not shown) is shaped as an H in cross-section with a groove facing upward and another facing downward. The wall of upper support 232 fits into the upward facing groove and the wall of lower support insert 234 faces into the downward facing groove.

Figure 2:
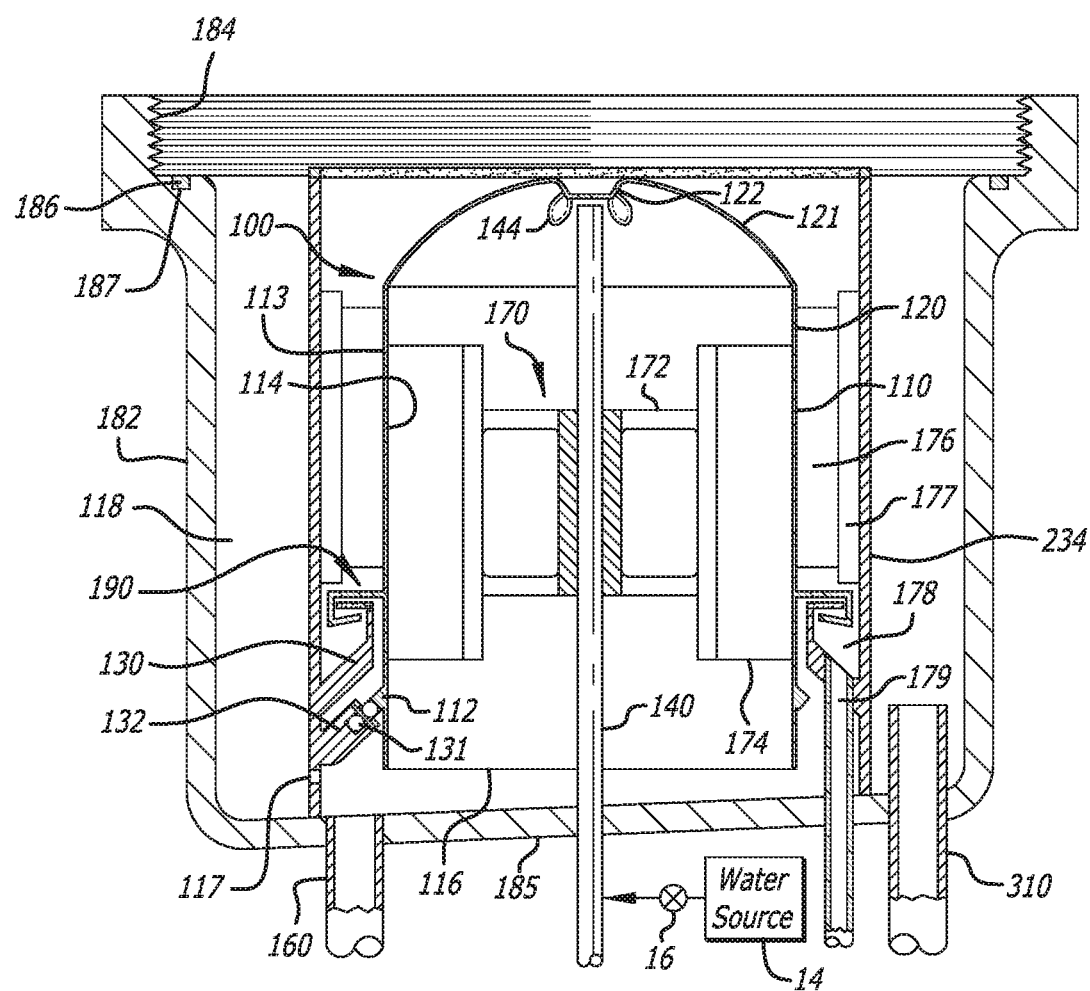
FIG. 2 is a sectional view of the boiler-condenser assembly of the water purification system.
Figure 3:
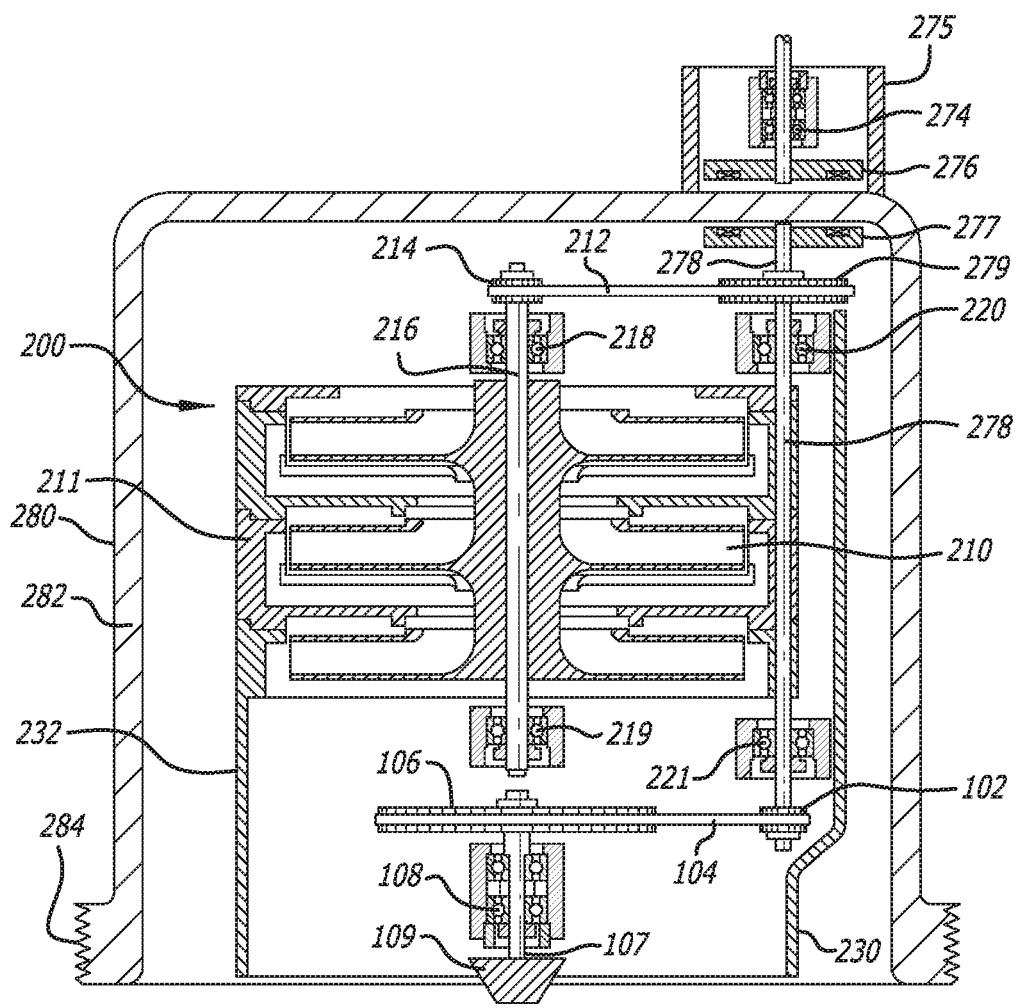
FIG. 3 is a sectional view of the blower assembly of the water purification system.
Figure 4:
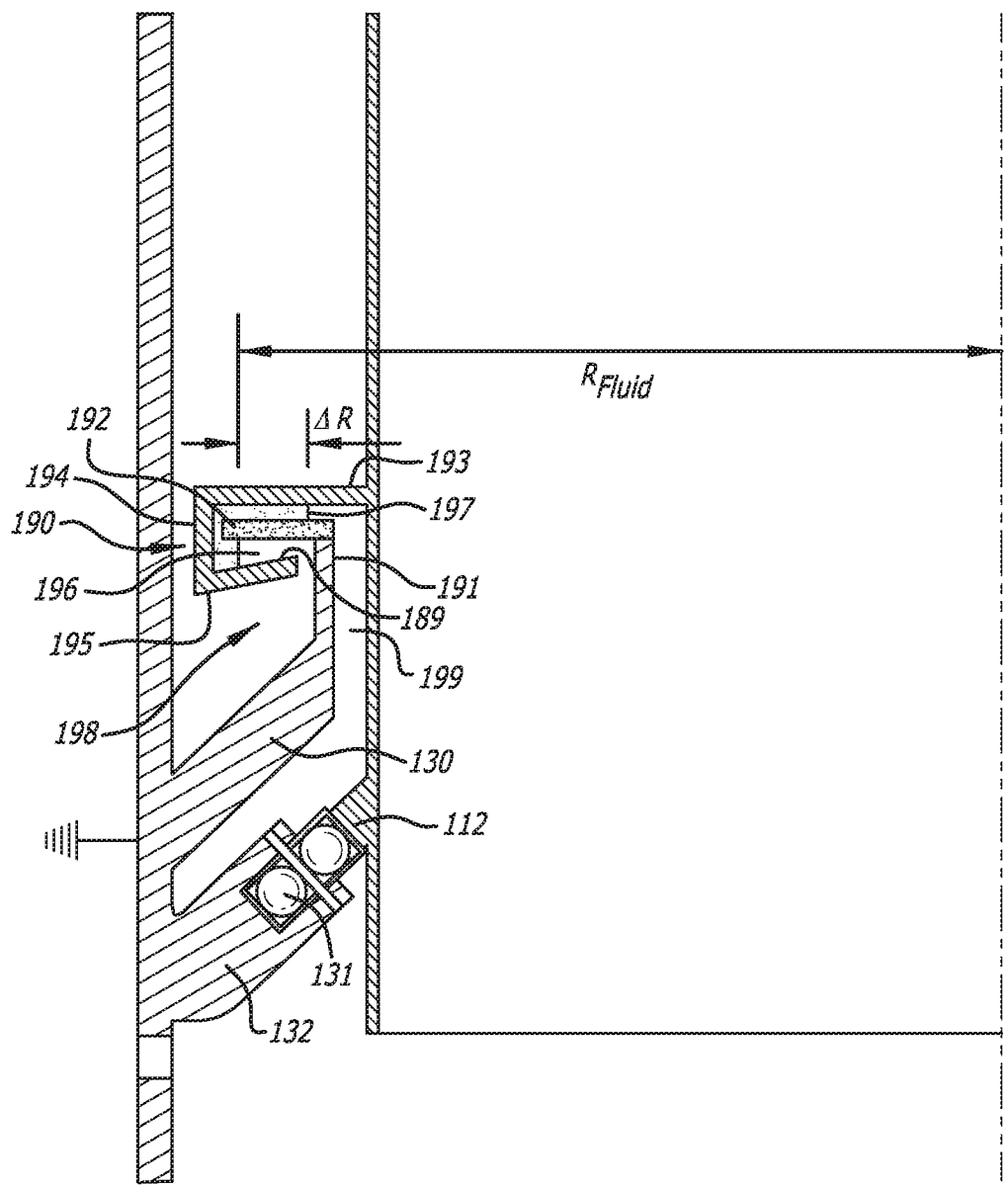
FIG. 4 is a sectional view of a rotating seal between the condenser assembly and boiler assembly of FIG. 1.

Boiler-Condenser Unit: Shell 110 of boiler-condenser unit 100 rotates within lower structural support insert 234 and lower housing section 182. Lower insert 234 may have a structure such as bearing support 132 (FIGS. 1 and 2), which extends upward at an angle from support insert 234. Extension ring 112 angles downward at an angle from the outside of shell 110. The extension ring and bearing support are aligned (FIGS. 1, 2 and 4). The bearing supports are spaced apart annularly along support insert 234. The bearing supports, which support the shell for rotation, also could be a continuous ring, and the extension ring could be divided into spaced-apart extensions from the shell. Both could be continuous too. Bearings 131 mount on each bearing support 132, and extension 112 on shell 110 sits on the bearings. The bearings' spacing, size, and their interaction with extensions 112 must support the shell at its weight and its rotation at that angular velocity (e.g., 250 rpm). A larger or smaller diameter shell likely would rotate at a different angular velocity.

Boiler-condenser shell 110 includes cylindrical section 120 under dome 121. The dome in the drawings has a substantial vertical portion after the curved portion, but the vertical portion could be shorter with a taller cylindrical section. If so, the upper part of the cylindrical section could be part of the dome just as the lower part of the dome could be part of the cylindrical section.

The shell's material preferably is high, heat conductive metal like aluminum. Impact extrusion could form the shell's aluminum, cylindrical wall and dome, but other fabrication techniques could be used. Aluminum's lower cost may make it the preferred material over copper or other good conductors. The dome's center may include depression 122, which receives angled driver 109. Shaft 107, which is supported in bearing 108 (FIG. 1), rotates the angled driver. The angled driver engages the depression so driver rotation from the rotation of shaft 107 rotates the shell.

Angled driver 109 may have teeth engaging mating teeth on depression 122 so the angled driver and depression engage each other. The driver and depression can connect through a spline or other designs without teeth. Friction also could secure the driver to the depression for rotation. An angled driver such as driver 109 in the drawings makes assembly and disassembly during maintenance and repair easier.

The belt drive, gears and shafts allow one motor 274 in FIG. 1 to rotate blower 210 and shell 110. Components discussed earlier allow rotation of components at different angular velocities to accommodate the distinct functions of blower unit 200 and boiler-condenser unit 100. Other drive structures could connect motor 274 and its associated shafts, gears and pulleys to the rotating shell, however.

System Operation: Housing 280 must be evacuated at first to about 0.1 to 0.3 psia (0.69 kPa to 2.07 kPa). Tube 310 (FIG. 1) connects to a vacuum pump (not shown) to lower the pressure in the housing to that low pressure. After the pump initially evacuates the housing, the vacuum pump only runs occasionally to maintain the pressure near 0.5 psia (3.5 kPa). The tube is one of the few parts extending into the housing while the housing is under vacuum. The seal between the fixed tube and the housing and the tube-vacuum pump seal must be good enough to maintain the desired pressure. A valve (not shown) between tube 310 and the vacuum pump isolates the unit when the vacuum pump is off.

Figure 7:
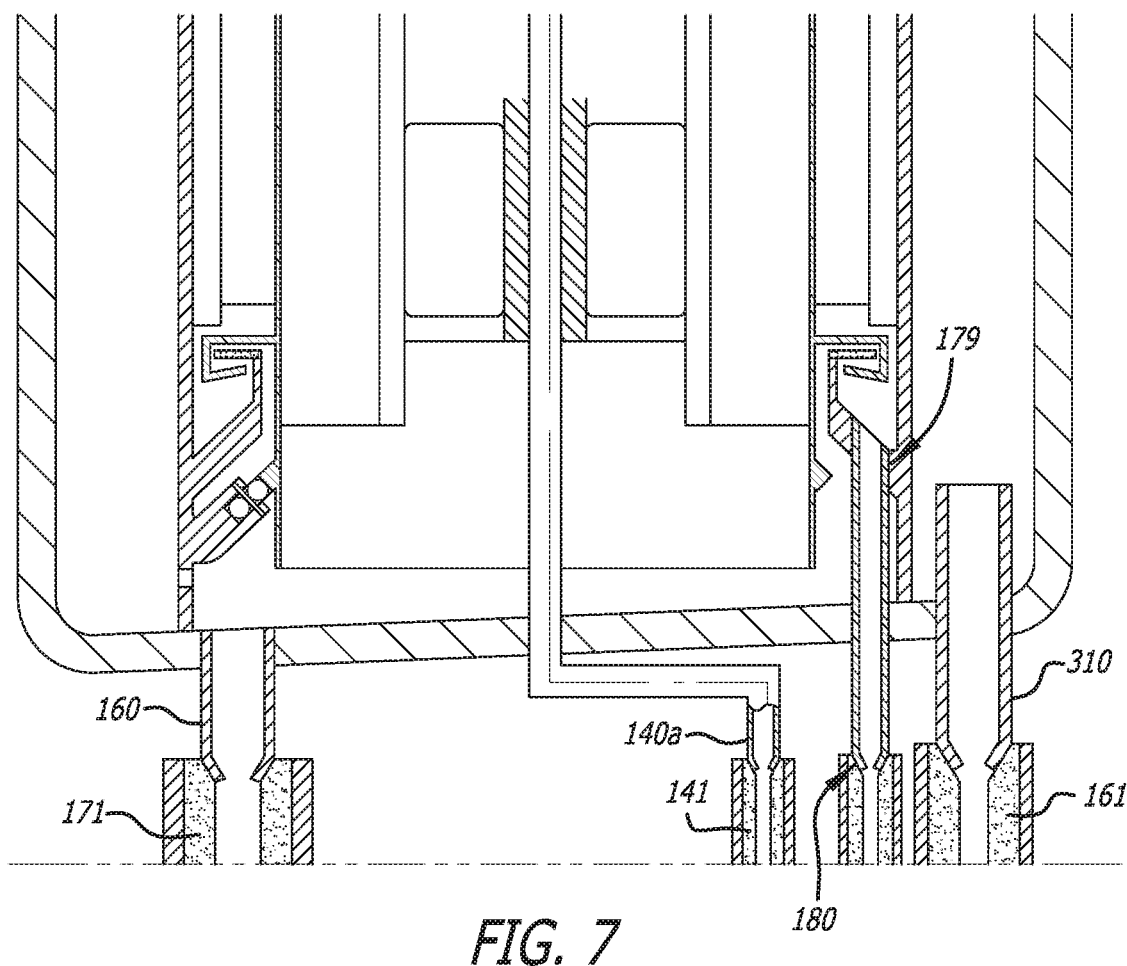
FIG. 7 is a sectional view of the inlets and outlets of the water purification system.

Contaminated water from water source 14 and valve 16 flows through and into discharge tube 140 inside boiler-condenser shell 110 (FIGS. 1 and 2). With the processor at an initial low pressure of 0.1 to 0.3 psia (0.69 kPa to 2.07 kPa) and initial inlet contaminated water enters, the processor's pressure climbs quickly to the 0.5 psia (3.5 kPa) saturation pressure commensurate with the inlet temperature (80° F. ($\approx$26.7° C.)). The tubes in FIG. 1 are straight, but they can have bends to allow connections with elements not aligned with straight tubes. See, for example, bend 140a in discharge tube (FIG. 7). Elements may be provided to direct water toward the shell's insider, boiler surface. Those elements include nozzles (not shown), which may be as simple as small holes spaced along the discharge tube, that direct the contaminated water toward the shell's inside or boiler surface 114. Making the holes or nozzles large enough could lessen potential clogging. Incoming contaminated water also can flow out the tube's top 140. Shell rotation disperses the water along the shell's inside surface 114 and by having vanes or propeller-like structure 144 which rotate with the shell spraying the water. The vanes or propeller throw water toward the shell's inside surface when contaminated water hits them.

G-forces acting on the water due to rotation of shell 110 cause the water to form a thin film on the shell's inside surface 114. The water film's thickness affects freshwater production. If the film is too thin, dry spots could form where no water-to-vapor conversion may occur, which decreases the effective heat transfer rates. If the film is too thick, heat transfer suffers.

Inside surface 114 of shell 110 is under vacuum. More about the temperature and the additional heat source below. At 0.5 psia, freshwater boils at about 27° C. ($\approx$80° F.), but the water's salinity and contaminates affects the boiling point. Graphs and charts comparing the boiling point of water as a function of pressure are available including those at http://www.engineeringtoolbox.com/boiling-point-water-d_926.html.

Water boils on the inside surface 114 of shell 110. That vapor is pure insofar as it contains no non-volatile contaminants. The resulting vapor travels out bottom 116 of shell 110. Lower support insert 234 may have openings like opening 117 (FIGS. 1 and 2) to let vapor flow through space 118 between housing 280 and the upper and lower support insert 232 and 234.

When the contaminated water boils along inside surface 114 of shell 110, the pure vapor moves away from the surface. Centrifugal force, which urges water to the shells' surfaces, does not urge the vapor back toward the shell's inside surface, but the non-volatiles like salts and contaminates remain along surface 114 and travel with the contaminated water. Further, the g-forces caused by the moderate-speed rotation of shell 110 maintain the non-volatiles on the shell's inside surface until they exit at the bottom of shell 110. Any buildup of salts and contaminates with remaining liquid water causes them to flow along the boiler wall.

Most contaminated water the system processes would not include condensable volatiles like petroleum or other dissolved gases. Dissolved $O_2$, $N_2$ and $CO_2$ do not condense at the system temperatures, however. Their presence may raise the pressure inside the system, which could require occasional vacuum pump down use to decrease the pressure to desired levels. If the contaminated water contains volatiles, removing them before the applicants' system processes the water is desirable.

The vapor from shell 110 travels upward through space 118 toward the upstream, lower pressure end of blower 210. The blower raises the vapor's pressure and temperature and directs this energized vapor toward the shell's outside surface 113. The heat of the vapor exiting the blower includes three distinct parts: 1) sensible heat rise (able to be measured by a thermometer), which is superheated steam above the boiling saturation temperature; 2) the latent heat, which is locked up energy due to the phase change energy at boiling saturation; and 3) pressure increase energy, which resulted from the blower pressure rise to a higher condenser saturation temperature. The latent heat and pressure-rise energy causes a useable temperature increase $\Delta T_{bc}$, between the boiler and condenser to drive the process, which occurs at the higher saturation temperature and pressure in the condenser, and results in phase-change (vapor to liquid) in the condenser with heat transfer from condenser to boiler. Note the superheated vapor must cool in the condenser chamber down to the saturation temperature (by low efficiency, convective vapor heat transfer on the condenser $\approx$500 Btu/hr-° F.-ft$^2$) until the high efficiency phase-change, heat transfer can occur ($\approx$5,000 Btu/hr-° F.-ft$^2$). Phase-change heat transfer occurs when the temperature drops from superheated conditions to the saturation temperature (and pressure) in the condenser, which had been elevated by the pressure rise from the blower. This is the increased latent energy heat transfer that drives the processor.

The temperature difference between the boiler and condenser $\Delta T_{bc}$ at the vapor-liquid saturation conditions is computed by the Clausius-Clapaeyron equation:

$$\Delta T_{bc} = \left(\frac{\Delta p_{bc}}{p_b}\right)\left(\frac{RT_b^2}{h_{fg}}\right).$$

In this equation, R is the gas constant, $h_{fg}$ is heat of vaporization (fluid to gas), $\Delta T_{bc}$ is the boiler-condenser temperature difference at saturation, $\Delta p_{bc}$ is the pressure difference generated by the blower between the boiler and condenser, and $p_b$ and $T_b$ are the boiler pressure and temperature, respectively. Any method or technique maximizing the heat transfer coefficient without substantially increasing the working temperature $T_b$ or the temperature difference $\Delta T_{bc}$ is advantageous. Thin-film boiling and condensing due to boiler-condenser rotation along with wiping these surfaces to maintain thin and uniform liquid surfaces make such a large heat transfer coefficient possible. More about wiping below.

Boiling water on a shell's surface transfers heat energy from the surface to the water. Boiling changes phase from liquid to vapor at the same temperature. That phase change requires much more energy (heat of vaporization) than the small, sensible heat energy rise resulting from the superheated vapor temperature rise between the boiler and condenser. Heat transfer across applicants' shell 110 to the liquid water drives and causes boiling in the boiling chamber, which cools the shell's temperature. But a continuous flow of constant-temperature input feed-water is injected inside the boiler for further evaporation, so the shell is maintained at a steady-state temperature. The tendency towards a lower shell temperature due to evaporation in the boiler is countered by the continuous heat flux transferred from the condensing vapor on the shell's outside surface 113, causing boiling and maintaining the shell at a constant steady state temperature.

The needed, added energy for driving the boiling process comes from the blower compression energy stored in the vapor, which provides the heat of condensation driving energy. The added energy transfers across the shell to cause continuous boiling (heat of vaporization energy). As an example: consider the inlet boiler temperature $T_b=80°$ F. (26.7° C.) with the boiler saturation pressure $p_b=0.5$ psia (3.45 kPa), and a vapor-liquid saturation temperature difference $\Delta T_{bc}=3°$ F. (1.66° C.). The blower energy developed that temperature difference, which produced a condenser pressure rise $\Delta p_c=0.05$ psia (0.345 kPa). The boiling energy (heat of vaporization) at 80° F. is 1,096.1 Btu/lb (2,550 J/g), and the condensing energy (heat of condensation) at 83° F. (i.e., 80°+3°) (28.3° C.) is 1,097.4 Btu/lb (2,553 J/g). Raising the temperature of water 1° F. (1.8° C.) requires only about 1 Btu/lb (2.24 J/g), and raising the vapor temperature 1° F. (1.8° C.) only requires about 0.43 Btu/lb (1 J/g). The huge heat of vaporization energy required to boil the inlet water (1,096.1 Btu/lb or 2,550 J/g) is supplied by the similarly large heat of condensation energy released during the condensation process (1,097.4 Btu/lb (2,553 J/g)).

The temperature of the shells rapidly becomes equal to the temperature of the incoming water because of the shells' low thermal mass (small heat capacity relative to the incoming water heat capacity). If the shells were initially warmer than the input water, they would quickly cool to the same temperature of the input water by transferring their heat to the input water. The unit internal pressure would rise slightly, but if the starting pressure (e.g., 0.3 psia) is less than the input water's saturation pressure (e.g., 0.5 psia), the process equilibrates to the 0.5 psia saturation pressure immediately. If the shells were cooler than the input water temperature, they would quickly warm up. Input water that does not boil is expelled as part of the wastewater, but the shells would now be equal to the temperature of the input water.

When the process starts, the internal pressure is reduced to below the saturation pressure of the incoming fluid (e.g., below 0.5 psia, to about 0.3 psia or below). If the input water is 80° F., the water immediately boils, and the internal pressure rises to the saturation pressure (0.5 psia). Boiling starts because the unit pressure is below the saturation pressure of the input water (0.3 psia versus 0.5 psia). Once the boiling process starts, it continues because heat transfer from condensing fresh fluid on the condenser transfers heat to the shells' boiler surface.

Had the initial internal pressure been above the saturation pressure of the incoming fluid, the processor would not operate. But if the initial internal pressure is below the saturation pressure of the incoming fluid, the process starts immediately. Not reducing the temperature of the incoming fluid during operation (i.e., reducing its saturation temperature and, hence, saturation pressure) to below the unit's internal working pressure is important. Otherwise the process stops. Applicants maintain the temperature of the incoming fluid constant (or close to constant), so the process does not stop.

If the process stops, turning on the vacuum pump until the internal pressure is below the "new" lower saturation pressure causes the process to start immediately and continue. If the initial starting pressure of the unit is equal to the saturation pressure of the incoming fluid (e.g., 0.5 psia), the unit still operates because some of the input fluid evaporates inside the boiler chamber, is compressed by the compressor and condenses on the condenser. That starts and keeps the boiling process continuing. If the starting internal pressure is equal to the saturation pressure, the unit takes longer to stabilize up to full capacity, but shortly, the unit equilibrates. But the unit does not operate as efficiently with non-condensable gases present because they occupy a partial pressure inside the unit that can be removed by a short duration and intermittent vacuum pump down.

These factors make starting the unit at a pressure below the working saturation pressure of the incoming fluid desirable. If the incoming temperature is 80° F. and the saturation pressure is 0.5 psia, starting the unit at a pressure below 0.5 psia (e.g., ≤0.3 psia) overcomes these problems. If the inlet temperature (and, hence, pressure) drops below the internal working pressure of the unit, the vacuum pump could be activated for a brief time to reduce the internal working pressure of the unit to below the saturation pressure of the incoming fluid. Then the process immediately jumps back into operation and stabilizes again.

Figure 29:
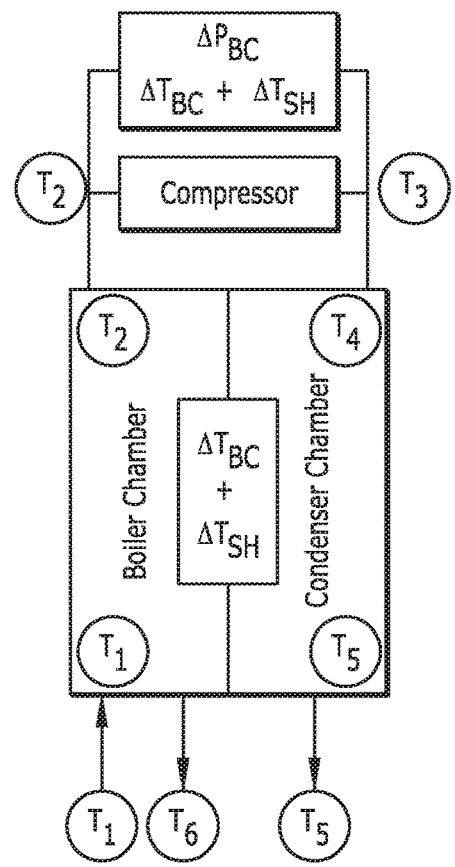
FIG. 29 is a block diagram flow chart relating boiling and compression
Figure 30:
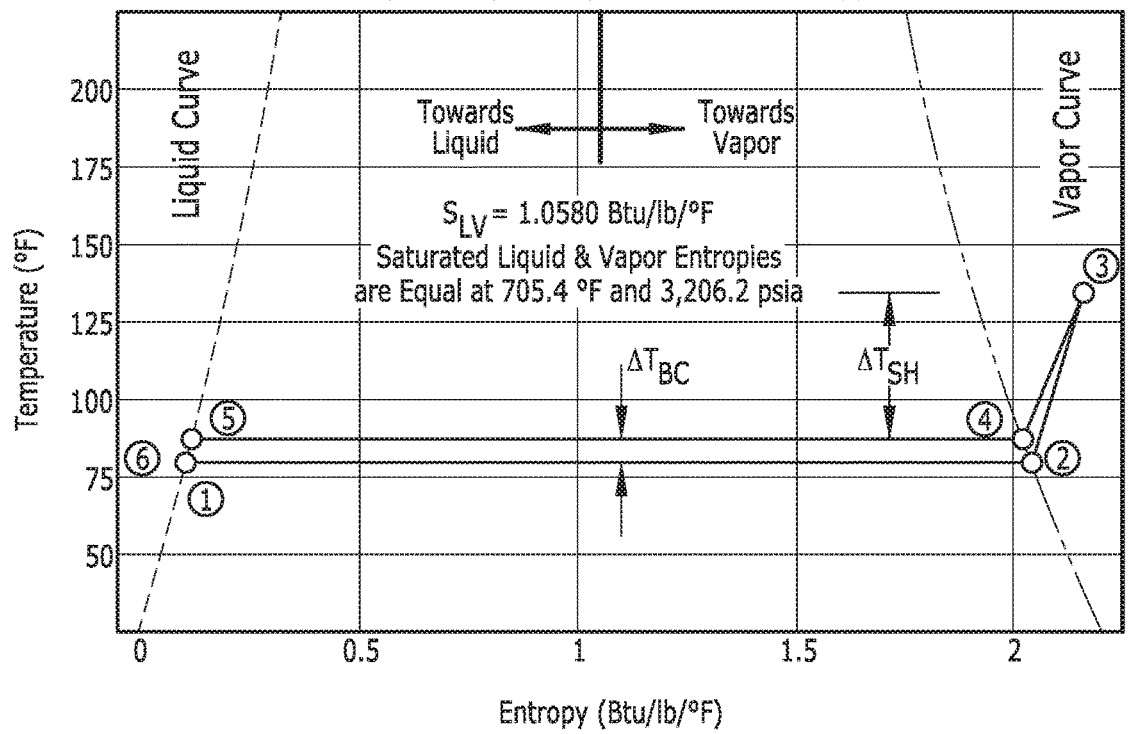
FIG. 30 is a graph of temperature-entropy for the process.

FIG. 29 is a block diagram flow chart relating boiling and compression phases, and FIG. 30 is graph relating the temperature and entropy during the process. In FIG. 30, contaminated water enters the processor (boiler) at state 1 at temperature $T_1$ and pressure $P_B$. As the water boils, it changes phase to state 2 but remains at the same inlet temperature $T_1$ ($T_2=T_1$). But its entropy increases (going from liquid state to vapor state). The concentrated wastewater exits the processor at temperature $T_6$, where $T_6=T_1$. The vapor travels to the inlet of the blower where the compressor compresses the vapor. The pressure and temperature increase to pressure $P_C$ and temperature $T_3$; which is super-heated; i.e., above the saturation temperature $T_4$ (by $\Delta T_{SH}$). Once the superheated vapor transfers its sensible heat energy to the condenser (through low efficiency, convective heat transfer), its temperature drops from $T_3$ to $T_4$. This saturated vapor, which is at a higher temperature and pressure than the boiling vapor, transfers its latent heat energy ($\Delta T_{BC}$) by changing phase from vapor to pure liquid through high efficiency, phase change heat transfer. The vapor's entropy decreases during phase change to pure distillate and exits the processor at temperature $T_5$, which is the same temperature $T_4$ as the saturated vapor in the condenser. Note, if salts are present in the input contaminated fluid, an additional amount of heat energy must overcome the boiling point rise $\Delta T_{BPR}$. Therefore, the total temperature difference will be $\Delta T_{tot}=\Delta T_{BC}+\Delta T_{BPR}$.

As vapor exits blower 210 at a higher pressure and temperature, the vapor contacts outside surface 113 of shell 110. Because boiling occurs from the shell's inside surface, boiler surface 114 transfers energy from the shell's outside surface, with the shell's temperature lower than that of the condensing vapor. The vapor had increased in temperature and pressure from energy supplied by the blower. When the warmer vapor contacts the shell's lower temperature, outside surface, the vapor condenses into liquid water. The phase change from vapor to liquid on the condenser surfaces transfers heat energy back through the shell. That heat energy is transferred to the liquid water on the shell's inside surface for boiling the contaminated liquid. The vapor's higher pressures and temperatures on the shell's outside surface prevents any low-temperature boiling of condensed liquid from the outside surface because the shell always is colder than the condensed vapor and liquid condensate.

Extracting all the water as potable water from the incoming contaminated water may not be necessary or desirable. While some contaminated water entering the inside of shell 110 of boiler-condenser unit 100 boils, contaminated water that doesn't boil remains as liquid wastewater to carry contaminants with it. Remaining contaminated water and contaminates extracted from non-boiled water flow downward under gravity and centrifugally assisted forces toward the shell's bottom 116. When the contaminants and wastewater reach the inside wall's bottom of shell 110, they collect along inside edge 119 and on base 185 of boiler-condenser housing section 182.

Openings such as hole 117 (FIGS. 1 and 2) for passing vapor from boiler-condenser unit 100 to blower unit 200 are near the bottom of 234 and near base 185. Positioning the holes so contaminants and wastewater do not pass through the holes is important because centrifugal force on the contaminants and wastewater throws them outward as they exit the shell. Otherwise, added structure could block the thrown water from reaching the holes. Base 185 slopes (lower on the left side of FIGS. 1 and 2) so contaminants and wastewater collect at outlet 160.

Injecting clean water or steam occasionally through inlet 140 into boiler-condenser shell 110 can clean the shell's inside. Regularly removing seawater or algae infested water from inside the processor when the processor is not in use should lengthen the time before the user must replace the shell.

Injecting steam at atmospheric pressure into boiler-condenser shell 110 before starting the process and before processor evacuation helps replace non-condensable air (mainly $O_2$, $N_2$, Ar and $CO_2$) with condensable water vapor so only water vapor remains when the system operates. For this option, applicants could use a small external heater for producing steam. Because the heater would operate only briefly, it may not consume substantial electrical power to affect electrical usage adversely.

Wipers: One or more internal wipers may mount inside shell 110 of boiler-condenser unit 100 and extend to the shell's inside surface 114. In FIGS. 1 and 2, internal wiper 170 mounts around inlet tube 140. The wiper may have multiple struts 172, and each strut may have a flexible wiper blade 174. The wiper blade's outer edge contacts the shell's inside surface. Having evenly spaced wipers around the shell balances any small forces from the wipers to the shell. When the wiper blade contacts contaminants and contaminated water, it dislodges them causing them to descend. To reduce friction between the wiper and the shell, the wipers may be formed of or coated with Teflon® or other, low-friction material.

Pressure from wiper blade 174 against the inside surface of shell 110 need not remove all the liquid. Unlike a vehicle windshield wiper, which leaves glass surfaces temporarily without water, wiper blade 174 doesn't remove all the contaminated liquid from the shell's inside surface. Instead, the wipers thin the fluid film further to increase the boiling heat transfer coefficient substantially. The boiler wipers redistribute the fluid in a thin film on the boiler surface continuously until the excess fluid flows by gravity and wiper excess out of the boiler chamber. Because the wiper blade is not removing all the water from the shell's inside, it doesn't push hard against the inside and should not add much to the system's electric power requirements used to overcome friction between the wipers and the shells. Configuring the boiler wipers in this manner also keeps the boiling wall surface clean by helping prevent scale or sludge buildup on the boiler inside surface. The boiler wipers, therefore, serve two beneficial features: enhancing thermodynamic heat transfer by thinning the liquid film uniformly and cleaning the boiler wall surface continuously.

Wipers also can remove water from the condenser-outside surface 113 of shell 110. As vapor condenses on the outside surface, the water forms droplets that grow as more vapor condenses. When the droplets have enough mass, centrifugal force from the shell's rotation throws off the droplets. But surface tension holds condensed water on the shell. External wipers 176 (FIGS. 1 and 2) for the shells' outside surfaces mount on supports 177, which connect to lower support insert 234. The condenser wipers remove condensed water that centrifugal force did not remove from the shell's outside surface. Removing the condensed water enhances the condensing heat transfer coefficient. By removing condensed liquid from the shell's outer surface that centrifugal force would not remove immediately or as effectively, more of the shell's metal surface area becomes free of liquid and exposed to vapor, which makes condensation much more efficient.

All internal wiper blades 170 in FIGS. 1 and 2 are at the same level so each contacts the same region of the inside surface of shell 110. They also could be spaced vertically to contact different regions. External wiper blades 176 also could be spaced vertically.

The wipers also may mount at an angle to the shell's axis of rotation or a single wiper may form a curved or spiral-like path along shell's surface 110. The internal wiper 170, which spreads contaminated water along the boiler surface, may be angled so its surface drags along the boiler surface as the shell rotates. The external wiper 176 for removing condensate from the condenser surface also may present a sharp edge facing the shell's rotation to throw condensate from the condenser's surface.

Similar concerns about wiper drag friction apply to inner wipers 170 and outer wipers 176. As pressure from the wiper blades increases, maintaining rotation of shell 110 requires more energy. Applicants estimate four, spaced, Teflon®, condenser wipers pressing on the condenser shell with a 4 oz. (1.1 N) force each (drag coefficient of 0.11), spinning a 13.75-in (34.93 cm) shell at 100 rpm ($\approx$2 g's) produces about 0.9 watts of rotational, frictional drag power loss. Similar losses occur for the boiler wipers. Assuming four Teflon boiler wipers also, the total rotational frictional drag power losses incurred from both the boiler and condenser wipers are about 1.8 Watts. But the wipers likely increase total heat transfer coefficient at least by a factor of 10. Added system performance from using wipers outweighs any small energy penalty for using them.

Freshwater from outer, condenser surface 113 of shell 110 collects in region 178 around the shell. See FIGS. 1, 2 and 4. The water then flows into outlet 179. Annular disk 130 at the bottom of region 178 is angled to direct the water down toward lower support insert 234. The outlet may be near the support insert 234 so water flows into the outlet.

Rotating Vapor Seal: The inside and outside of shell 110 are at different pressures. Rubber or plastic seals separating the regions of different pressure could create significant frictional losses as the shell rotates, especially with larger shells or faster shell rotation. Seals between rotating parts also wear, are costly and need regular maintenance, which affects ease of assembly and reliability.

The seal in FIGS. 1, 2 and 4 seek to avoid problems with conventional, rotating vapor-to-vapor seals. Seal 190 (best seen in FIG. 4) includes vertical projection 191 extending upward from the inside end of annular disk 130 and horizontal projection 192 extending outward from the vertical projection's top. The disk extends around the inside of lower support insert 234.

Channel 189 (FIG. 4) comprises ring 193 extending outward from shell 110, hoop 194 extending downward from the end of the ring, and projection 195 extending inward from the bottom of the hoop (together all forming a rotating U-Channel) Channel 189 has a distal end, and stationary disk 192 extends through rotating channel 189's proximal end. See FIG. 4. Water 197 collected in the channel, rotates at about 100 rpm, the rotational speed of shell 110, because the channel revolves with the shell. The rotation produces centrifugal force on the water, which urges the water distally against channel's distal end at hoop 194. Pressure from vapor on the shell's outside-condenser side acts in region 198 on a first side of the shell, and pressure from vapor from the inside-boiler side of the shell acts in region 199 on a second side of the water. The higher pressure from the compressor moves the water toward the lower pressure from the boiler against the rotated fluid in the channel Centrifugal force from rotation acts against the pressure-differential force to hold the fluid in the channel. FIG. 4 shows the water positioning in response to the pressure differential. The components' designs prevent force from the pressure differential from overcoming the centrifugal force acting on the water so remaining water in space 196 in the channel becomes a vapor seal between the different pressures.

The pressure forces caused by spinning a rotating U-channel filled with water, which is being "cut" by a stationary disc extending into a depth $\Delta R$ of the rotating water (described above), are computed by noting that the fluid pressure p against the fluid with density p is given by $\rho=\mu gr$. Because the channel rotates with speed $\omega$, the centripetal g forces acting on the trapped water vary with radius r. The differential pressure is $P=\mu g(r)r=\rho(\omega^2 r)r \rightarrow dP=2\rho\omega^2$ rdr. Integrating this relation gives the total differential pressure possible from the rotating seal yielding $\Delta p=\rho\omega^2(R_2^2-R_1^2)=\rho\omega^2 \Delta R(2R_2-\Delta R)\approx 2\rho\omega^2 R_2 \Delta R$. If the seal uses a fluid with a density higher than water, the sealing pressure forces increase linearly. The sealing pressure potential, therefore, increases quadratically with rotational speed ($\omega$), and linearly with increased differential liquid seal channel depth ($\Delta R$) or the seal radius ($R_2$). Doubling the seal channel depth radius ($\Delta R$) adds little to the system's overall diameter (compared to $R_2$), but the sealing pressure capability doubles.

Removing Potable and Wastewater from the Housing: Potable water in outlet 179 and wastewater in outlet 160 (FIGS. 1, 2 and 7) must be collected outside the processor at atmospheric pressure (14.7 psia (101 kPa) at sea level), but the low pressure at the outlets' upstream ends prevents water from flowing out the outlets. Suction pumps develop insufficient pressure head to remove the wastewater and fresh, potable water from the processor while the processor is operating under near vacuum. Using conventional, positive displacement pumps to push the water from the outlets requires much energy, which is undesirable in this system. Water also must be pumped out without letting in air. Even a small volume of outside air changes the internal pressure and operating conditions.

Figure 5:
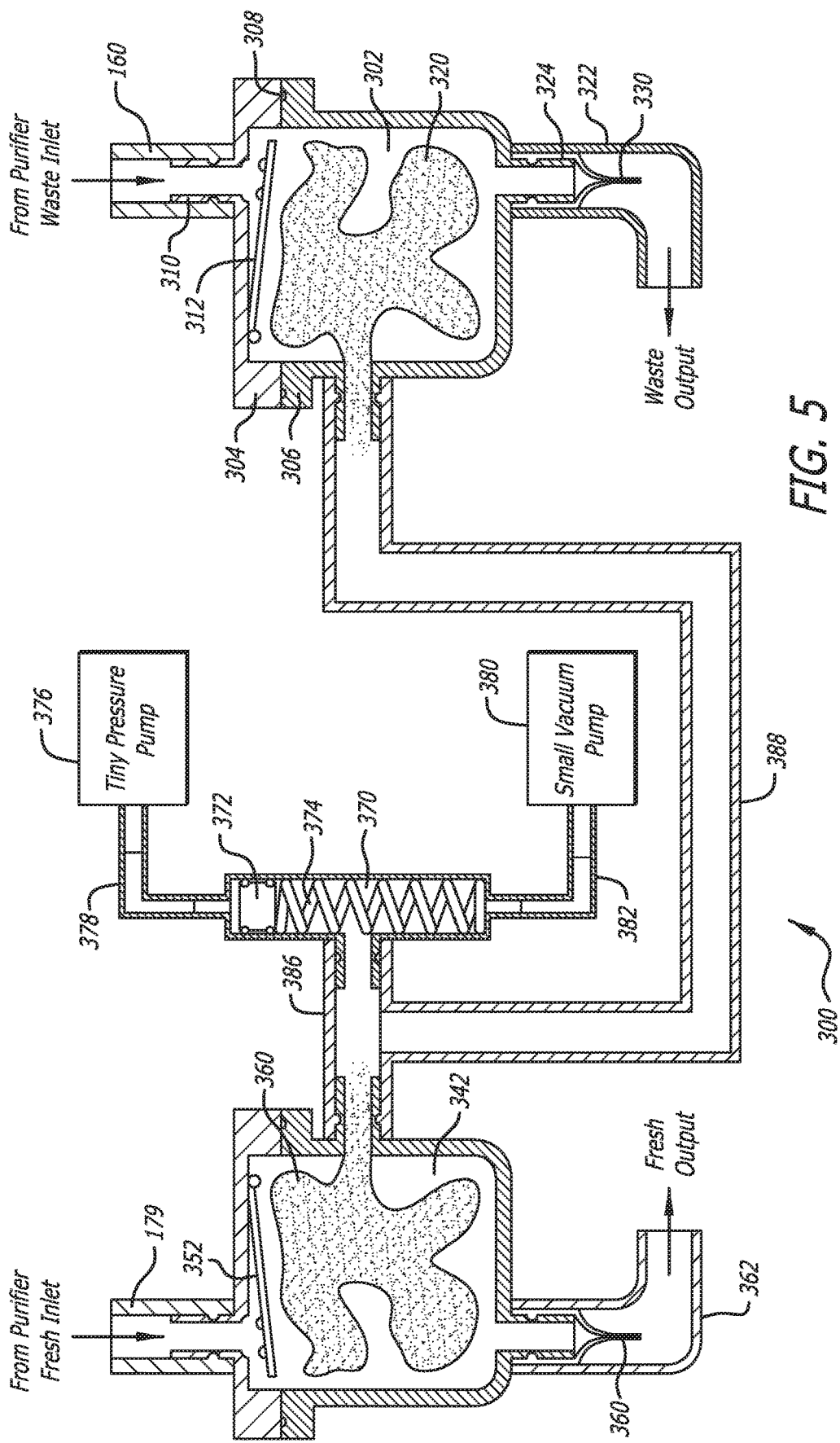
FIG. 5 is a schematic view of a pumping system of the water purification system for getting rid of waste and freshwater from a low-pressure water purification system.

Applicants may use a positive displacement bladder pump as one option for the combined freshwater and wastewater output pump system 300. FIG. 5 shows it schematically. It operates on the freshwater and wastewater simultaneously by alternately pressurizing bladders to force the fluids out against the atmospheric pressure head. This application discusses other means below for removing freshwater and wastewater from the processor.

Wastewater and contaminants from outlet 160 (FIGS. 1, 2, 5 and 7) enter pump system 300 in chamber 302. See FIG. 5. Two-part housing members 304 and 306, which O-ring 308 seals, forms the chamber. Outlet 160 is sealed to fitting 310 on housing member 304. Water can flow from the outlet into the chamber 302 because the outlet and chamber are at the same low, near-vacuum pressure. Spring-loaded hinge plate 312 or another plate-like member, which mounts on housing member 304, normally is open as in FIG. 5 so it doesn't block gravity water flow into chamber 302. Expandable and contractible bladder 320 mounts in chamber 302. The bladder occupies most of the chamber when it expands, but it occupies only a small volume when it contracts.

With bladder 320 contracted, wastewater and contaminants from chamber 302 can flow by gravity into exit conduit 322 (FIG. 5). The exit conduit is sealed to fitting 324. Flexible, selfsealing "reed" valve 330 or another type of check valve closes the exit conduit. The pressure above the valve, which is the same as the processer's pressure, is near vacuum, but the pressure below the valve is atmospheric. Reed valves like valve 330 may be like valves in helium-filled Mylar balloons. The inexpensive valves used with balloons keep helium-filled balloons filled for weeks. Helium's smaller molecules are more challenging to one-way valves than are the $O_2$, $N_2$, Ar and $CO_2$ molecules of air on the other side of the valves in applicants' system. The liquid water and water vapor inside the bladder pump also help seal the reed valve's upstream side from air leakage back through the valve.

When bladder 320 expands, it pushes hinge plate 312 up to close off the entrance from outlet 160 into chamber 302. Closing the hinge plate prevents back-flow and separates housing 280 and outlet 160 (FIG. 1), which are under near vacuum, from chamber 302 (FIG. 5). The bladder's expansion decreases the effective volume inside the chamber to raise the hydraulic pressure to greater than ambient pressure at exit conduit 322 (FIG. 5). This urges the wastewater and contaminants past valve 330 and out the exit conduit for disposal. Reed valve 330 or another check valve prevents any backward flow of air into chamber 302. The bladder's expansion should provide pressure above atmospheric to overcome any back force from the check/reed valve.

The system for removing freshwater from outlet 179 is like the wastewater removal system. The outlet and chamber are at the same near-vacuum pressure so freshwater can flow into chamber 342. Normally open, spring-loaded hinge plate 352 does not block gravity-fed freshwater. Bladder 360 in chamber 342 contracts to occupy only a small volume, which allows the rest of the chamber to fill with water from outlet 179. Expanding the bladder pushes the freshwater from the chamber past reed valve 360 and through exit conduit 362 to freshwater storage.

A small, intermittent and controlled pump-vacuum pump arrangement expands and contracts bladders 320 and 360. Bladders 320 and 360 are flexible, but the walls of chambers 302 and 342 prevent the bladders from becoming overinflated and popping Chamber 370 contains piston 372 that can move from end to end in the chamber. Compression spring 374 urges the piston "up" (FIG. 5). Vacuum pump 380 can draw air from bladder 320 through tube 388 and from bladder 360 through tube 386 into their collapsed condition when the piston is up. When the bladders collapse, wastewater from outlet 160 and freshwater from outlet 179 can flow into respective chambers 302 or 342. When the vacuum pump turns off, pressure pump 376 can be activated. Its pressure pushes through tube 378 to push the piston "down," which exposes tubes 386 and 388 to the pump's pressure. The pressurized air flows into the bladders to expand them, which close spring valves 312 and 352, and then pushes wastewater and freshwater into their respective outlets.

Components of pump system 300 can be low cost, and the energy required to pump out the fluid is low. To save electricity, neither pressure pump 376 nor vacuum pump 380 operates continually. Instead, the pump system may work intermittently when sensors determine one or both chambers 302 and 342 are filled to predetermined levels.

Limiting Condensation on the Housing and other Internal Components: The system can process incoming contaminated water at a range of temperatures. The ambient pressure (sea level to higher altitudes) should be unimportant because the system operates inside the processor internally at near vacuum. Depending on the temperature of the water boiled from the inside surface of the shell 110 and the temperature of the inside surface of housing 280 and other components, vapor could condense prematurely on the housing's inside surface and on other components. The premature condensing decreases system efficiency and drinkable water throughput. Any premature condensation prevents the transfer of the vapor's phase change energy from its heat of condensation to the shell and is unavailable for relinquishing and recovering the condensation energy back to the boiler because it fails to reach the shell's outside, condenser surface 113. Condensate on the housing also is not removed from the system as potable water.

Any vapor condensing away from outside surface 113 of shell 110 varies with the housing's temperature, which environmental conditions affect. Temperatures likely could be between about 60 to 110° F. (≈16 to 43° C.). If housing 280 is sufficiently warm as it could be on a warm day, little or no unwanted condensation may happen. But more vapor could condense on the unwanted surfaces at colder ambient temperatures.

A small electric heater could heat housing 280, but electric heaters may be inefficient and may need controls to maintain the housing temperature within proper ranges. Instead of using an electric heater, water from contaminated source 14 (FIG. 1) can maintain the temperature of housing 280 in a proper range. To use the water for temperature maintenance, the housing and the components in the housing mount in canister 400. See FIG. 6. Motor 274 and motor housing 275, which are outside housing 280 (FIG. 1), are outside the canister. For access to the housing, the canister may be two parts, an upper part 402 and a lower part 404. The canister's parts connect at rims 406 and 407. O-ring 408 between the two rims acts as a seal. The rims may be secured together in many ways, and the canisters could attach without rims. If rims are used, clamps or bolts around the rims could hold them together. The two halves also could be screwed together with threads at the ends of upper part 402 and lower part 404 (analogous to housing 182 and 282). The seal between the two halves 402 and 404 need not be robust because the water pressure in the canister is not elevated.

Inlet 412 connects to the source of contaminated water to fill the space between housing 280 and the canister 400. The space may be narrow, e.g., about 0.25 in (0.6 cm) wide. Filling the space requires no significant volume of water. An optional, small, motor-driven propeller 416 (FIG. 6) may circulate the water. The contaminated water used as a thermal insulator inside canister 400 may exit at outlet 410 and is redirected as the input feed water into inlet tube 140. A small pump (not shown) may circulate the water within canister 400 back into the contaminated water source to maintain a constant temperature between inlet 412 and canister 400.

Using contaminated water inside canister 400 aligns the temperature of housing 282 and other structure in housing 280 with the water temperature being processed so the housing walls and other components' temperatures are in thermal equilibrium with the input contaminated feed-water to prevent or at least limit vapor condensing on the inside of the housing or on other components.

Though using contaminated water in canister 400 instead of heated air may use less power, using heated air still may be acceptable. Instead of having inlets and outlets 410 and 412 and a propeller 416 to circulate water, a heater fan may draw in and warm air from outside the canister. The fan would circulate the air to warm entire housing 280. Controls may activate the heater fan when warming is necessary.

Figure 6:
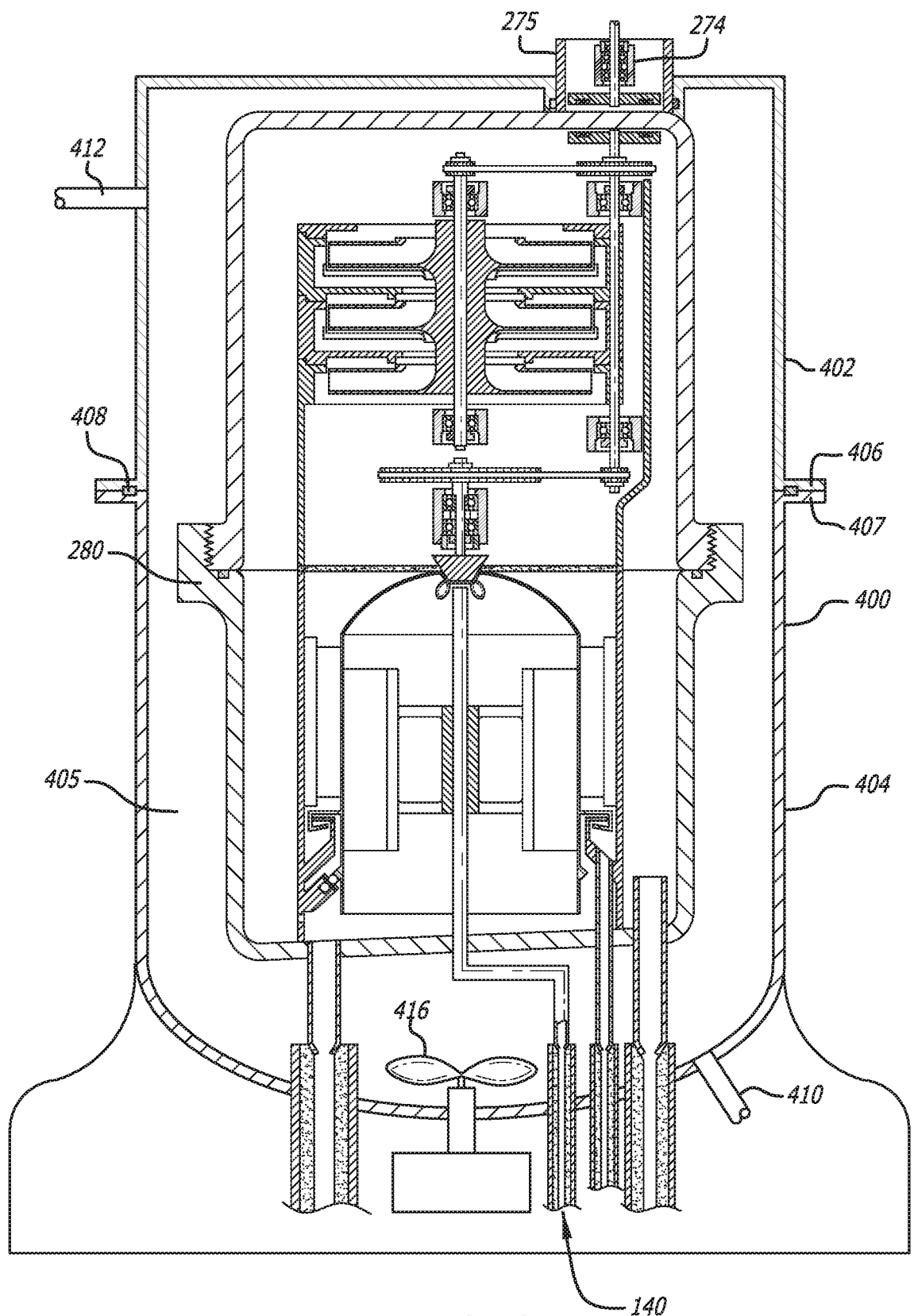
FIG. 6 is a sectional view of the water purification system, which mounts in a canister.

The FIG. 6 components for limiting condensation on the housing and other internal components would be useful with the devices in other drawings though the other figures show no such components, and the specification discussing the devices in those other drawings doesn't discuss incorporating the components.

Repair or Replacement of Housing Components: Access inside housing 280 allows cleaning, repair and maintaining the processor's internal parts. If the housing is in canister 400 (FIG. 6), the canister's two sections 402 and 404 are separated first. Then, the two housing sections 182 and 282 (FIGS. 1 and 6) are separated. An alternate simpler configuration could involve constructing a sealed cylindrical shell surrounding 182 (similar to 402) and another sealed cylindrical shell surrounding 282 (similar to 404), which is sealed at the respective flange threads 184 and 284. A tube would be necessary to connect flow between 402 to 404.

Detaching upper support insert 232 from O-ring 285 and lower support insert 234 allows removal of support insert 230 from lower housing section 182. See FIG. 1. Doing so removes blower 210 and the components tied to shaft 278. Removing angled driver 109 from depression 122 in shell 110 allows access to boiler-condenser unit 100.

Shell 110 then is lifted. Making disk 192 flexible, horizontal projection 193 and disk 195 of seal 190 (FIG. 4) are prevented from interfering with shell removal and insertion. Flexibility should not undermine their sealing functions. Wipers 170 and 176 (FIGS. 1, 2 and 6) may be delicate. During assembly/disassembly, inserting a cylindrical tool to expand external wiper 176 to provide clearance for seal 190 may be helpful while the shell is removed. Tube 140 can separate with a simple disconnect similar to 140*a* (shown in FIG. 7) when the shell is removed.

The entire boiler-condenser unit including lower support insert 234 may be removed as one unit instead of removing shell 110 only. Doing so, allows the shell and lower support insert 234 can be removed together for separate assembly/disassembly on a workbench. Doing so requires using quick disconnect fittings for freshwater outlet 179 and contaminated water inlet tube 140 from lower housing 185. Quick disconnect fittings may look similar to fittings depicted in FIG. 6.

The FIG. 7 inlet tube 140*a* may have a bend, and its bottom may rest on grommet seal 141. The top of the grommet seal and the bottom of the inlet tube are tapered. A less than 10° taper should suffice. Freshwater outlet 179 has a similar taper to engage the taper at the top of grommet seal 180. Waste outlet tube 160 has a similar taper as the water inlet tube, and the tapered end engages tapered grommet seal 171. Tube 310, which connects a vacuum pump to the processor, may require a special vacuum connector, but is depicted in FIG. 7 between 310 and 161. Because the outlet tube and vacuum tube don't extend into boiler-condenser unit 100, they may not need the structure in FIG. 7. Note FIG. 7 doesn't show the bladder arrangement of FIG. 5, which could attach to the freshwater and waste outputs.

Proper maintenance may call for removing the entire boiler-condenser unit 100 and replacing it with a new unit. Arranging the processor's parts to make replacing only boiler-condenser unit shell 110 and possibly wipers 174 and 176 may make maintenance difficult. Handling could damage the thin shell and other parts like the wipers, which could make a unit less efficient or even inoperative. Trained technicians could replace the boiler-condenser unit and lower support insert and could test systems with replaced parts to assure that the parts all function within tolerances. The entire boiler-condenser system 100 also could be removed with outer support 284 as one assembled unit, provided there are quick disconnect attachments to the inlet feed water 140 and freshwater output 179.

Boiler-condenser unit 100 and blower-compressor unit 200 are in the same housing 280 in FIG. 1. Mounting a boiler-condenser unit with a rotating shell and blower-compressor unit in separate housings may be an alternative, but conduits or connecting passages are necessary to convey vapor from the shell's boiler surface in one housing to the blower in the other housing. At least another conduit is necessary to transport the higher-pressure vapor in the other housing back to the shell's condenser surface in the first housing. A system with those conduits likely would need more energy to overcome temperature and pressure losses. It would be less efficient and produce less potable water per unit of energy input. Having two housings under vacuum also requires more seals, which are sources of potential vacuum leaks. Protecting against such leaks also requires a more robust construction, which increases the system's cost.

Figure 8:
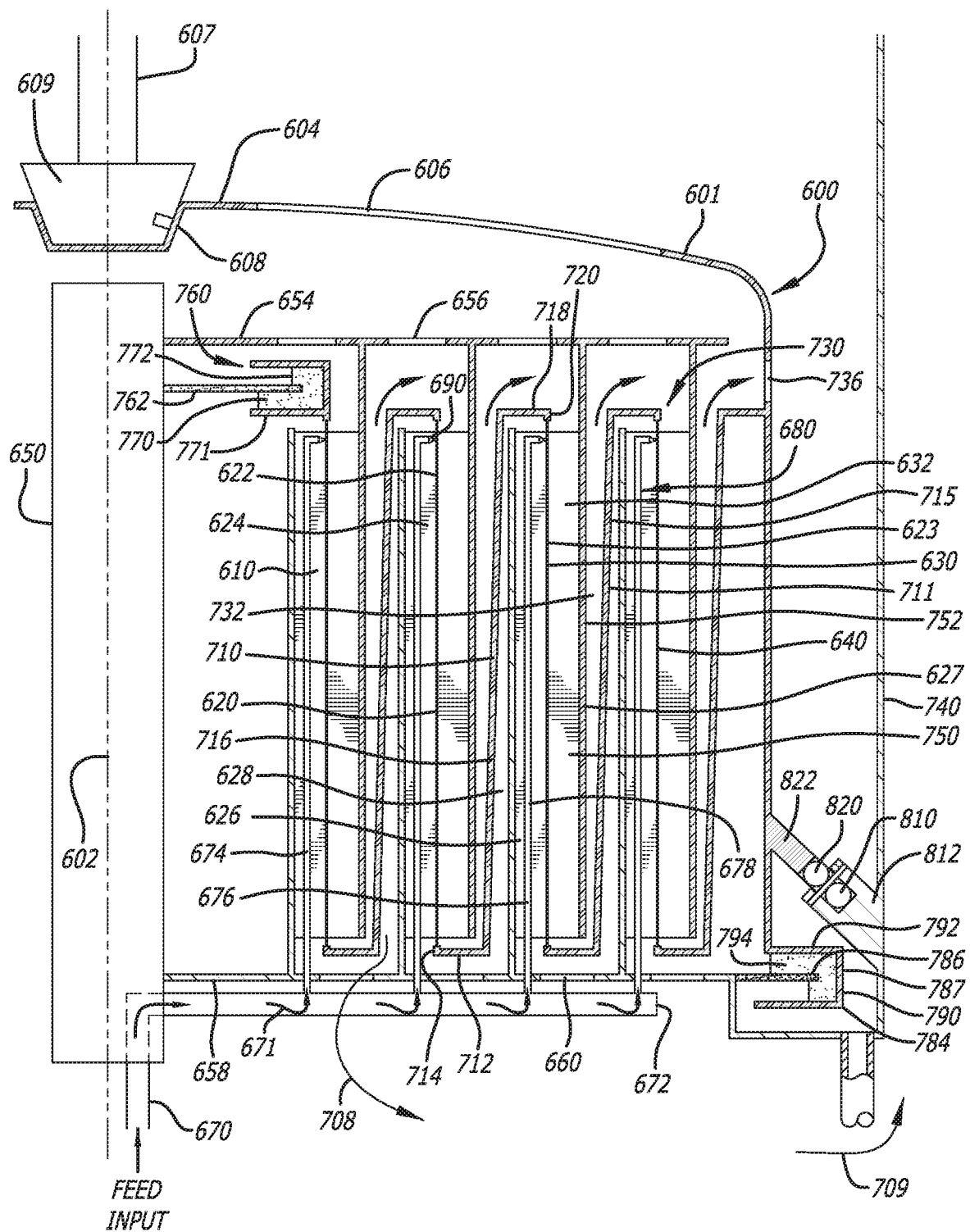
FIGS. 8 and 9 are sectional views of a multi-shell version of the boiler-condenser assembly.

Multi-shell Constructions: Applicants' 951 patent has multiple, concentric boiler-condenser shells, which also can increase system throughput in a given-size processor. FIG. 8 of this application shows components of one version of a multi-shell device. Some components of the multi-shell, boiler-condenser construction also may be used in the FIG. 1, single-shell design here.

For the multi-shell design, boiler-condenser assembly 600 includes housing 601 (FIG. 8) in a vacuum housing (not shown). Housing 601 in FIG. 8 holds four, concentric, spaced-apart boiler-condenser shells 610, 620, 630 and 640, but applicants' processor could have more or fewer shells. The shells are thin and are of a high, heat-conductive metal like aluminum.

Figure 9:
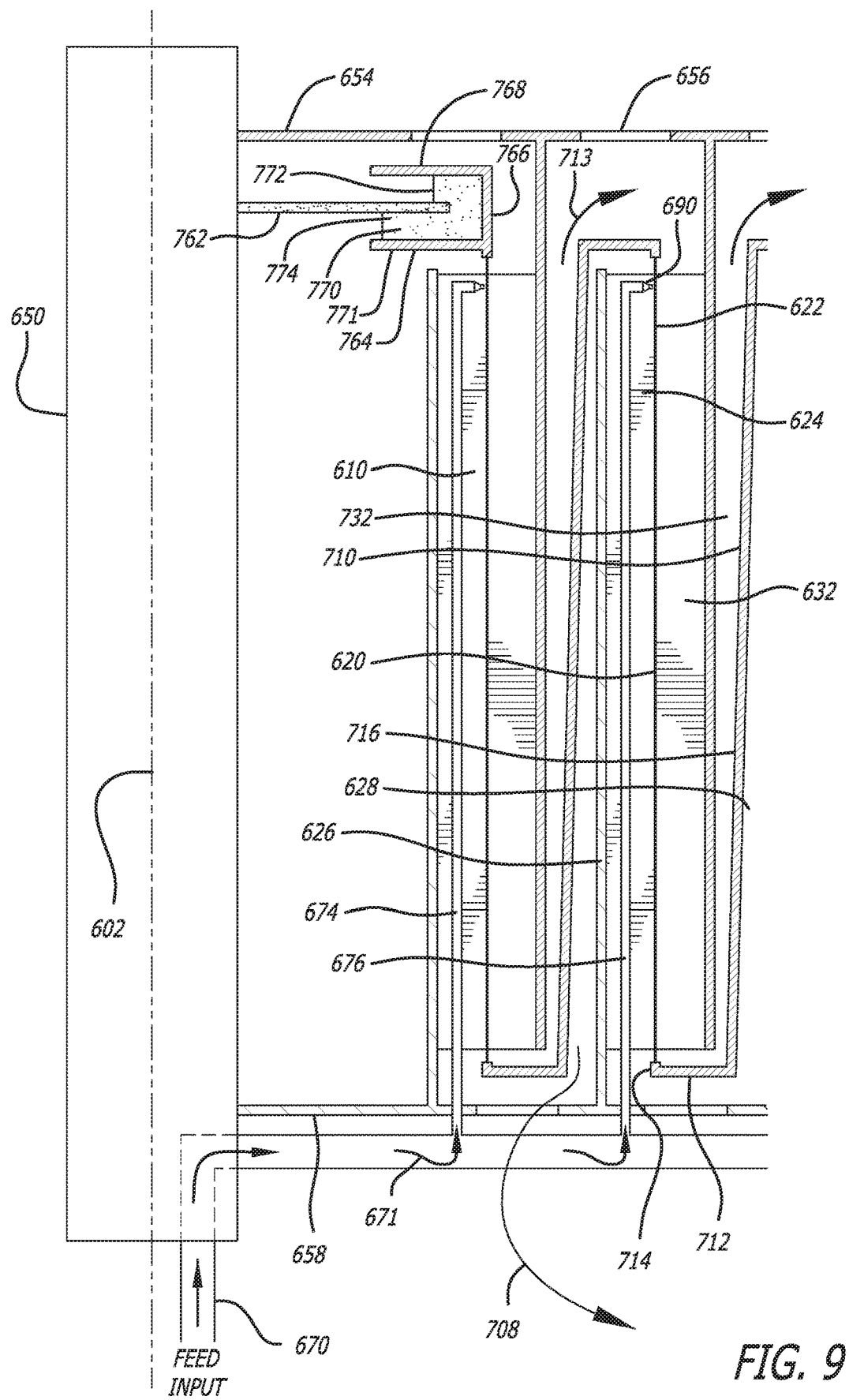

Only the first and second shells 610 and 620 from the left are visible in FIG. 9, an enlarged part of FIG. 8. The left-side surface of each boiler-condenser shell (FIG. 9) is the inner or boiler side because it faces the shells' axis of rotation 602 and is the surface on which contaminated water boils at near vacuum. The outer, right-side surface of each shell is the shell's outer or condenser side.

Figure 11:
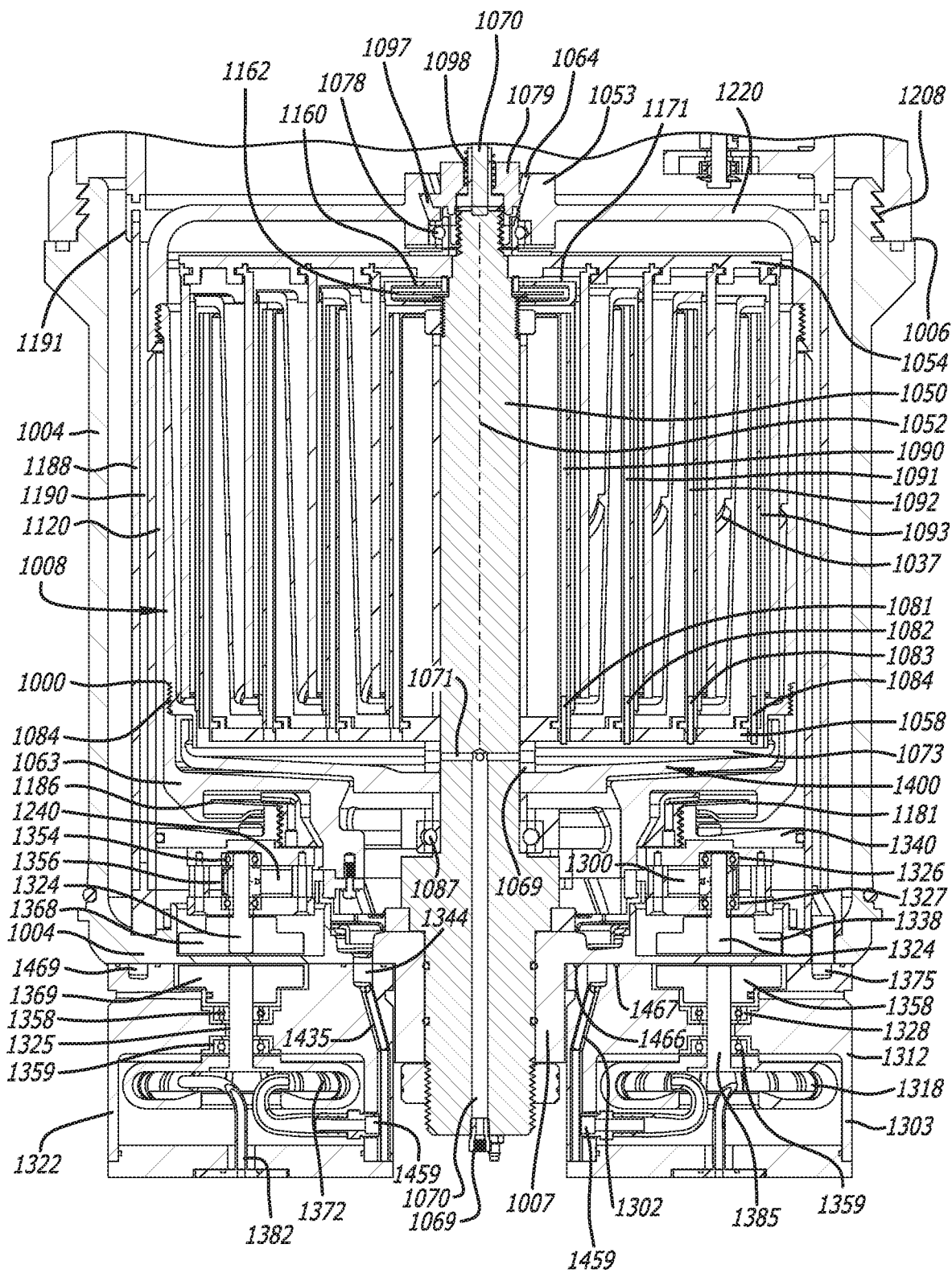
FIG. 11 is an enlarged (from FIG. 10), sectional elevation of the lower portion for the multi-shell version of the water purification system.

Applicants' FIG. 11 multi-shell water purification system differs from the system in FIG. 8, but many parts are similar. Reference to other drawings may help one appreciate features in FIG. 8. Housing 601 is not closed. Its dome 604 may have openings 606 and 736 (FIG. 8). The housing rotates about axis 602 at the center of stationary center post 650 and the center of cylindrical shells 610, 620, 630 and 640. Similar motor and gear arrangements driving the shell in FIG. 1 show parts that rotate housing 601, but FIG. 8 does not show the motor or gears. The dome includes depression 608, which receives angled driver 609. The driver may have structure securing it in the depression to provide a more positive drive to the housing.

Center post 650 is fixed to a base (not shown in FIG. 8 or 9) of the device or to the base of the vacuum housing. When the specification compares components positioned relative to the center post, it refers to components mounted closer to the center post as more proximal than components mounted distally, which are farther from the center post. Two, three, four or more stationary struts (FIGS. 8 and 9 show only two struts 654 and 658), extend outward from the center post and are fixed to the center post. Preferably, they are evenly spaced about the center post (e.g., four struts spaced 90° apart). They may be plastic or metal. The struts in FIGS. 8 and 9 may have openings 656 and 660 through which vapor or liquid can pass, but the struts' spacing also provides openings, which may lessen or do away with needing separate openings in the struts.

For simplicity and where appropriate, this description is limited to one boiler-condenser shell, here shell 620 (second to the right of center post 650 in FIG. 8 and left-most in FIG. 9). Except for their diameters, the other boiler-condenser shells and their associated components are like shell 620 and its associated parts. They function similarly but their different surface areas and g-forces process different volumes of contaminated water. The components associated with outside shell 640 may differ from the components next to the other shells because shell 640 is on the outside.

Annular framework assembly 710 includes lower ring 712, angled brace 716 and upper ring 718. The lower ring's free end 714 attaches to shell 620 (FIG. 8), and the upper ring's free end 718 attaches to adjacent shell 630 (visible in FIG. 8). The framework assemblies may be plastic or metal. Boiler chamber 628 includes the inside space between the shell, e.g., shell 630 and its framework assembly 710. The other three boiler chambers are between a shell and its framework assembly to the shell's left. The four boiler chambers in FIG. 8 are in parallel with each other so a direct flow path connection exists between the four boiler chambers, and they share the same near-vacuum boiler pressure.

The annular framework assemblies also form the condenser chambers. Framework assembly 711 (the assembly to the outside (right) of assembly 710 in FIGS. 8 and 9) forms the condensing side 730 of condensing chamber 732. As with the boiler chambers, the condenser chambers are in parallel with each other, so a connection exists between them, and they share the same condenser pressure. The pressure in the boiler chambers and the condenser chambers differ, however, by an amount $\Delta P_{BC}$ produced by the blower compressor.

The annular framework assemblies such as assemblies 710 and 711 (FIG. 8) are rigid tubular-like fixtures. Supports 626 and 627, which hold the wipers, are rigid and stationary. They neither impede the vapor's flow-path exiting boiler chambers 628 nor impede the entering vapor flow-path to the condenser chambers 732. These vapor paths are in free space entirely around housing 601.

The thin, metallic boiler-condenser shells 610, 620, 630 and 640 and non-metallic, framework assemblies such as 710 (FIG. 8) create a stiff boiler-condenser structure even without radial support struts. Having radial braces to position shells 610, 620, 630 and 640 relative to each other is possible, but depending on their location, braces could interfere with stationary wiper blades 624 and 750. Because the wipers are important, the design in FIGS. 8 and 9 relies on the framework assemblies instead of radial braces for rigidity.

Contaminated water from a source such as source 14 in FIG. 1 enters the boiler-condenser unit through feed input 670 (FIGS. 8 and 9). From there, the water flows into manifold 672 and branches into four tubes 674, 676, 678 and 680. Other sets of tubes could be spaced around the shells. Arrows 671 show the inlet water path. Each tube has one or more nozzles. For simplicity, applicants limit their description to nozzle 690 at the end of tube 676 and it associated boiler-condenser shell 620. The other boiler-condenser shells and their associated nozzles operate similarly. The pressure head of water entering the feed input must be enough for the nozzles to eject water properly toward the inner wall. This should not be a problem because the boiler chambers are at low-pressure (near vacuum), while the inlet feed 670 is at atmospheric pressure (and throttled by a needle valve). Tubes 674, 676, 678 and 680 could connect directly to feed input 670 instead of inlet water first flowing into manifold 672.

Before processing contaminated water, the vacuum housing is evacuated. As with the single shell of FIGS. 1 and 2, injecting steam at atmospheric pressure into multi-shell housing 600 before starting evacuation exchanges non-condensable air with steam so only water vapor remains when the system operates. Next, a vacuum pump (not shown in FIGS. 8 and 9) evacuates the steam and any remaining air from the vacuum housing. The initial evacuation normally occurs while the boiler-condenser assembly remains stationary and the system is not operating.

Liquid-vapor seals between the boiler and condenser are like seal 190 in FIGS. 1, 2 and 4 and are described in more detail below. The seals, which fill automatically when the inlet water is flowing, depend on rotation of boiler-condenser assembly 601 for sealing. Air and vapor inside the boiler-condenser assembly pass in both directions through the seals during the initial evacuation when the boiler-condenser assembly is stationary and the inlet feed-water is not flowing. A direct, uniform-pressure connection between the boiler chambers and the condenser chambers also exists during initial evacuation.

The vacuum pump is turned off after initial evacuation to maintain a constant vapor-pressure condition, and to prevent it from being a power drain. After evacuation, vapor pressure equilibrium is established. The vacuum pump may run intermittently when the internal processor pressure exceeds operational conditions based on the inlet vapor saturation temperature or unacceptable buildup of trapped non-condensable gases ($O_2$, $N_2$, Ar, $CO_2$, etc.). The system also may require occasional, later evacuations to overcome any small vacuum leaks.

The normal startup procedure begins with:
1) Starting the vacuum pump to evacuate the processor below atmospheric conditions.
2) Closing the valve between vacuum pump and processor followed by vacuum pump shutdown.
3) Starting blower rotation and raising to operational speed
4) Starting boiler-condenser assembly rotation up to operational speed (may occur when blower starts)
5) Turning on output fresh and waste pumps (described below) and
6) Opening contaminated water inlet to desired flow conditions.

After the inlet feed water flows into the boiler-condenser assembly, water flows through tube 676 and is distributed to feed each boiler shell including through nozzle 690 (FIGS. 8 and 9). The water reaches inner or boiler surface 622 of shell 620 and the other shells' inner surfaces. Centrifugal force produced by rotation of boiler-condenser housing 601 and its shells causes the water to form thin films on the boiler surfaces. In addition, gravity causes the water to flow downward from the nozzles at the top of each shell. Spacing nozzles vertically along the tube may provide water along more of the boiler surface more quickly and evenly.

Water begins near-vacuum boiling, and the resultant vapor travels to the blower. FIGS. 8 and 9 do not show the blower, but it may be like blower 200 in FIG. 1, blower 1210 in FIG. 10 and other blowers in other figures. The descriptions for other figures discuss the vapor's paths to the blowers.

Optional wipers like wiper 624 cooperate with the centrifugal force to help spread the contaminated water along the shells' inner surfaces, including shell 620's boiler surface 622 (FIGS. 8 and 9). The boiler wiper attaches to the cylindrical boiler wiper support 626, which extends upward from strut 658. Like wipers 174 and 176 in FIGS. 1 and 2, the boiler wipers 624 in FIGS. 8 and 9 are formed of low-friction material like Teflon® or other materials with a Teflon or other low-friction material coating to decrease friction.

External condenser wipers may contact the condenser-outside surfaces. Condenser wiper 632 (FIG. 8) mounts on cylindrical support 627, which connect to strut 654. Other wipers (not numbered) also mount on similar supports. The condenser wipers contact the condenser surfaces like surface 623 of each shell and remove condensed water that centrifugal force has not yet removed from the shell's outside surface. Leaving a relatively clean condenser surface allows vapor to contact more of the colder, metal surface instead of encountering earlier deposited condensate.

The connection of cylindrical boiler wiper support 626 to strut 658, the connection of cylindrical condenser wiper support 627 to strut 654 and the connection of the struts to center post 650 creates rigid assemblies. The parts in FIGS. 17, 18 and 19, which are discussed below, may differ from the parts in FIGS. 8 and 9, but the drawings show how the assemblies would be rigid.

FIG. 8 shows only one boiler wiper and one condenser wiper for each shell, and each wiper extends almost the entire height of its shell. The system could have many wipers on spaced-apart supports. Each single wiper also could be divided into separate wipers. With proper wiper positioning, at least one wiper contacts the shell's entire inside surface as the shell rotates. Each wiper also could be angled to feed water to the next wiper. The wipers also may overlap. A single curved or spiraled wiper along each shell's surface could also be used.

Operation: After the processor is evacuated, contaminated water flows from a source through tube 676 and out nozzle 690. The water is distributed to feed each boiler shell including boiler surface 622 of boiler-condenser shell 620 (FIGS. 8 and 9). The surface is under near vacuum at about 0.5 psia. The thin film of contaminated water on the boiler-condenser's inside wall boils at the low pressure. Framework assemblies such as assembly 710 direct the vapor from the boiling chambers (e.g., chamber 628) toward arrows 708 (near the bottom of FIG. 8). The vapor then follows the path of arrow 709 upward along the outside of support insert 740. The support insert is spaced from the vacuum chamber housing's inside wall (not shown).

Vapor from the boiler-inner side 622 of shell 620 reaches the blower or compressor unit (not shown in FIG. 8) after traveling upward along the outside of support insert 740. The blower compresses the vapor. The blower, which mounts above the FIG. 8 components, may be like blower 200 in FIG. 1. The blower used with the multiple-shell version of FIG. 8 (and others) may have a capacity larger than blower 200 (FIG. 1), which only supplies compressed vapor to a single shell. Structure that causes shaft 607, angled driver 609 and housing 601 to rotate may connect operably to the structure that rotates the blower.

Following compression in the blower, the vapor has a slightly increased pressure $\Delta p$, which increases the vapor's temperature $\Delta T$. Typical pressure rises $\Delta p$ may be 1 to 4 inches ($H_2O$) ($\approx 0.04$ psia to 0.15 psia (0.25 kPa to 1.0 kPa)) with corresponding temperature rises $\Delta T$ of about 2° F. to 9° F. ($\approx 1$° C. to 5° C.) under normal operating conditions. Interaction of the blower components acting on the vapor molecules also raises the vapor's temperature slightly.

The vapor from the blower at its elevated temperature and pressure passes through openings 606 in the dome and through openings, e.g., 656, or spaces between struts 654.

The condenser surface is colder than the vapor because the vapor's temperature rises 2° F. to 9° F. as its pressure increases through the blower. The condenser surface also is colder than the vapor due to the contaminated water's phase change from liquid to vapor. The energy from the phase change transfers heat from the shell's outside surface to the contaminated water, which causes boiling and decreases each shell's temperature (except for the continuous replenishing of the constant temperature inlet feed-water).

Centrifugal force caused by shell rotation may expel now-liquid water from the condenser surface 623 of shell 620 (FIG. 8), but surface tension may hold some or most condensate on the condenser surface. Vapor cannot contact the condenser surface directly where condensate remains, but having the vapor contact the condenser surface is important for vapor to transfer its heat of condensation to the condenser shell enough to vaporize the boiler side. Removing condensate quickly improves the condensation's heat transfer coefficient and overall thermodynamic efficiency. Therefore, applicants use wipers 632 mounted on condenser wiper bracket 627 to throw condensate off the condenser surface.

Continuous thinning of boiling fluid from the rotational induced g-forces on the boiling fluid as enhanced by the wiper blades probably boosts the boiling heat transfer coefficient by an order of magnitude or more over conventional boiling distillation. Likewise, the centrifugal force throwing off condensate as enhanced by condenser wipers helps create freshly exposed metal surfaces for condensation. That also should boost the condenser heat-transfer coefficient by an order of magnitude or more. Applicants' system should have heat transfer values between 2,000 to 6,000

$$\frac{Btu}{ft^2 \cdot hr \cdot °F}$$

($\approx 1.1 \times 10^4$ to $3.4 \times 10^4$ $m^{2°}$ C.) versus values one-tenth or less for conventional boiler-condenser systems.

Condensate thrown off condenser surface 623 by centrifugal force or by external wiper 632 contacts framework assembly 711, which is to the right or outside, condenser surface 623 in FIG. 8. Because the framework assembly rotates with housing 601 and many internal parts including the shell, the framework assemblies urge the condensate upward and over the framework assemblies. See arrows 717 in FIGS. 8 and 9. The water then is thrown through openings 736 in housing 601 (right side of FIG. 8).

Changing the phase of vapor into liquid water on the condenser surface like surface 623 transfers the thermal energy by the heat of condensation from the condenser surface, which transfers heat to the shells like shell 620. Condensation recovers most of the heat energy that caused water to boil from boiling surface 622. The blower (not shown in FIG. 8) produces this heat energy in vapor compression energy and some vapor temperature rise. During condensation, this energy is transferred to the shell and acts as the only energy source to cause boiling on the shells' inside surface. The vapor temperature increase due to the blower causes the heat necessary to drive the boiling on boiling surface 622. The system recovers energy used to boil the contaminated water minus entropy and thermodynamic inefficiency losses of the compressor and the small excess heat energy ($\Delta T$) required to drive the process.

At least some contaminated water that reaches boiler surfaces, like surface 622 (FIG. 8), remains liquid and doesn't boil. It becomes wastewater with contaminants from the input contaminated water. The wastewater flows downward along the boiling wall surface until it reaches the bottom of the shell 620. Centrifugal force on exit and gravity direct the wastewater to a common waste exit (not shown in FIG. 8 but could be like the waste exit in FIG. 1).

Seals: Seals must hold the pressure differentials between the compressed vapor from the blower in the condensing chambers like chamber 732 and the pressure in the boiling chambers like chamber 628. The sealing requirements between each fixed boiler and condenser chamber wall are low pressure, so the sealing requirements during fabrication and assembly for each fixed chamber are not stringent. Under normal operation, the pressure differential $\Delta p$ may be about 0.04 psia to 0.15 psia. Two rotary seals, which use principles like seal 190 in FIG. 4 uses, hold that pressure differential.

First seal 760 (upper-left portion of FIG. 8) includes disk 762 fixed to center post 650. The disk extends into annular channel member 771 (U-shaped in cross-section). The annular channel member attaches near the top of shell 610 and rotates with the shell. It holds fluid like contaminated water 770. Channels through center post 650 and a tube from the channel to the annular channel member of the seal (not shown) may provide the contaminated water for the seals. The pressure differential ($\Delta p$) between vapor boiled from boiler surfaces like surface 622 and the compressed vapor from the blower exerts different pressure forces on the fluid in the rotary seal. The pressure difference creates a differential height column in the rotary seal's channel member 771. In FIG. 8, the pressure on fluid 770 above disk 762 exceeds the pressure below the disk due to pressure forces from the blower. The pressure difference displaces the column of fluid 770, but the channel member rotates during system operation. Centrifugal force acting on the fluid above and below disk 762 keeps enough fluid above and below the disk to prevent vapor flow through the seal.

The other rotary seal, seal 784, operates on similar principles. Disk 786 extends outward from strut 658 and into annular channel member 787 at the bottom of housing 601 (right side of FIG. 8). Liquid 794 in the annular channel member above disk is subjected to lower-pressure vapor from the boiler side of the shells like boiler side 622 of shell 620. Higher-pressure vapor from the blower acts on the liquid below the disk so the fluid assumes a position like the position of fluid 794 in FIG. 8. Housing rotation produces centrifugal force, which urges the liquid above and below disk 786 to hold the liquid in the channel member. The liquid seals higher-pressure vapor from the lower-pressure vapor. The effective radius of seal 784 is greater than the radius of seal 760 because seal 784 is farther from center post 650 so g-forces on the liquid in seal 784 are greater than the g-forces on the liquid in seal 760.

A trickle of water from inlet 670 also feeds the two liquid-vapor seals 760 and 784 simultaneously Channels through center post 650 and tubes from the channel to the annular channel member of each seal (not shown) may provide the contaminated water for the seals. The tubes can be controlled to allow water flow only when the seals need the water. There are other ways to fill the seals' channels from a separately controlled filler tube. Other options include pre-filling the annular channels with other fluids or grease, which remains in the seals. Using the trickle of water arrangement, when the channels are full, boiler-condenser assembly rotation automatically activates them. Any water exceeding the two seals' capacity overflows into the boiler chamber.

The vapor pressure differential that the seal can block depends on the fluid density ($\rho$, the fluid height differential ($\Delta r$) on opposite sides of stationary disks 762 or 786 and the g-force applied to the fluid in the channel. The g-force is a function of the rotational speed ($\omega$) and the radius from the channel to axis of rotation 602. Proper design of annular channel member 771 provides flexibility over the allowable pressure differences ($\Delta p$) and operating rotational speeds ($\omega$) required to achieve a rotating vapor seal.

Support for the Boiler-Condenser Housing: Housing 601 and its internal boiler-condenser assemblies rotate about axis of rotation 602 of center post 650. See FIG. 8. Bearings 810, which mount on angled support 812 on support insert 740, allow rotation of housing 601. The angled supports may be at a 45° orientation. Three such bearings and supports spaced 120° apart may be used. Bearings 810 interact with bearings 820, which mount on angled support ring 822. The support ring also may slant at 45° to be complementary to angled support 812. The bearings support the housing in the FIG. 8 position and permit its rotation.

Housing 601 and its internal boiler-condenser assembly (including the boiler-condenser shell, bearings, seals, wipers, inlet feeds, and central axis) may be removable as a unit from its FIG. 8 operating orientation for replacement or maintenance.

The system also could use a housing that accepts a one, two or more boiler-condenser shells and components. Those variations could provide differing amounts of potable water throughputs. The compressor chosen for different numbers of shells could operate over a range of operating conditions, i.e., speeds of rotation to accommodate the increased vapor flow rates.

Figure 10:
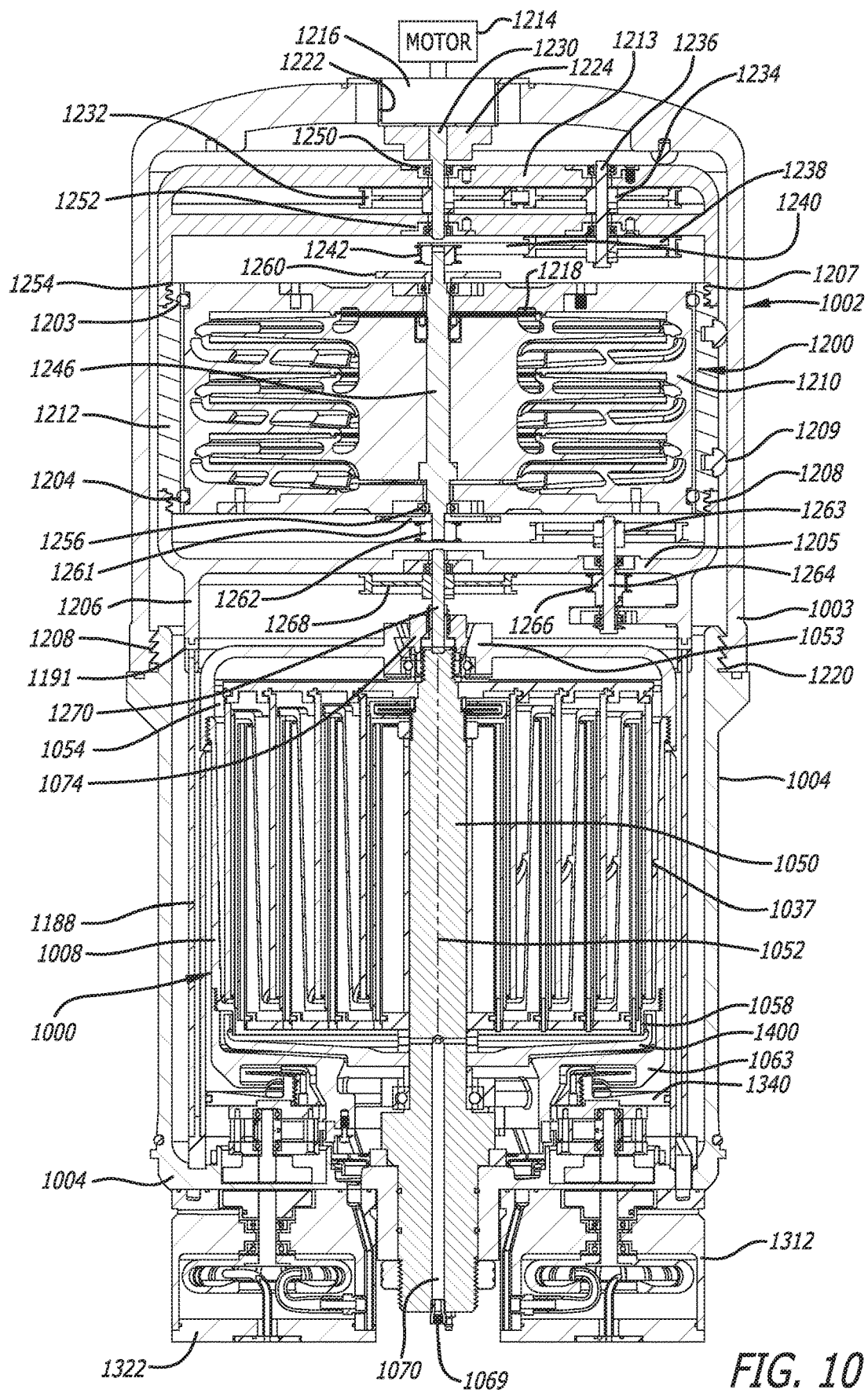
FIG. 10 is a sectional elevation of the multi-shell version of the water purification system.

Multiple-Shell Device Shown in FIGS. 10 through 28: FIGS. 10 and 11 and details in FIGS. 12-28 show a multi-shell boiler-condenser design joined with the blower and its associated structure.

Vacuum Housing: Boiler-condenser unit 1000 mounts in vacuum housing 1002. The vacuum housing may have a top or upper part 1003 and bottom or lower part 1004 (FIG. 11), which attach and seal together. Threaded attachment 1208 may be used, and various sealing parts like O-rings 1006 may seat at the attachment. Users can gain access to the boiler-condenser assembly by separating the housing's top and bottom. The vacuum housing may have a diameter of about 1 foot ($\approx$30 cm), and applicants' device of that size should produce 40 gal. ($\approx$150 liters) daily. Other sizes are possible.

The upper part 1003 and lower part 1004 of vacuum housing 1002 are of equivalent size in FIG. 10, but one could be taller than the other. The vacuum housing may be plastic, metal or glass, but the material at its chosen thickness should be strong enough to resist collapsing from outside, atmospheric pressure when the inside the housing is it at its working pressure of about 0.5 psia. Plastic's lower cost and lighter weight may make it preferable. The housing could be glass or transparent plastic to let users see inside the housing. The device could have a sealable opening (not shown) through the vacuum housing to allow cabling for system instrumentation especially for prototypes. Wireless monitoring also is acceptable.

Blower-Compressor Unit: Blower unit 1200 includes a multi-stage blower 1210 mounted in the upper portion of blowing housing 1212. See FIG. 10. Motor 1214 (shown schematically in FIG. 10) mounts outside vacuum housing 1002 where it can attach to an outside source of electric power (not shown). Small electric motors like motor 1214 are very efficient and waste little power. Motor 1214 mounts in the center of the upper portion of blowing housing 1212 above dome 1220. See FIGS. 10 and 11. The motor's connection to other parts of the system affects its location choice. Compare the center location in FIG. 10 with the position of motor 274 in FIG. 1. The motor uses magnetic couplers to rotate parts inside the vacuum housing. It rotates upper magnetic coupler 1216 in cutout 1222, which rotates lower magnetic coupler 1224.

The motor could mount inside vacuum housing 1002. Instead of the using a transmission like that described in these paragraphs, the device could use separate, small electric motors adjacent the parts that move or rotate. The motors can be protected from internal conditions, but separate motors mounted inside the housing still need connections to electricity. Using batteries may be feasible subject to the time and expensing to change them. Rechargeable batteries using wireless charging could avoid having wires through the vacuum housing, but wireless-charged rechargeable batteries are costly.

Lower magnetic coupler 1224 rotates shaft 1230 (FIG. 10), which rotates gear 1232. The gears drive associated gears with belts or chains. One also can use pulleys and associated drive belts, which transfer rotation by friction, gear-to-gear transmission and other mechanisms that transfer rotation among parts. Gear 1232 rotates gear 1234 through a drive belt (not visible in FIG. 10). The latter gear connects to and rotates shaft 1236, which rotates gear 1238. Gear 1238 rotates gear 1242 through drive belt 1240. Gear 1242 is fixed to blower drive shaft 1246, which rotates the parts of blower 1210. Bearings like bearing 1250, 1252, 1254 and 1256 support shafts 1230 and 1246 for rotation. Other bearings may support other rotating parts. Flanges 1260 and 1261 (FIG. 10) act as balance wheel zones and support drive shaft 1246 and hold the blower parts in place.

The gears or pulleys are sized to act as a transmission for rotating the blower at speeds that may differ from the speed of motor 1214. Choosing the gears' diameters affects their mechanical advantage and the blower's speed. Gears 1232, 1234, 1238 and 1242, which are not necessarily to scale in FIG. 10, have diameters causing blower 1210 to rotate much faster than shell 1010 rotates, e.g., 8,000 rpm for the blower versus 250 rpm for the shell. Choosing the gears' diameters accommodates the speed change from the blower's velocity to the boiler-condenser housing velocity. Using different diameter gears allows modifications to the components' rotational velocities to account for the blower's specifications, the shells' diameters, the processing parameters and other factors.

Rotation of blower shaft 1246 (FIG. 10) also rotates gear 1262, which, through a connecting belt (not shown), rotates gear 1263 on shaft 1264. Rotation of shaft 1264 rotates gear 1266 to rotate gear 1268. That gear attaches to and rotates intermediate shaft 1270 (FIG. 11). Rotation of shaft 1270 and gear 1268 rotates boiler-condenser's dome 1220 and the rest of boiler-condenser housing 1008. Bearing 1078 (FIG. 11) limits rotating friction.

Boiler-Condenser Unit: Boiler-condenser assembly 1000 has three major subassemblies that nest together. See FIG. 17. Nozzle-wiper support assembly 1015 (FIGS. 12 and 17) is at the lower part of FIG. 17. That assembly nests within shell subassembly 1119. Condenser-wiper subassembly 1154 nests in the shell subassembly. Dome 1220 is at the top of the boiler-condenser assembly and lower bearing support 1063 is near the bottom.

Boiler-condenser assembly 1000 mounts in boiler-condenser housing 1008. See FIGS. 10, 11 and others. The boiler-condenser assembly holds one or more concentric, spaced-apart boiler-condenser shells. The boiler-condenser shells may be like those in FIG. 8, but structure with the shells in FIGS. 1-8 may differ. FIGS. 10, 11, 12, 13, 15, 17 and 18 show four shells 1010, 1020, 1030 and 1040, but the device could have more or fewer shells subject to the diameter of boiler-condenser housing 1008, the shells' spacing and the size of vacuum housing 1002. The shells are thin, high, heat-conductive metal like aluminum, but other materials having high thermal conductivity may be acceptable. Because the shells are so thin in cross-section compared to other components' thickness, they appear as lines in the drawings including FIGS. 10 and 11, but see two shells 1020 and 1030, which FIG. 14 enlarges.

The rotating elements of boiler-condenser assembly 1000 include shells 1010, 1020, 1030 and 1040 and framework assemblies, which support the shells. Two such as framework assemblies are assemblies 1110 and 1111. The shells and framework assemblies revolve about vertical axis 1052 through center post 1050. Wiper cylinders 1016, 1026, 1036 and 1046 (FIG. 19) are stationary. They support tubes 1090, 1091, 1092 and 1093 for directing contaminated water to the shells' boiling surfaces. The wiper cylinders for the boiler surfaces also support optional boiler wipers. Condenser wiper cylinders 1156, 1157, 1158 and 1159 (FIG. 19), which support condenser wipers, also are stationary. See also FIGS. 12 and 13. These stationary parts are fixed relative to the center post or to parts fixed to the center post.

Figure 12:
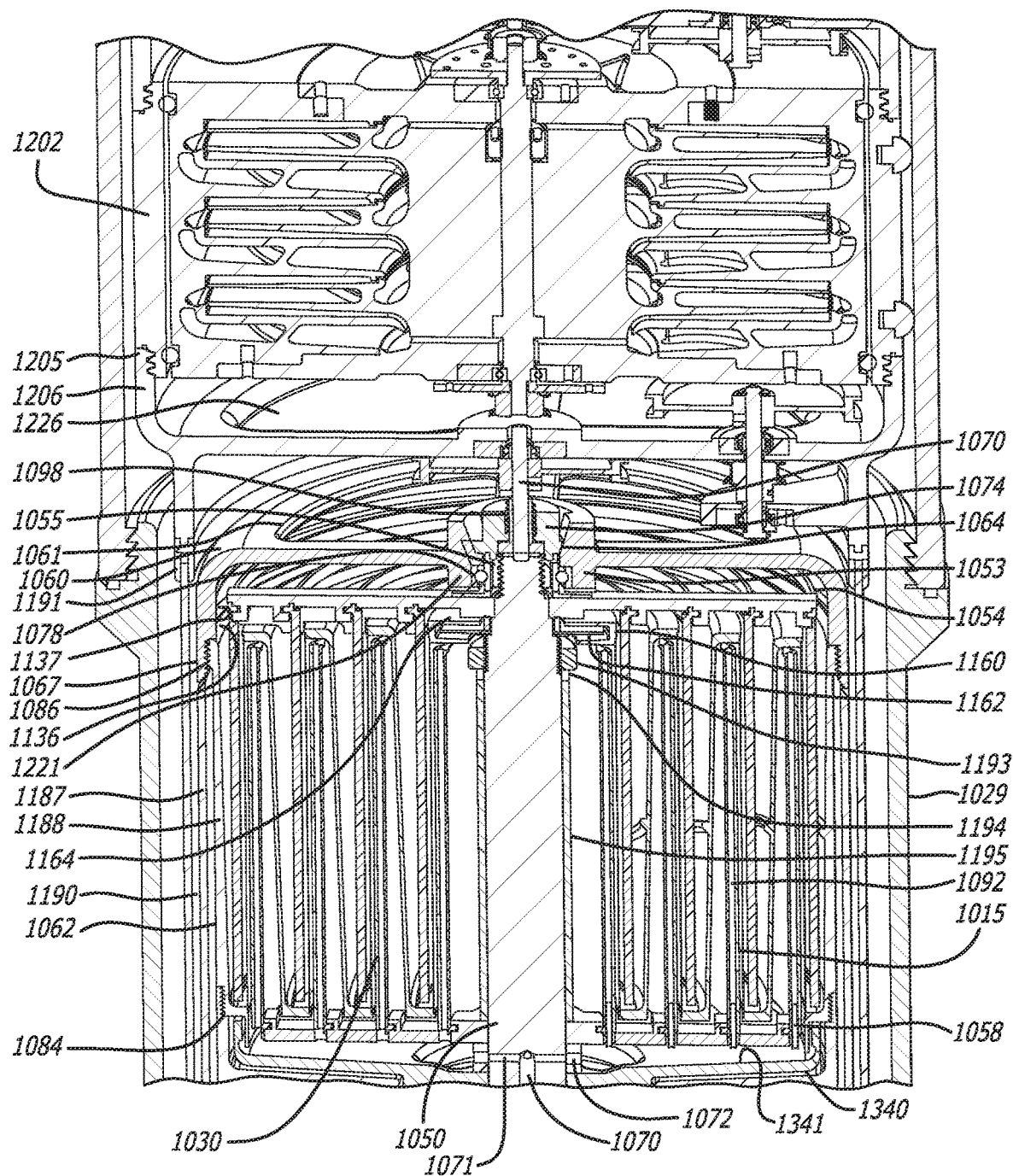
FIG. 12 is cutaway, perspective drawing of the boiler-condenser shells and associated structure of the multi-shell version.
Figure 17:
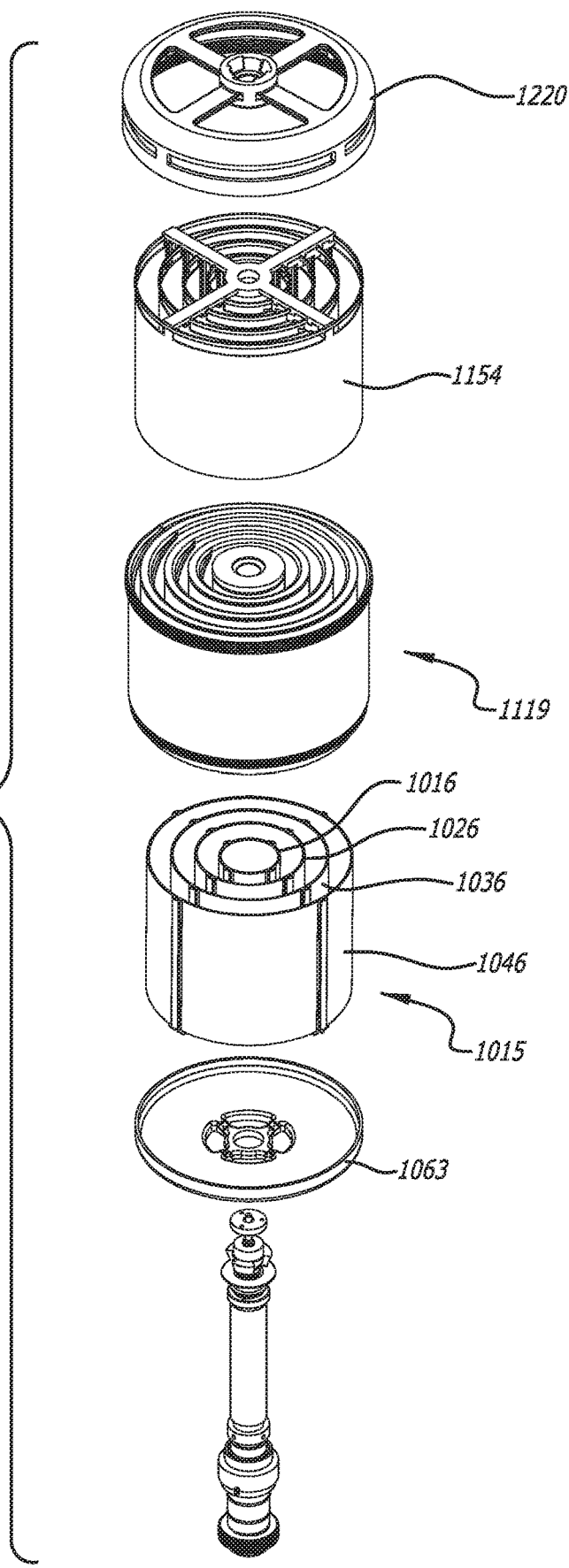
FIG. 17 is an exploded view of parts for the boiler-condenser assembly, including the boiler and condenser wiper assemblies.

Upper nut 1079 (FIG. 11) pushes down on dome 1220, which secures bearing 1078 between the outside of the nut and dome's upward projection 1053. The nut also pushes down on upper struts 1054 (FIGS. 11, 12 and 20) to secure the struts and condenser wiper assembly to the center post. Intermediate nut 1055 is threaded to center post 1050 and pushes down on bushings 1194 and 1195 (FIG. 12). The latter engages struts 1058 of nozzle-wiper support assembly 1015 (FIGS. 12 and 17). The upper and intermediate nuts and their engagement with the condenser wiper assembly and nozzle-wiper support assembly make boiler-condenser unit 1000 rigid.

Figure 13:
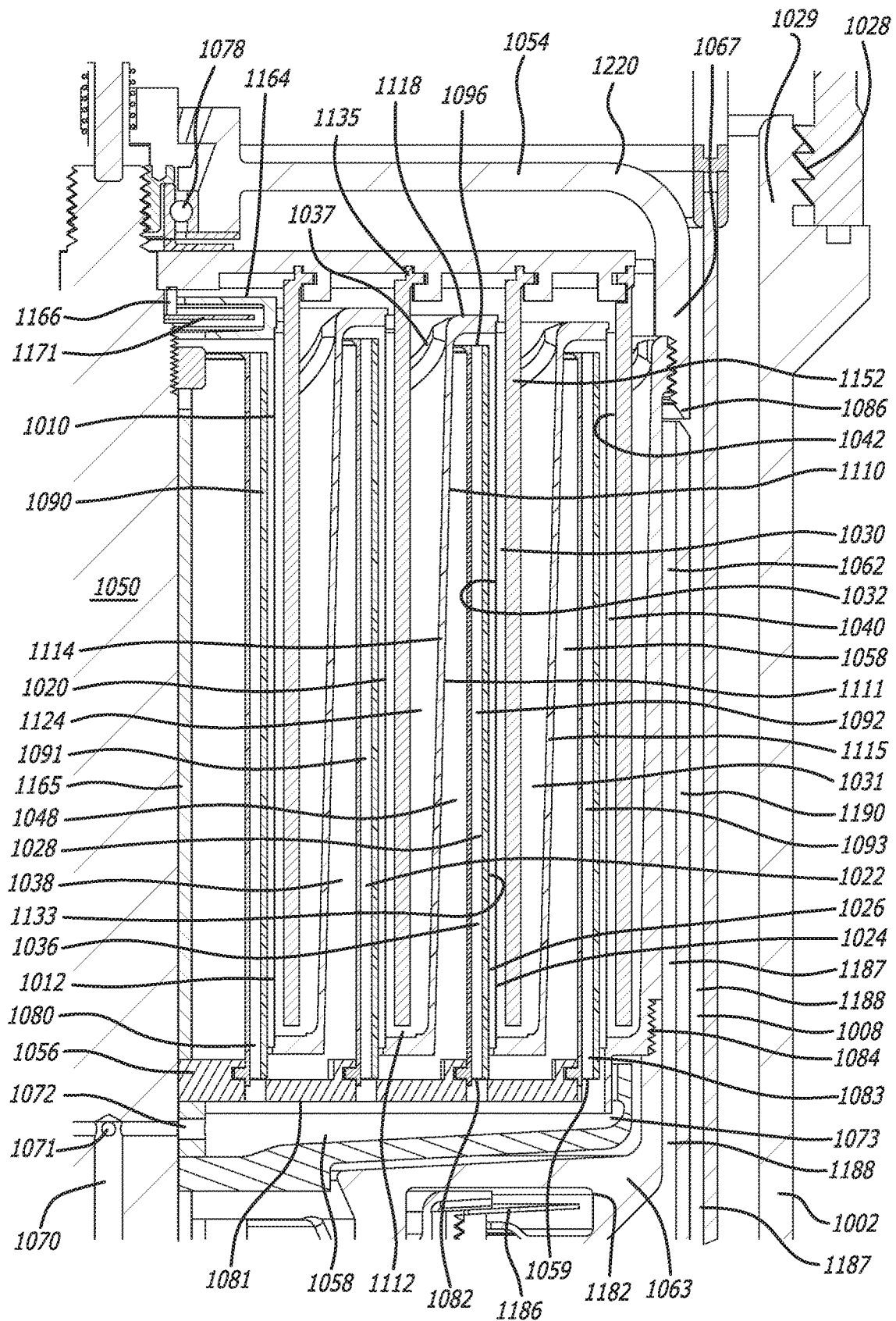
FIG. 13 is a sectional elevation of one-half of the boiler-condenser assembly of the water purification system.
Figure 14:
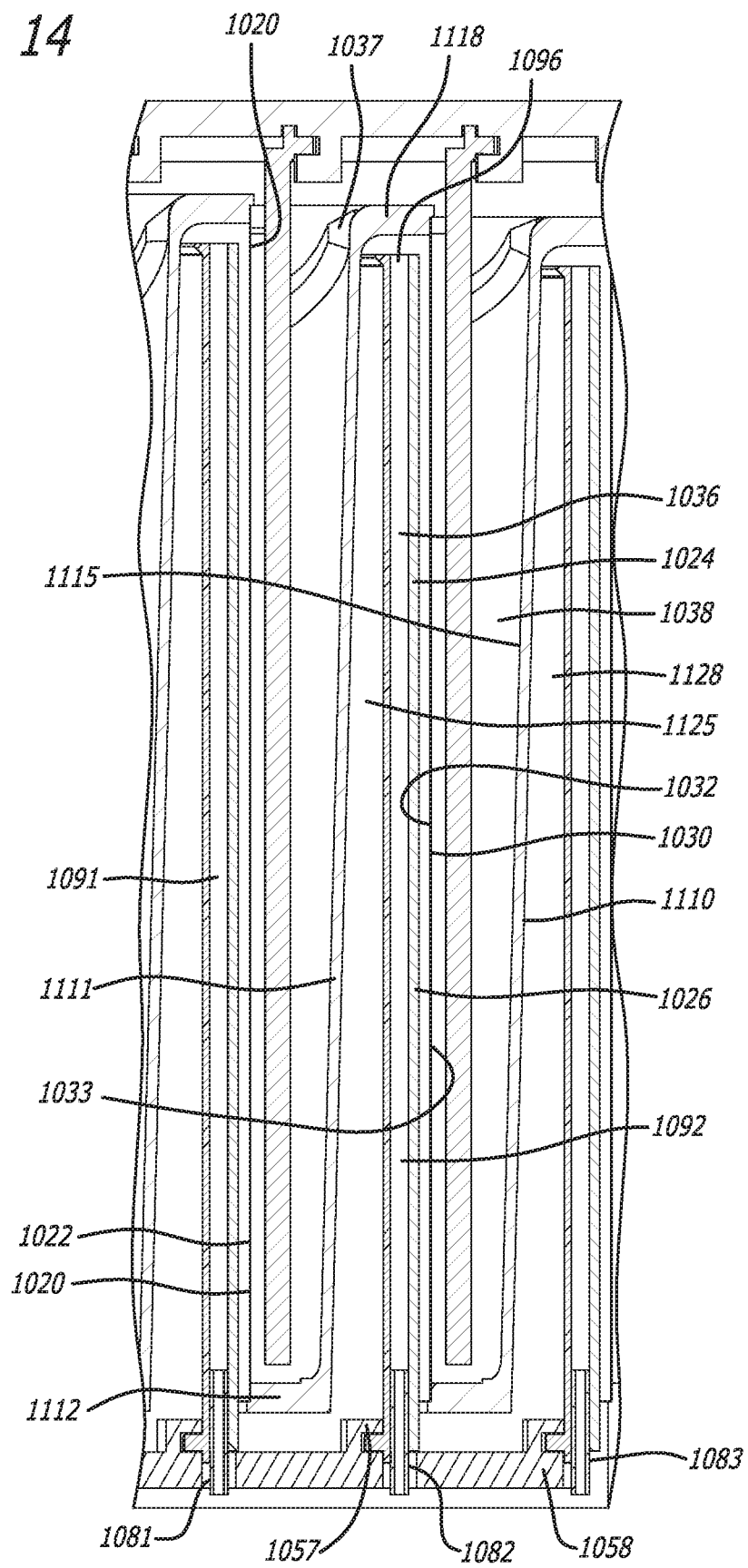
FIG. 14 is an enlarged view of a portion of FIG. 13.

The Shells' Boiling Surfaces: In figures such as FIG. 13, which show only the boiler-condenser assembly's right side (in cross-section), the left-side surface of each boiler-condenser shell faces the axis of rotation 1052 at the center of stationary center post 1050 and is the shell's inner or boiler side. For figures that show at least part of the shells to the left of the axis of rotation, the right side of each visible shell is the inner or boiler side. In FIG. 14, surface 1022 is shell 1020's inner, boiler surface. The other shells have corresponding inner boiler surfaces. The right side or outside surface 1033 of shell 1020 (FIG. 14) is the shell's outer or condenser side. The other shells have corresponding condenser sides, which may not be numbered.

Boiler-condenser housing 1008 for mounting boiler-condenser assembly 1000 includes cylindrical sidewall 1062, dome 1220 (FIGS. 10, 11, 13 and 15) and bearing support 1063. The bearing support acts as a base (FIGS. 10, 11, 13 and 24). The cylindrical sidewall and bearing support are threaded together at threads 1084 or are otherwise attached. See also FIGS. 16 and 24. The dome curves downward, and its threads engage sidewall 1062. See threads 1086 in FIG. 12. the cylindrical sidewall and the dome or bearing support may join using other connections. The shapes of the dome and bearing support also may vary.

Figure 24:
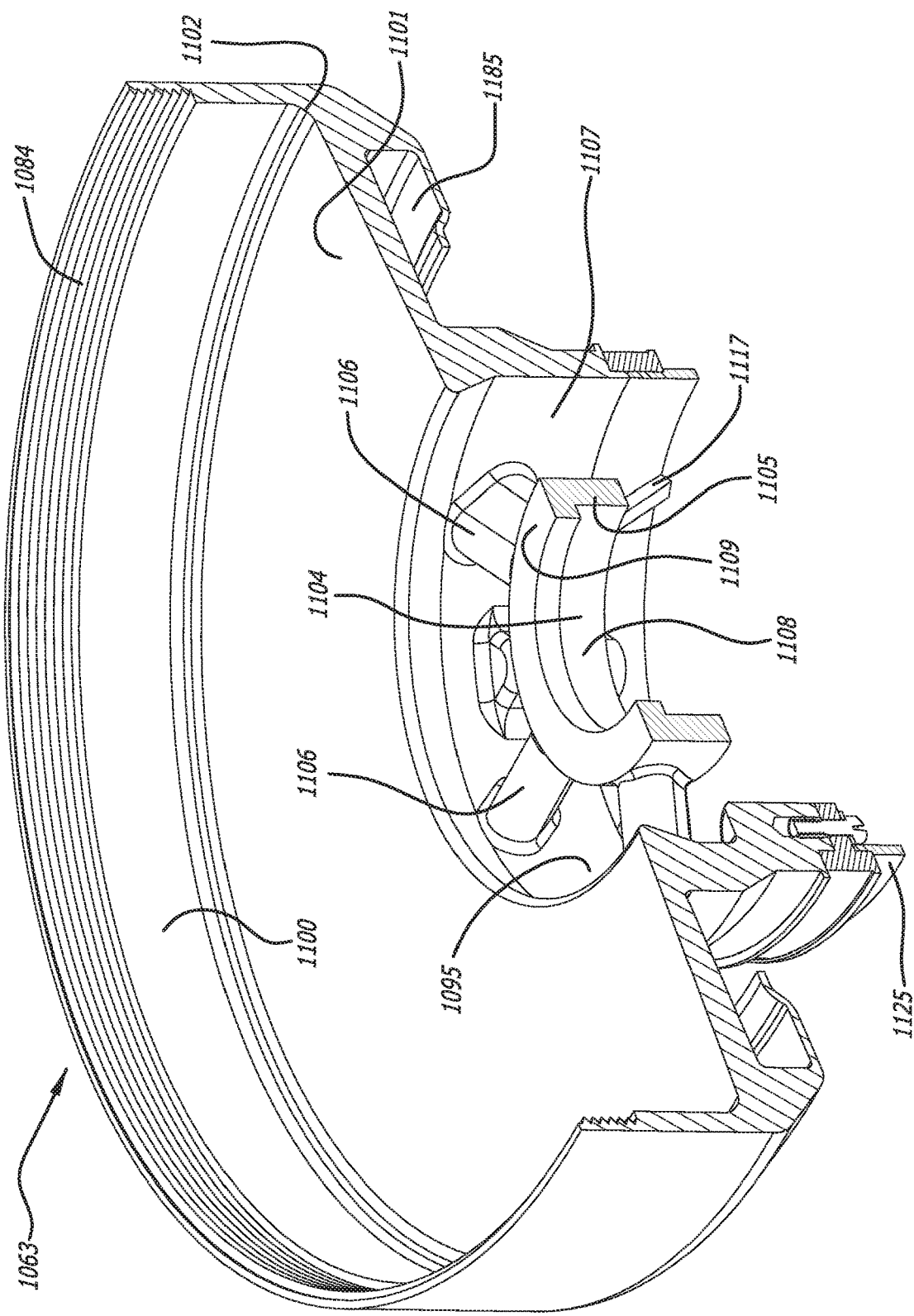
FIG. 24 is a cutaway perspective view of a bearing support used in applicants' boiler-condenser assembly.

Boiler-condenser housing 1008 is not sealed. Openings 1061 in dome 1220 (FIG. 12) may occupy much or most of the dome's area. The openings allow vapor from blower unit 1200 to enter boiler-condenser housing 1008, and the large opening limit any pressure drop. Bearing support 1063 also is open near its center 1095 (FIG. 24). The flows of liquids and vapors are discussed below.

Driver 1074 mounts at the bottom of shaft 1270 (FIGS. 10 and 11). The driver rotates boiler-condenser housing 1008 with the housing's cylindrical shells 1010, 1020, 1030 and 1040 about axis 1052. The driver engages depression 1064 in fitting 1053 of dome 1220 (FIGS. 11 and 12). The latter shows a threaded connection. Spring 1098 may urge driver 1074 into fitting 1053. Instead of a threaded connection, the driver and depression may have other structure to engage each other. The driver's structure engages indentions or an arrangement associated with the fitting. Noncircular shapes, splines and grooves or any other attachment also may provide positive drive for the dome and housing to prevent the fitting and dome rotating about shaft 1270.

Figure 15:
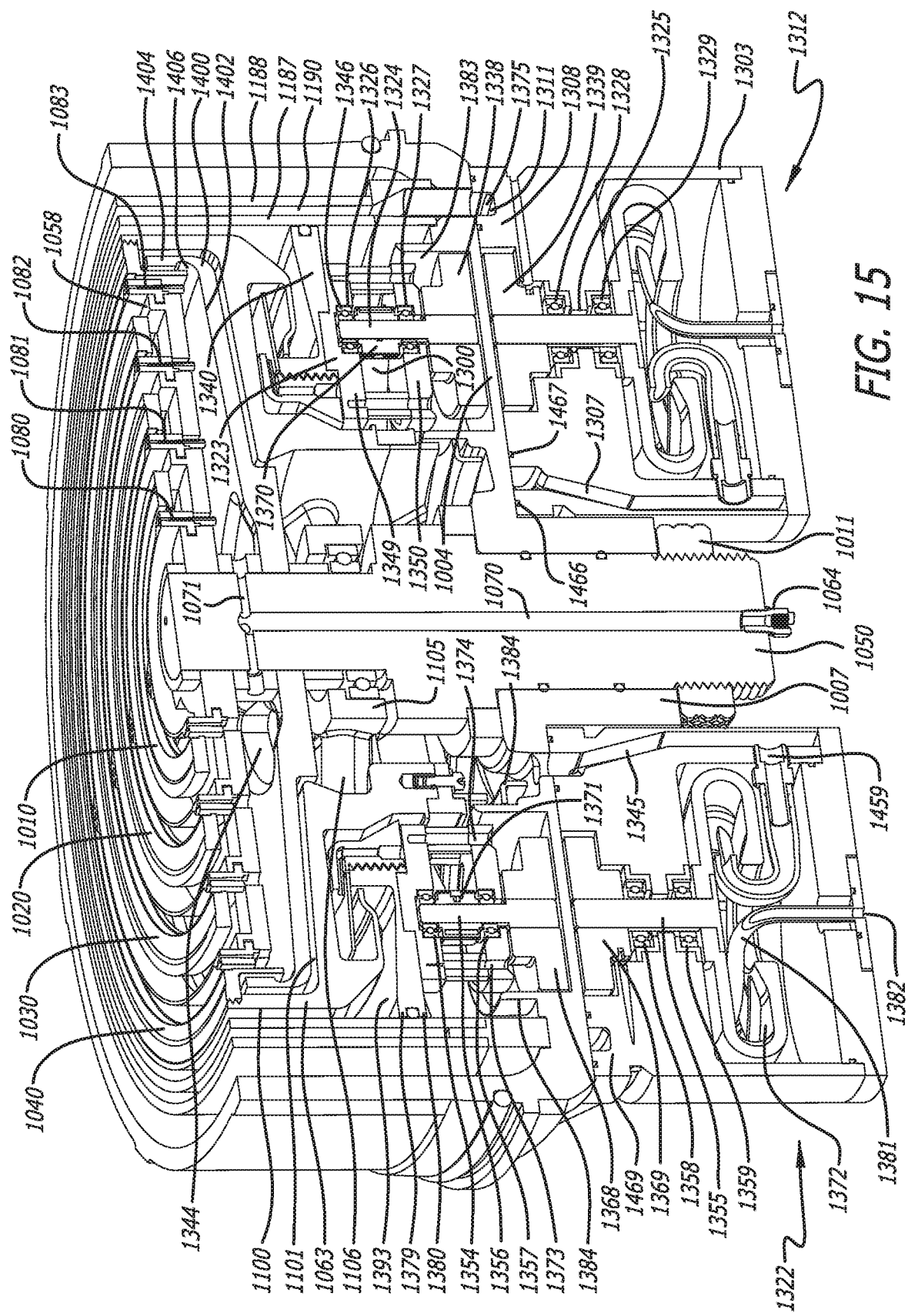
FIG. 15 is a cutaway perspective view of the boiler-condenser assembly and that assembly's connection to output pitot pumps.

Fitting 1053 at the top of center post 1050 supports dome 1220 for rotation about bearing 1078 (FIGS. 11 and 12) around the center post. The center post extends through cylindrical extension 1007 of the bottom 1009 of vacuum housing 1002 (FIGS. 10, 11 and 15). Nut 1011 threaded to the bottom of the center post secures the center post to the vacuum housing. Bearing support 1063 acts as a base for the rotating boiler-condenser unit housing. Bearings 1087 (FIGS. 11, 15 and 16) facilitate rotation of the bearing support about the stationary center post.

Figure 16:
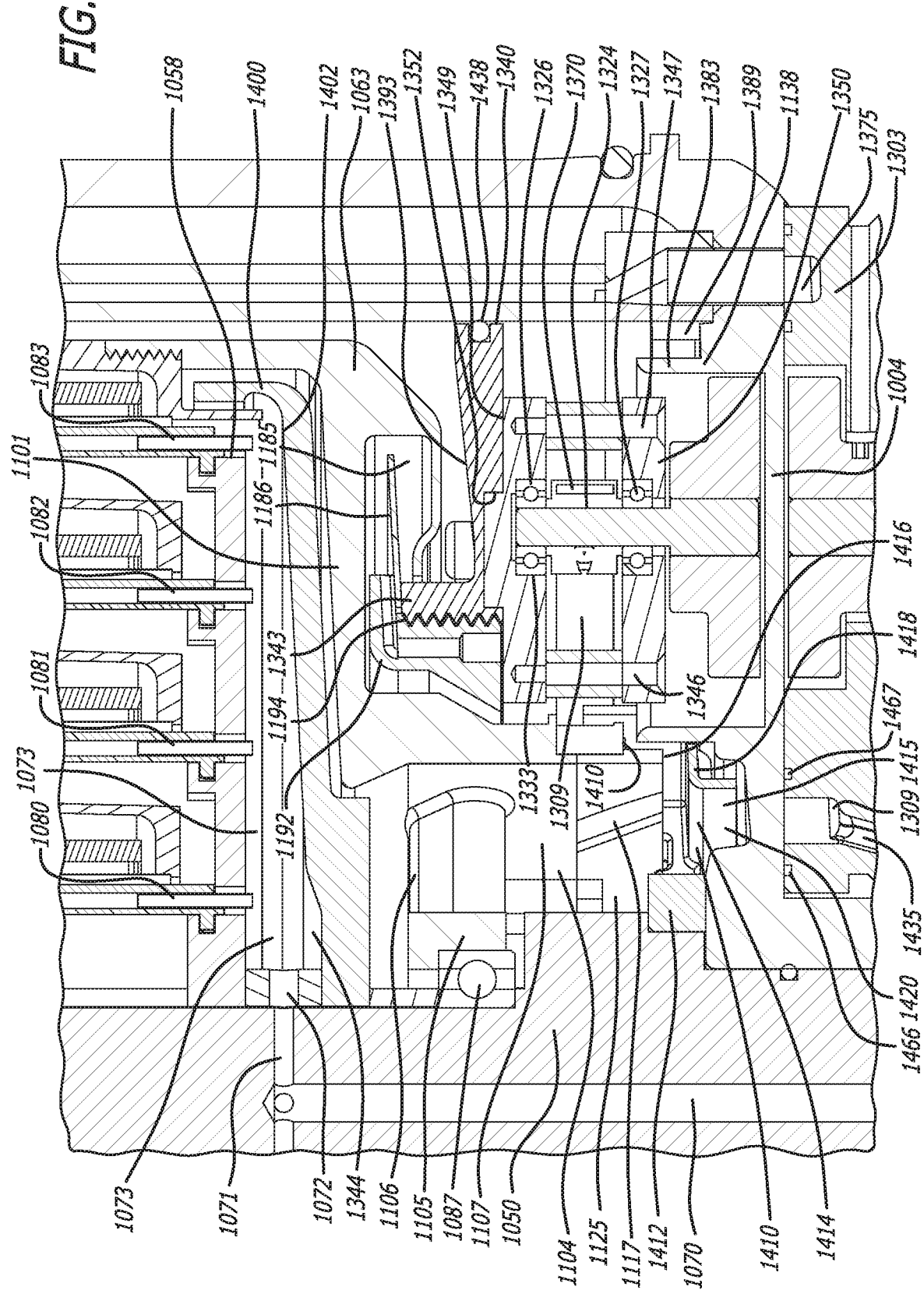
FIG. 16 is a partial, cutaway perspective showing structure associated with the boiler-condenser assembly, lower rotating seal, and freshwater output pump drive mechanism.

Bearing support 1063 (FIGS. 15 and 24) has an L-shaped (in cross-section) central hub 1109, with a vertical portion 1108 and horizontal portion 1109. The vertical portion is against bearing 1087, which also mounts against the outside of center post 1050. The center post has a smaller diameter region extending from shoulder 1141 upward (FIG. 16). The central hub's horizontal portion supports the bearing vertically. Dome 1220 at the top of boiler-condenser unit 1000 and bearing support 1063 at the bottom of the boiler-condenser unit supports the boiler-condenser unit for rotation about center post 1050. See FIG. 24 and further discussion below about the bearing support. This construction allows dome 1220, bearing support 1063 and cylindrical sidewall 1062 to rotate about the stationary center post as shaft 1070 rotates.

Fixed upper and lower sets of struts 1054 and 1058 (FIGS. 10, 11, 12 and 13) extend outward from the center post. See FIGS. 15, 16, 18 and 19, which do not show all struts. Each set of struts may include two, three, four or more struts (See FIGS. 17, 18 and 19).

Flow of Contaminated Water into System: Contaminated water from a source like source 14 in FIG. 1 passes through the feed input 1070 in center post 1050 (FIGS. 11, 15 and 16) and enters the boiler-condenser assembly through one or more ducts 1071 near the top of the feed input. The feed input may have a fitting 1069 (FIGS. 11 and 15) for attaching to the water source. The pressure head from the source of contaminated water raises the water to the ducts. Each duct extends radially from feed input 1070 through outlet 1072 through center post 1050. As boiler-condenser housing 1008 rotates, centrifugal force directs the water from the ducts and outlets into a manifold below at least one lower struts. Four short tubes 1080, 1081, 1082 and 1083 (FIGS. 11, 13 and 15) extend into the water in the manifolds. Each short tube connects to a respective elongated tube 1090, 1091, 1092 and 1093. The rotation-created pressure head on the water in the manifold generates a pressure head in the four tubes causing water to flow upward into the elongated tubes (FIGS. 10, 11, 13 and 15).

Manifold 1073 mounts below strut 1058 in the drawings, but the other struts also could have manifolds. Applicants could use a single manifold with one set of radially aligned tubes for each shell because centrifugal force and wipers spreads the incoming water into a thin film around each shell. Four manifolds spaced 90° apart, one below each of the four lower struts with corresponding tubes and four ducts 1071, distribute the contaminated water more evenly.

Figure 18:
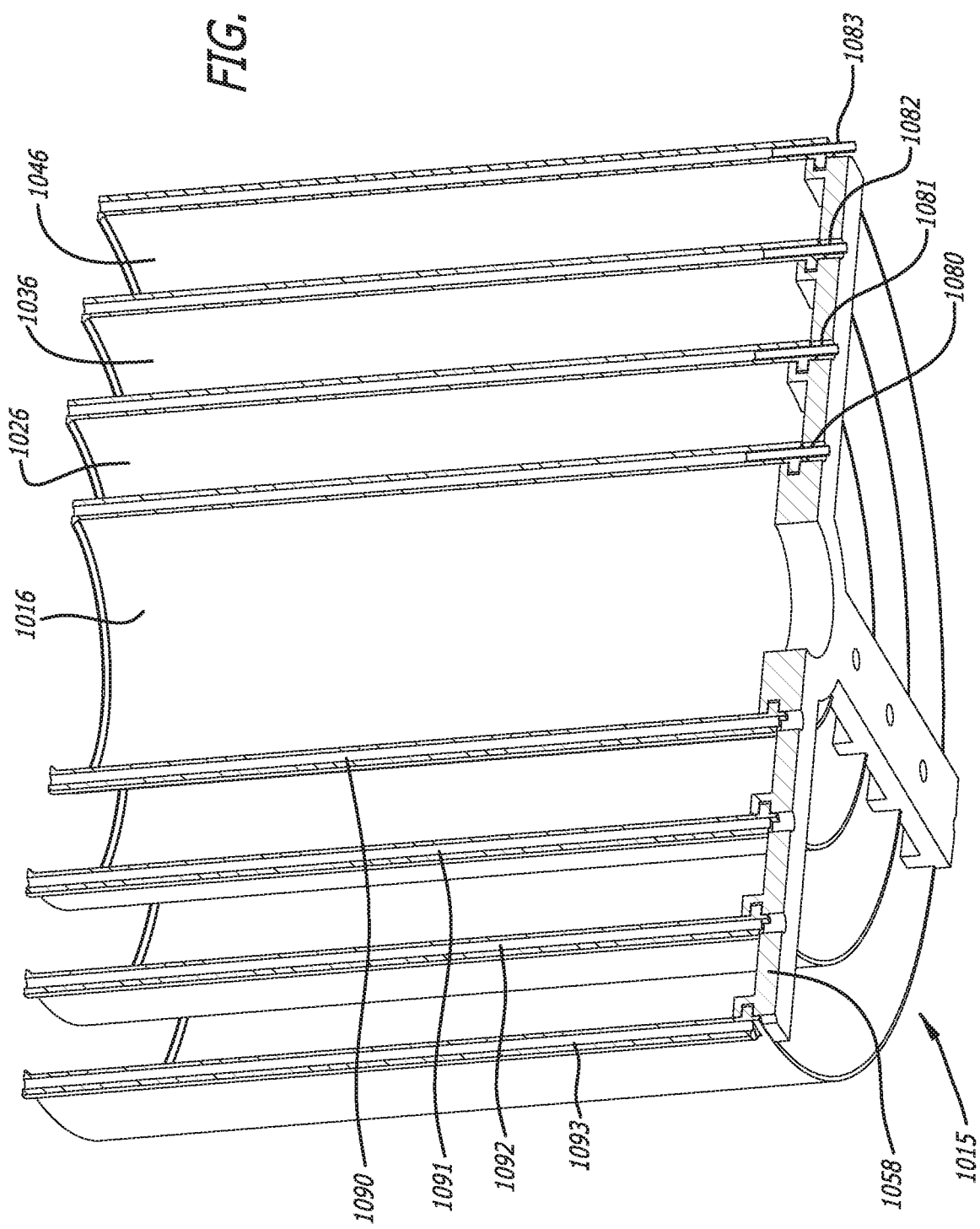
FIG. 18 also is a cutaway, perspective looking upward showing four concentric stationary boiler-wiper supports and for supplying contaminated water to the rotating shells.
Figure 19:
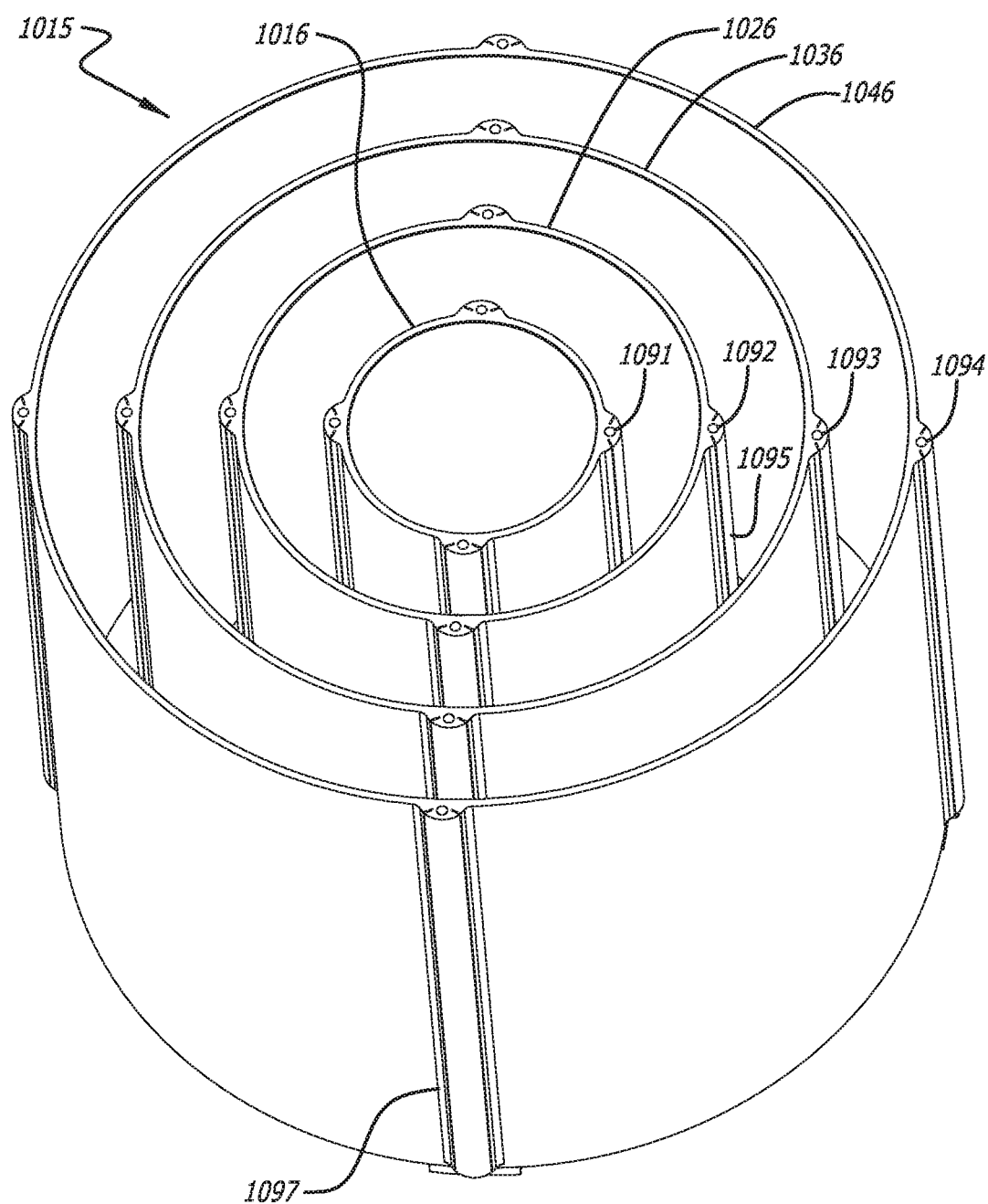
FIG. 19 is a perspective looking downward showing four concentric, stationary boiler-wiper supports and structure supplying contaminated water to the rotating shells.

Elongated tubes 1090, 1091, 1092 and 1093 may extend through bulges such as bulge 1094 extending outward from cylindrical supports 1016, 1026, 1036 and 1046 (FIGS. 18 and 19). The FIG. 17 exploded view shows the relationship of nozzle-wiper support assembly 1015 with other components. The cylindrical supports combined with the struts such as strut 1058 to form rigid and stationary nozzle support subassembly 1015. One molded-plastic piece could form the support subassembly including the cylindrical supports and the struts.

To eliminate the need for the manifold, the four short tubes may connect directly to outlets 1072. If so, centrifugal force still creates a pressure head to direct the water through short tubes 1080, 1081, 1082 and 1083. The short tubes could be separate elements that connect to elongated tubes 1090, 1091, 1092 and 1093 (best seen in FIGS. 13 and 18), or they could be integral parts of each elongated tube.

Pressure caused by centrifugal force on the contaminated water in manifold 1073, short tubes 1080, 1081, 1082 and 1083 and elongated tubes 1090, 1091, 1092 and 1093 forces the water out the top of the elongated tubes. The water hits the rotating shell's inner surface outside the tube, and centrifugal force grabs the water on the shell's inside boiling surface. Angling the tops of the elongated tubes toward the shells direct the water toward the shells. One or more nozzles along the length of each elongated tube also could spray water toward its shell.

Figure 20:
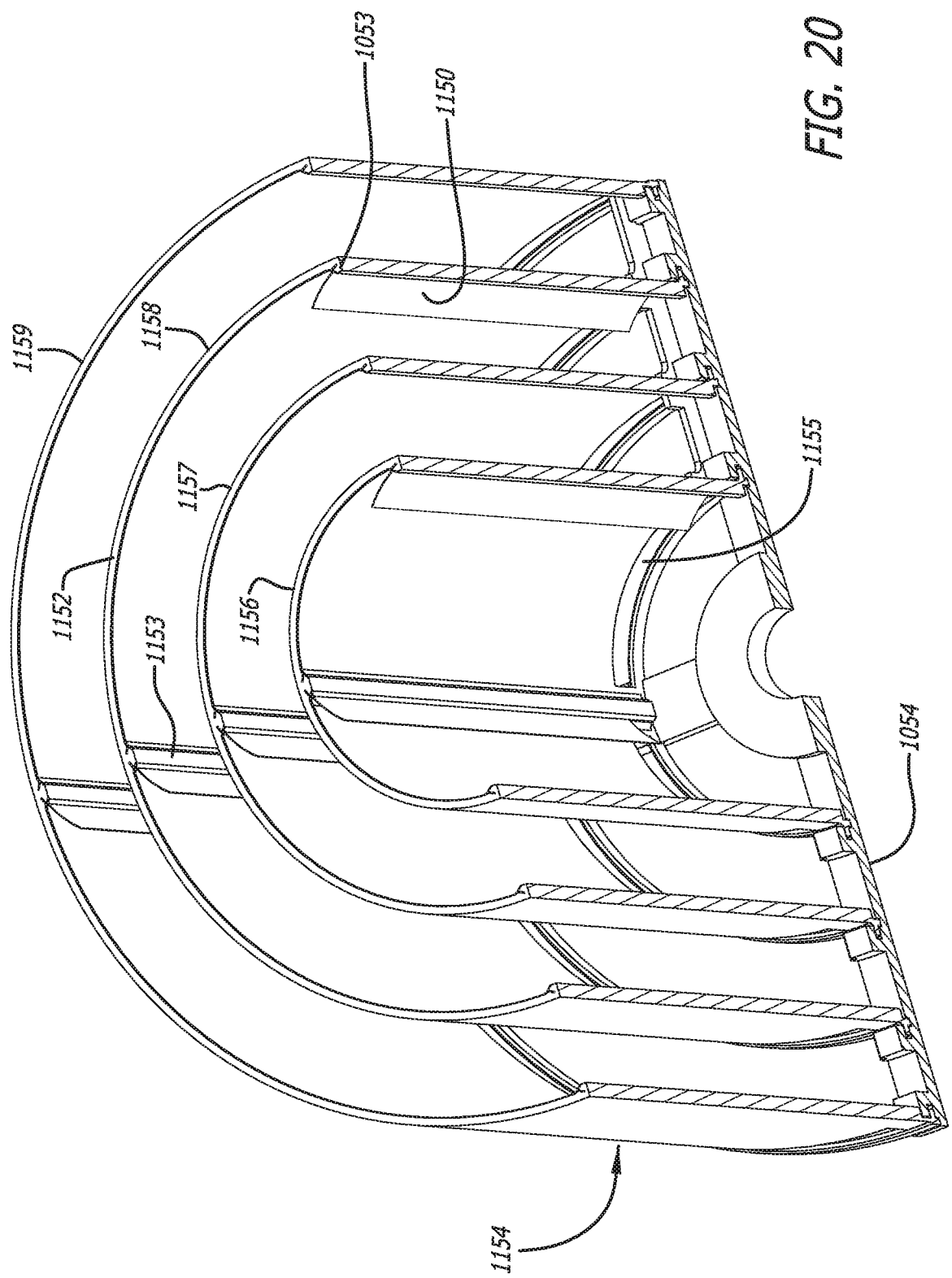
FIG. 20 is a cutaway, perspective looking downward showing four concentric stationary supports for wipers associated with the condenser surfaces of the rotating-condenser shells.

FIG. 19 shows other sets of tubes spaced every 90° around cylindrical supports 1016, 1026, 1036 and 1046. More or fewer tubes could be used. If the outside of bulge 1094 extends outward far enough, it may act as a wiper, but it may be too hard and generates friction by exerting too much force on the shells. The bulges in FIG. 19 have elongated slots like slot 1095, which can grip a flexible wiper. FIG. 19 does not show the flexible wipers for the shells' boiling surface, but they may be like wiper 1150 that act on the condenser surface (FIG. 20). The wipers may be Teflon,® other low-friction material or another material coated with Teflon or other low-friction materials to reduce friction between the wiper and its shell. The wipers may be curved or straight and may extend almost the entire length of the shell's inner-boiler surface. The system could use multiple wipers for each boiler or condenser surface. See FIG. 19. Angling or overlapping the wipers also may be advantageous. A second slot such as slot 1097 allows mounting a flexible wiper facing in the opposite direction, which allows the wiper to affect the contaminated water on the boiler surface if the boiler-condenser unit rotates in the opposite direction.

Annular Framework Assemblies. The system also includes annular framework assemblies. They (1) support components associated with cylindrical shells 1010, 1020, 1030 and 1040, (2) direct vapor from the boiling shell surfaces, (3) direct vapor to the condenser surfaces, (4) maintain the pressure differential between opposite sides of the shells and (5) rigidify the rotating components. The framework assemblies in shell subassembly 1119 (FIGS. 17 and 25) are like the framework assemblies in FIG. 8. Each shell has an associated framework assembly rotating with the shells (best seen in FIGS. 13, 14 and 25), but only assemblies on opposite sides of shells 1020 and 1030 are described here.

Figure 25:
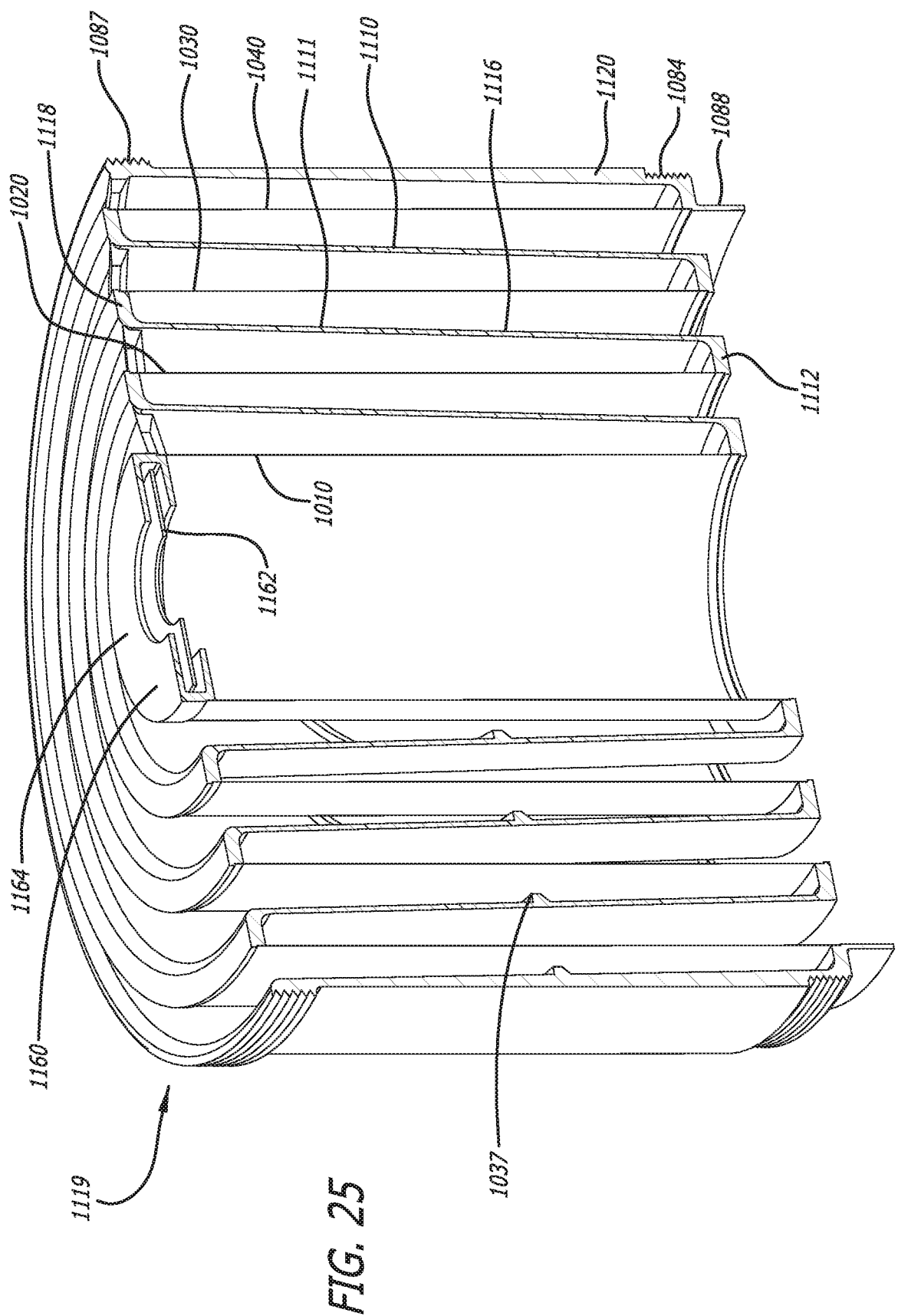
FIG. 25 is a perspective view of applicants' boiler-condenser unit showing the shells and their associated structure forming the four, concentric boiler-condenser chambers.

Annular framework assembly 1111 is associated with shells 1020 and 1030. It includes lower ring 1112, angled brace 1111 and upper ring 1118. The lower ring attaches to shell 1020, and the upper ring attaches to adjacent shell 1030 (FIGS. 13, 14 and 25). Shell 1040 depends from the top of framework assembly 1110. The arrangement leaves open the bottom of the boiler chamber, the space between a shell's boiler surface and the framework assembly closest to that boiler surface. Boiled vapor can flow through that open space. The arrangement also allows vapor compressed from compressor/blower 1200 to reach the opposite, condenser surface of the shell while preventing compressed vapor from reaching the shell's boiling surface. The framework assemblies also keep pressures on opposite sides of the shells at the lower boiler pressure and the higher pressure from the compressor.

No framework assembly is outside shell 1040. Instead, rim 1088 of cylindrical wall 1120 projects downward and inward from below rim 1088. See FIG. 25. The bottom of shell 1040 attaches to that downward projection. The framework assemblies and the shells form a unitary unit 1119 (FIG. and 25). Rotation of dome 1067, bearing support 1063 (discussed below) and cylindrical wall 1120 rotate framework assemblies and their associated shells about axis 1052 through stationary center post 1050.

The space facing toward axis of rotation 1052 between a boiling surface and its adjacent framework assembly, e.g., surface 1032 of shell 1030 and framework assembly 1111, is a boiling chamber (e.g., chamber 1128, best viewed in FIG. 14). Vapor there from the boiled contaminated water first moves away from the shell's boiling surface. Though centrifugal force holds contaminated water along the boiling surfaces, the force doesn't affect the vapor.

Shells' Boiler Surfaces Generating Vapor: The system is under near-vacuum pressure ($\approx 0.5$ psia) during operation. Contaminated water exiting tube 1096 reaches inner or boiler surface 1032 of shell 1030 (best seen in FIG. 14). Centrifugal force caused by rotation of housing 1000 and its shells causes water to form a thin film on each boiling surface. Gravity also causes water to flow downward from shell's top 1032. Optional wipers such as wiper 1024 (FIG. 14) cooperate with centrifugal force and gravity to spread contaminated water into the thin film along inner, boiler surface 1032 of shell 1030. Brace 1057 (FIG. 14) on the strut like strut 1058 and other braces on other struts may secure boiler cylinders like cylinder 1016 (FIG. 19). The wipers also may attach to the elongated tubes.

At near-vacuum (≈0.5 psia), contaminated water on the inside, boiler surface of each boiler-condenser shell (e.g., surface 1032 of shell 1030) boils causing water vapor to move away from the inside of boiler surface. Not all the contaminated water boils. Non-volatile contaminates remain in solution with contaminated water that doesn't boil. Enough contaminated water remains for gravity and force from any wipers such as wiper 1024 to urge contaminants as wastewater downward along the boiler surface (FIG. 14). The wastewater fans out when it passes the bottom of the boiler surface and lower strut 1058. The bottoms of condenser wiper cylinders 1156, 1157 and 1158 (FIG. 20) extend below the bottom of respective shell 1020, 1030 and 1040. As centrifugal force on exit directs the wastewater outward, it hits the bottom of the next-adjacent cylindrical wiper support, loses its kinetic energy and drops onto slanted surface 1402 of upper diverter 1400 (FIGS. 15 and 16). The stationary upper diverter extends around and is fixed to center post 1050 below struts like strut 1058.

Outer shell 1040 has no cylindrical wiper support outside the shell. Wastewater from the outer shell sprays onto upper portion of curved surface 1406 of upper diverter 1400 (FIG. 15). The curvature directs the wastewater onto the diverter's slanted surface 1402. Wastewater from the three, cylindrical wiper supports and the curved surface flows inward along the upper diverter's slanted surface where the wastewater encounters openings like opening 1744 at the inside of the upper diverter (FIG. 15).

Bearing support 1063 mounts for rotation about a lower portion of the center post below stationary upper diverter 1400 (FIGS. 11, 15 and 16). The bearing support includes an upright cylindrical wall 1100 with a threaded top 1084 (FIGS. 15, 16 and 24). The upright cylindrical wall extends upward from curved intersection 1102 with slanted, disk-shaped section 1101. See FIG. 24. The bearing support's central region and its horizontal surface 1101 are spaced from center post 1050 and are not below the upper diverter's openings like opening 1744. The bearing support's central portion 1104 is generally open inward from depending cylindrical wall 1107 to central hub 1105. See FIGS. 15, 24 and 26. The position of opening 1744 causes wastewater flowing though the diverter's openings to miss the bearing support's horizontal surface.

Short, wide arms 1106 (FIGS. 16 and 24) connect cylindrical wall 1107 and central hub 1105 of bearing support 1063. The arms may have angled faces 1117, which strike wastewater and accelerate wastewater downward as the arms revolve with bearing support revolution. Optional short plates 1117 on extension ring 1125 (FIGS. 16, 23 and 24) also force water down as they revolve. The extension ring can be formed as part of depending cylindrical wall 1107 or fabricated separately and attached to the depending cylindrical wall.

Figure 26:
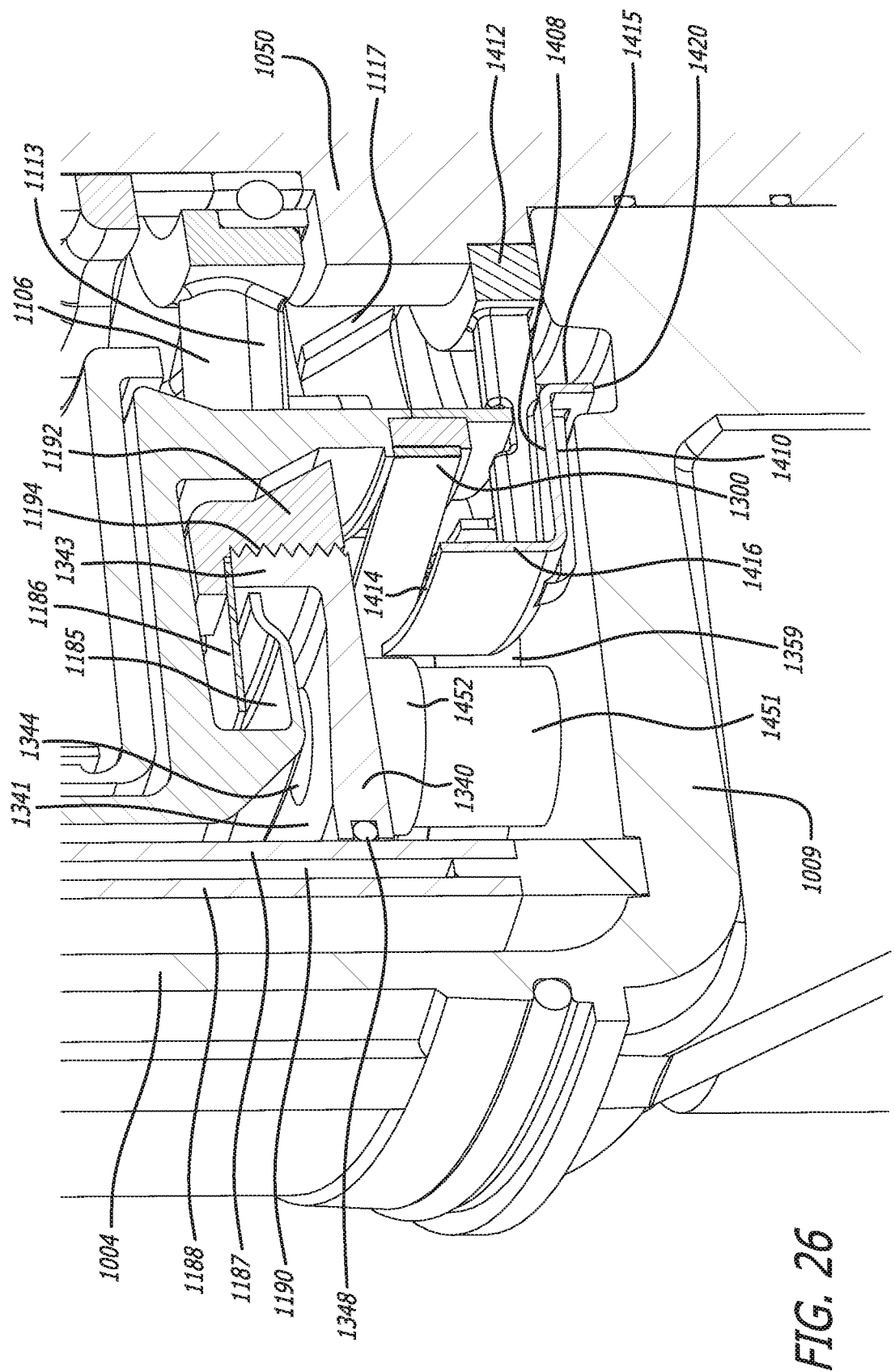
FIG. 26 is a perspective cutaway view of a lower portion of applicant's device below the boiler-condenser shells.

Stationary collection ring 1410 mounts below bearing support 1063 (FIGS. 16 and 26). The collection ring has in inner hub 1412 fixed to center post 1050. Arms (not visible) extend outward to attach collector bowl 1414 to the inner hub to create space 1415 between the inner hub and collector bowl. The collector bowl includes an outer rim 1416, which extends upward from disk 1418 (FIGS. 16 and 26). Projection 1420 extends downward from the inside of the disk. Wastewater flowing down through the bearing support's central portion 1104 flows through space 1415 between the inner hub and the collector bowl. Disk 1418 of the collector bowl tilts down toward the center so any wastewater reaching the disk and not flowing directly through space 1415 flows inward along the disk to space 1415.

Belt 1700 (FIGS. 11, 15, 16 and 23) rotates gear 1770. The belt extends around ring 1730, which extends below bearing support 1063. See FIG. 23.

Each boiling chamber's bottom is open allowing vapor to flow downward. A direct connection exists between the four boiler chambers, so they share the same near-vacuum pressure. Vapor from all the boiling chambers moves into and through region 1027 (FIGS. 15 and 16). The cross-sectional drawings may look as if components occupy most of the region' space, but the region has enough empty space for the vapor.

Outer concentric cylinder 1188 and inner concentric cylinder 1187 are stationary and surround the boiler-condenser assembly. See FIGS. 10, 11, 12, 13, 15, 16, 23 and 26. Spacing the concentric cylinders apart creates channel 1190. The bottom of cylinders 1187 and 1188 have feet around them to create windows through which vapor can flow. See window 1189 in FIGS. 16 and 23. The top of outer concentric cylinder 1188 extends into H-shaped gasket 1191 (FIG. 11).

Vapor in region 1027 from the shells' boiler surfaces flows through windows 1189 into channel 1029 between outer concentric cylinder 1188 and vacuum housing 1002 (FIGS. 10, 11, 12, 13, 15 and 16). From channel 1029, the vapor travels through openings (not shown) in top cover 1217 of blower housing 1212 into blower inlet 1218 (FIGS. 10 and 11) at the lower pressure (top) side of blower 1210.

Sidewall 1202 of blower housing 1212 attaches to top cover 1217 and base 1205 (FIG. 10). Threaded connection 1208 between parts may be used, but they may attach differently. Threaded connections may make maintenance easier. O-rings 1203 and 1204 and vibration dampers 1209 may mount between blower 1210 and the sidewall. Cylindrical extension 1206 of the blower housing's base extends downward in FIG. 10. The bottom of the cylindrical extension engages H-shaped annular ring 1191 on top of outer concentric cylinder 1188. See FIGS. 10, 11 and 12.

The blower compresses the vapor and directs the vapor through exit opening 1226 in the blower housing base 1206 (FIG. 12). Compression in the blower increases pressure of the vapor $\Delta p$, which causes the vapor's temperature $\Delta T$ to increase because $P/T=k$ (where k is a constant, P is pressure and T is temperature—Gay-Lussac's Law).

Typical pressure rises $\Delta p$ may be 0.04 psia to 0.14 psia (0.28 kPa to 0.97 kPa) with corresponding temperature rises $\Delta T$ of about 2° F. to 13° F. (≈1° C. to 5° C.) under normal operating conditions. The elevated-pressure vapor flows from blower 1210 through openings 1061 in dome 1220 into boiler-condenser housing 1008.

The annular framework assemblies like assembly 1110 (FIGS. 10, 11, 13 and 14) support the shells. The framework assemblies are rigid strut-like fixtures. Supporting cylinders like supports 1026 and 1156, which hold the wipers, also are rigid. The thin metallic boiler-condenser shells 1010, 1020, 1030 and 1040 and non-metallic framework assemblies like 1110 (FIGS. 10 and 11) create a stiff boiler-condenser structure even without radial support struts. Radial braces between shells 1010, 1020, 1030 and 1040 would interfere with stationary wiper blades 1024 and 1150. Because wipers are important, the FIGS. 10 and 11 design relies on framework assemblies.

Framework assemblies like assembly 1110 also prevent vapor flow from the compressor into the boiling chambers like chamber 1028 and against the shells' boiling surfaces. Instead, the compressed vapor flows on the other side of the framework assemblies to reach the outside or condenser side of each shell. The framework assembly like assembly 1111 to the outside of shell 1030 forms condenser chamber 1031 between the framework assembly and the condenser side of shell 1030. The framework assemblies neither impede the boiling vapor's flow-path exiting the boiler chambers like chamber 1028 nor impede the entering vapor flow-path to the condenser chambers like chamber 1124. These vapor paths are in free space entirely around housing 1000.

As with the boiler chambers, e.g., chamber 1028, the condenser chambers such as chamber 1124, also are in parallel and at the same near-vacuum pressure. The pressure in the boiling chambers is lower than the pressure in the condensing chambers, however.

When contaminated water boils from the boiler surfaces like surface 1032, shell 1030 transfers heat energy to the contaminated water. The heat transfer from shell to contaminated water causes each shell to lose heat energy, which decreases its temperature. The thin shells' high heat-transfer coefficient also decreases the temperature of the shells' outside surfaces. Vapor reaching the condenser surfaces is at a higher temperature due to its pressure increase through the blower so that "warm" vapor reaching condenser surface 1033 encounters a relatively cold surface where the vapor condenses as freshwater.

Changing the phase of vapor into liquid water on condenser surface 1173 transfers the thermal energy from the heat of condensation to the condenser surface, which transfers heat to the shells like shell 1020. Condensation recovers heat energy that caused water to boil from boiling surface 1022. This heat energy and the energy transfer during condensation are the only energy sources to raise the shells' temperature to cause the heat of boiling on boiling surface 1022. The system recovers energy used to boil the contaminated water minus thermodynamic-inefficiency losses of the compressor and the small excess heat energy ($\Delta T$) required to drive the process.

Centrifugal force caused by shell rotation may expel condensed water from the condenser surface, but surface tension may hold condensate on the condenser surface. Removing condensate quickly improves condensation and overall efficiency because condensate remaining on the condenser surface limits or prevents vapor from contacting the high, heat-transfer condenser surface.

To aid removing condensate held on the condenser surface by surface tension, each condenser surface, e.g., surface 1032, has one or more wipers. Condenser wiper assembly 1154 (FIGS. 17 and 20) includes four wiper support cylinders 1156, 1157, 1158 and 1159, which depend from struts 1054. (FIG. 20 looks upward; the struts are near the top of the boiler-condenser. See FIGS. 10 and 11.) The cylinders, which are stationary, are around the outside, condenser surface of each shell.

Condenser wipers like wiper 1150 contact condenser surface 1173 to throw condensate off the surface. The external wipers mount on fittings like fitting 1153 (FIG. 20), which are inward facing projections like projection 1153 of cylinder 1152. The wipers attach to slots in the wiper fittings.

FIG. 20 shows wiper fittings every 90°, and wipers may attach to any desired fittings. Each wiper may be one piece or may include two or more wipers. The vertical edge of each wiper may extend outward in the same direction as the shells rotate, or the wipers may extend in the opposite direction to "cut through" water on the shell as the wiper reaches the water. The wipers are spaced from the framework assemblies and don't reach to the lower ring such as ring 1112.

Freshwater condensate thrown off condenser surface 1173 by centrifugal force and the wipers contacts spiraled ridges of the annular framework assembly such as ridge 1037 on framework assembly 1111. See FIGS. 11, 13, 14 and 25. Each framework assembly has one continuous ridge in the drawings, but each framework assembly could have two or more ridges. The ridges need not be continuous; they could be interrupted. The framework assemblies' revolutions around axis 1022 combined with the spiraled ridges urges the condensate upward and over the framework assemblies. Even without the spiraled ridges, the angle of the framework assembly still urges freshwater upward. When the condensate reaches the top of a framework assembly, centrifugal force throws the water toward inside wall 1176 of dome 1220 and outward through openings 1177 (FIG. 12). The water sprays onto outer concentric cylinder 1188 where it loses its rotational kinetic energy and flows downward in channel 1190 between the outer and inner concentric cylinder 1188 and 1187. From channel 1190's bottom, the water flows into annular groove 1775 at the top of pitot pump 1712 (FIGS. 11 and 15). The groove slants with a deeper portion above opening 1707 into pitot pump 1712, which is discussed below.

Removing Freshwater and Wastewater: The bladder system for removing wastewater and freshwater from the device in FIG. 5 could remove them from the device in FIGS. 10 and 11. That system overcame outside atmospheric pressure pushing against the vacuum chamber's vacuum to allow wastewater and freshwater removal. As discussed with FIG. 5, conventional pumps use considerable energy and might allow outside air into the vacuum chamber.

Instead of the bladder system in FIG. 5, the processor of FIGS. 10 and 11 and accompanying figures use pitot pumps (also called "pitot-tube pumps") to raise the pressure of the potable water and wastewater. B. Schiavello, "Tutorial on Special Purpose Pumps Pitot; Progressing Cavity; Air Operated Diaphragm; and Hydraulically Actuated Diaphragm," Proceedings of the 14th Int'l Pump Users Symposium, available at www.911metallurgist.com. The article is incorporated by reference. Pitot pumps are variations of centrifugal pumps, but they typically use a rotating pitot tube to pass through the fluid being pumped. Applicants do the opposite; they rotate water in a chamber, and the water encounters the pitot tube within the chamber. The pressure head of a pitot pump is a function of the radius of the tube arm, the area of the opening of the pitot tube and the velocity of the fluid. More on applicants' pumps' structure below.

Two pitot pumps 1712 and 1722 separately pump freshwater and wastewater from the device. Separate motors could run each pump, or one motor could run both pumps, but devices in FIGS. 10 and 11 rely on motor 1214, which powers the blower and rotates the shells, to power the pitot pumps through gears and pulleys described below.

Bearings 1726 and 1727 for freshwater pitot pump 1712 support upper shaft 1724, and bearings 1728 and 1729 support lower shaft 1725 (FIGS. 11, 15 and 16). The upper shaft's bottom attaches to upper magnetic wheel 1738, which is above bottom wall 1004 of vacuum housing 1002

(FIGS. 11, 15 and 16). Components rotating the upper magnetic wheel are discussed below. Magnetism from rotation of the upper magnetic wheel rotates lower magnetic wheel 1739. The plastic bottom wall allows the upper magnetic wheel's magnetism to drive the lower magnetic wheel.

Magnetic force between the upper and lower wheels 1738 and 1739 also secures freshwater pitot pump 1712 to the bottom 1004 of vacuum chamber 1000. Similarly, the magnets of upper and lower wheels 1738 and 1739 exert enough force to secure wastewater pitot pump 1722 to the bottom 1004 of vacuum chamber 1000. The respective O-rings in grooves 1466 and 1467 of the freshwater pitot pump and those in O-ring grooves in the wastewater pitot pump (not numbered) seal the pumps to the vacuum chamber's underside.

Gear or pulley 1770 attaches to upper shaft 1724. See FIGS. 11, 15 and 16. The shaft-support assembly, which includes the upper shaft, its gear and bearings 1726 and 1727, is an "off-centered" concentric. Bolts (not shown) extend through shafts 1746 and 1747 to secure plates 1749 and 1750 together. See FIG. 16. The plates secure bearings 1726 and 1727 and gear 1770 together. Upper boss 1752 on plate 1749 seats and can rotate in cavity 1753 of lower diverter 1740. Lower diverter 1740 has an O-ring 1438 that seals the lower diverter to inner concentric cylinder 1187 (FIGS. 10, 11, 16 and 26). Inside portion 1743 of the lower diverter extends upward (FIGS. 15, 16 and 26), and the inside of the vertical portion is threaded at 1194 to secure fitting 1192 (FIGS. 16 and 26). Three posts 1447, 1448 and 1449 extending from lower diverter 1740 (FIG. 23) act as feet to support the lower diverter against base 1004 of vacuum housing 1002.

Figure 28:
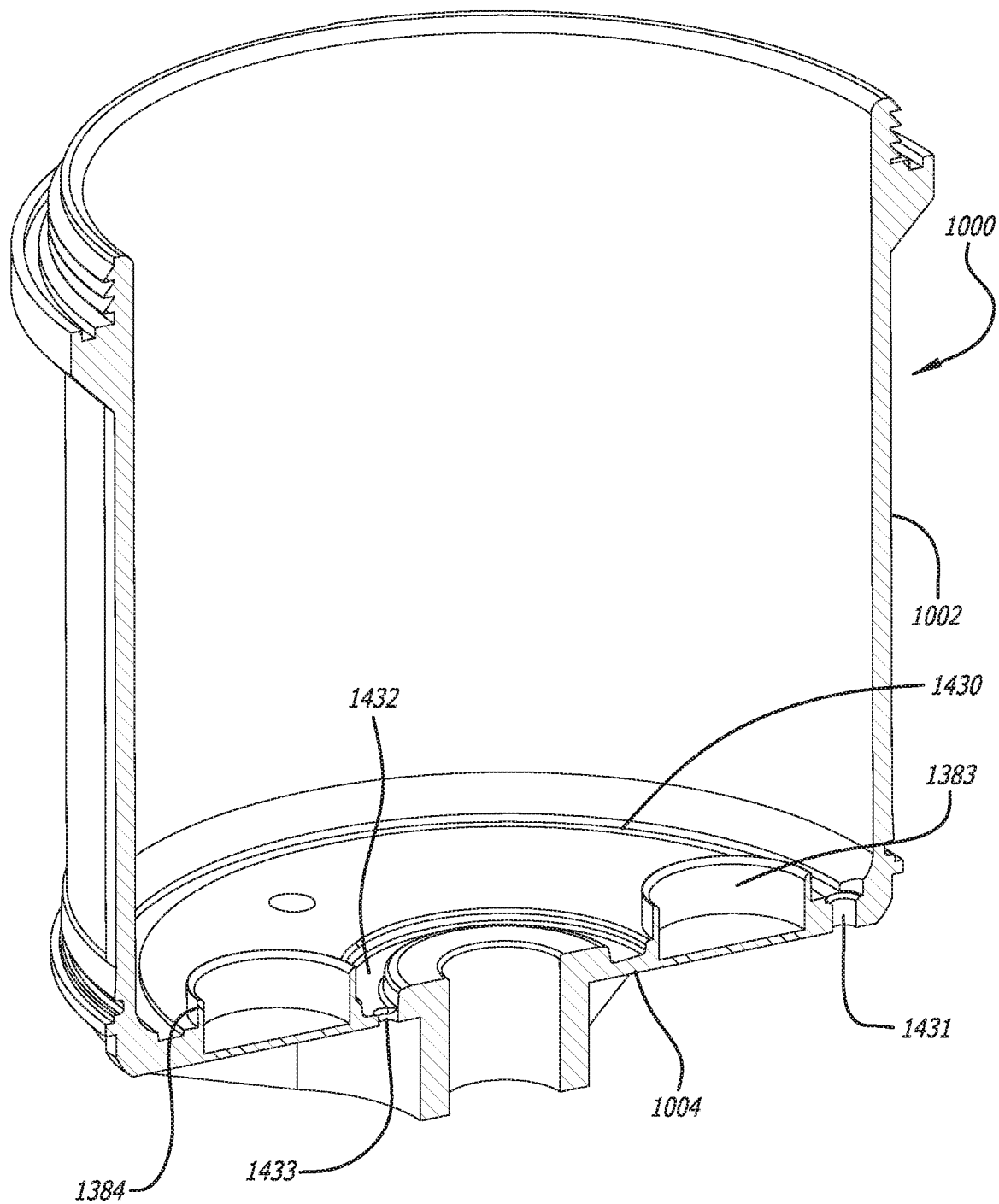
FIG. 28 is a cutaway view showing the inside of applicants' lower vacuum housing.

Upper shaft 1724 is off-centered because the shaft, gear and bearings are not at the center of plates 1749 and 1750. Rotating plates 1749 and 1750 cause the shaft, gear and bearings to move laterally. Upper magnetic wheel 1738 is in cylindrical bowl 1783 (FIGS. 16 and 28). As those figures show, the bowl's diameter is larger than the magnetic wheel's diameter to allow positioning of the wheel in the bowl. Note the space between the magnetic wheel and the bowl in FIGS. 15 and 16.

Pitot pump 1722 for wastewater and the components for powering the pump are like those running pitot pump 1712 for freshwater. Upper shaft 1724 and lower shaft 1725 rotate between respective sets of bearings 1754 and 1756 and bearings 1758 and 1759 (FIG. 11). Upper magnetic wheel 1768 attaches to the upper shaft, and lower magnetic wheel 1769 attaches to the lower shaft. The upper magnetic wheel's rotation causes the lower magnetic wheel's rotation.

Gear or pulley 1771 attaches to upper shaft 1724 and bearings 1756 and 1757 (FIG. 15). Like the shaft-support assembly for freshwater pitot pump 1712, this assembly also is an off-centered concentric. Shafts 1773 and 1774 receive bolts (not shown) for holding plates 1749 and 1750 together (FIG. 15) with gear 1771 and bearings 1756 and 1757 between the plates. Upper boss 1779 on plate 1749 seats and can rotate in cavity 1780 of lower diverter 1740. Cavities 1753 and 1780 in the lower diverter also are visible in FIG. 27.

Upper shaft 1746, gear 1771 and bearings 1756 and 1757 are not at the center of plates 1749 and 1750. Pivoting plates 1749 and 1750 moves the shaft, gear and bearings. Upper magnetic wheel 1768 mounts in cylindrical bowl 1784 (FIG. 15). The bowl's diameter is larger than the magnetic wheel's diameter to allow positioning of the wheel in the bowl.

Belt 1700 (FIGS. 15 and 16) rotates shaft 1756 through gear 1771 for wastewater pitot pump 1722. Supports 1436 and 1437, which are like those around shaft 1725 in FIG. 15, may be tightened together to balance the force between them. Bolts (not shown) extending through slots 1440 and 1442 secure the supports together. Through magnetic coupling of wheels 1768 and 1769, rotation of upper shaft 1454 and its wheel 1768 transfers rotation to lower wheel 1769 and lower shaft 1755.

Figure 23:
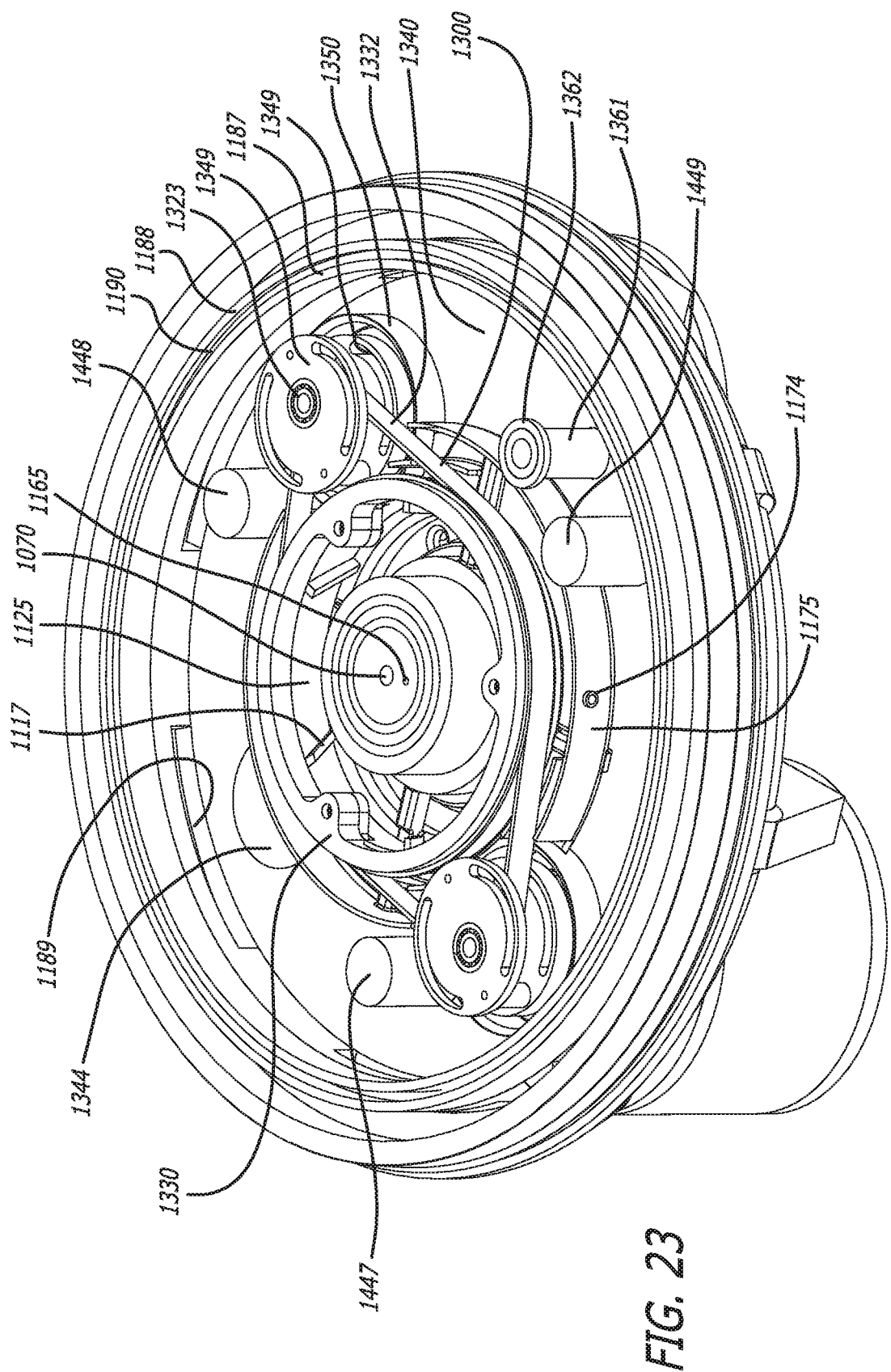
FIG. 23 is a cutaway view of the lower assembly structure for rotating the moving parts of pitot pumps.
Figure 27:
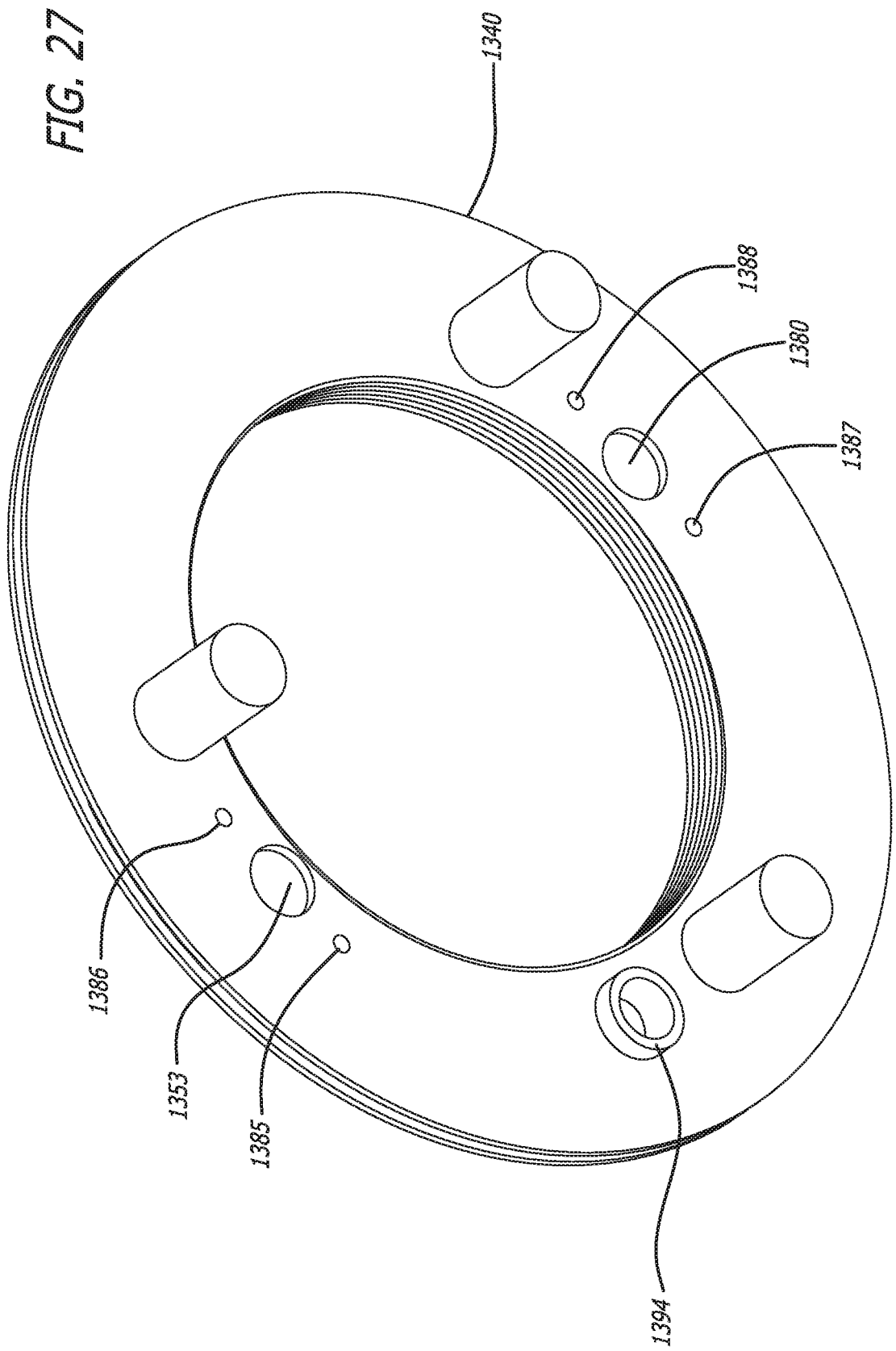
FIG. 27 is a perspective view of the lower diverter of applicants' device.

During assembly, drive belt 1700 is loose over gear 1771 below bearing support 1436 (FIGS. 15 and 23). The belt also passes over gear 1770 on upper shaft 1724 for freshwater pitot pump 1712. Pivoting plates 1750 and 1738 and plates 1723 and 1437 moves respective gears 1770 and 1754 to positions for proper tightening of the drive belt. When the drive belt is at its proper tension, screws (not shown) secure plates 1750 and 1738 and plates 1723 and 1437 to lower diverter 1740 (FIGS. 15, 16 and 23). FIG. 27 shows screw holes 1785, 1786, 1787 and 1788. Reinforcing the screw holes, especially on the diverter's top side, may be desirable because the lower diverter is thin.

Instead of the off-center arrangements described above, components such as an idler or tensioner pulley could guide and maintain the drive belt's tension.

Moving plates 1749 and 1750, gear 1770 and upper shaft 1754 for freshwater pitot pump 1712 changes the position of upper magnetic wheel 1738. The upper wheel may move out of alignment with the lower magnetic wheel 1739 unless the pitot pump could be rotated so the two magnets self-align. Self-alignment can occur if the diameter of cylindrical bowl 1783 (FIGS. 16 and 28) surrounding the upper driving magnet is larger than the magnet's diameter. The drawing shows those proportions. Similar structure of wastewater pitot pump 1722 and magnetic wheels 1768 and 1769 also allow self-alignment of the wastewater pump's components.

Pitot pump 1712 for freshwater mounts in pump housing 1703 (FIGS. 11, 15, 21 and 22), beneath base 1004 of vacuum housing 1000 (FIGS. 10, 11, 15 and 16). Pitot pump 1712 includes rotating cavity 1717, which lower shaft 1725 drives. The lower shaft rotates through belt 1700 rotating gear 1770, which rotates shaft 1724, the pair of magnetic wheels 1738 and 1739 and shaft 1725. Pitot tube 1715 within the pitot pump includes upright section 1716 extending from plate 1705 through opening 1741 into pump cavity 1718. Pitot tube 1716 has a horizontal, curved section 1717 extending near the cavity's inner wall 1718. The pitot tube terminates at circular opening 1719, which may be tapered.

The pitot pump's rotating cavity 1717 is at the near-vacuum pressure inside vacuum housing 1000. Cavity rotation causes water collected in the cavity to rotate. How freshwater flows into the cavity is discussed below. Vanes 1704 (FIG. 22) aid water in the cavity to rotate at or near cavity wall's 1718 velocity. The rotating water encounters the pitot tube's opening 1719, flows into pitot tube 1715 where the pressure increases. By designing the cavity's rotational velocity and the radii of curved section 1717 and opening 1719, the water pressure can rise to atmospheric pressure (14.7 psia or 101 kPa) or above. With the water above atmospheric pressure, it can flow through the pitot tube's upright section 1716 and out opening 1741 (FIGS. 21 and 22) where is can be collected in a container (not shown).

A reed valve like valves 330 and 331 in FIG. 5 or another type of check valve can mount downstream of opening 1741 to prevent atmospheric pressure air from flowing back through the pitot pump and into the processor if the pitot pump is off or has no freshwater. The pitot pump's design must account for the pressure drop through the check valve, but energy used to raise the pressure 5 or 10 psia to overcome the pressure drop through a check valve should not affect the system's efficiency and power usage significantly.

Pitot pump 1712 receives freshwater as follows. Base 1004 of bottom portion 1002 of vacuum housing 1000 has two slanted ring grooves 1430 and 1432 (FIG. 28). Outer ring groove 1430 collects freshwater, and inner ring groove 1432 collects the wastewater. Both ring grooves are inclined. Opening 1431 is at the low point of the outer ring groove, and opening 1433 is at the low point of the inner groove 1432. The pitot pumps also have slanted ring grooves. Opening 1431 drains freshwater into inclined ring groove 1465 around the top of freshwater pitot pump 1712. Opening 1433 drains wastewater into ring groove 1469 of pitot pump 1722.

Slanted ring groove 1465 for freshwater pitot pump 1712 is circular so that opening 1431 of outer groove 1430 is over part of the pitot pump's inclined ring groove despite the pitot pump's angular orientation. The pump's inclined ring groove 1465 is between O-ring grooves 1466 and 1467. See FIGS. 11, 15 and 21. The O-rings create a seal between the pitot pump and the underside of base 1004 of lower portion 1002 of vacuum housing 1000. The ring groove and O-ring grooves may be molded into the pitot pump's top surface. The pump's ring groove slants with a low point above opening 1707. Freshwater flowing into the ring groove seeks the groove's low point, flows into opening 1707 and down into the freshwater pitot pump.

Wastewater pitot pump 1722 may match the other pitot pump 1712. It has inclined ring groove 1469 (FIGS. 11 and 15), part of which aligns with opening 1433 inside the lower part 1002 of vacuum housing 1000. (FIG. 28). Opening 1433 is at the low point of vacuum housing's inside ring groove 1432 (FIG. 28). The pitot pump's inclined ring groove 1469 is under opening 1433 notwithstanding the pitot pump's angular orientation. The low point of the pitot pump's inclined ring groove 1469 is at opening 1745, which leads into the pitot pump. See FIGS. 11 and 15.

Figure 21:
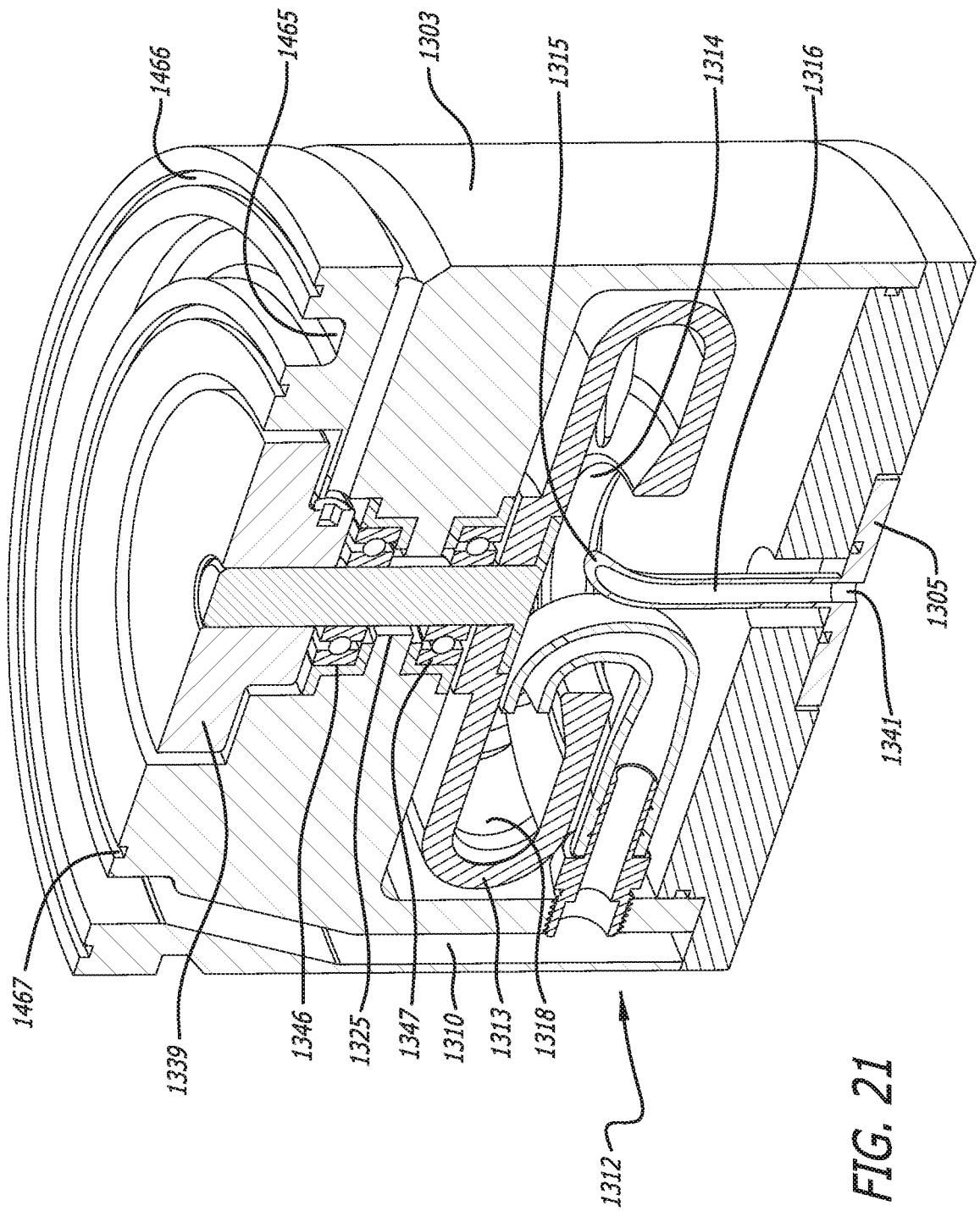
FIG. 21 is a cutaway perspective view of a pitot pump that can be used with applicants' boiler-condenser assembly.
Figure 22:
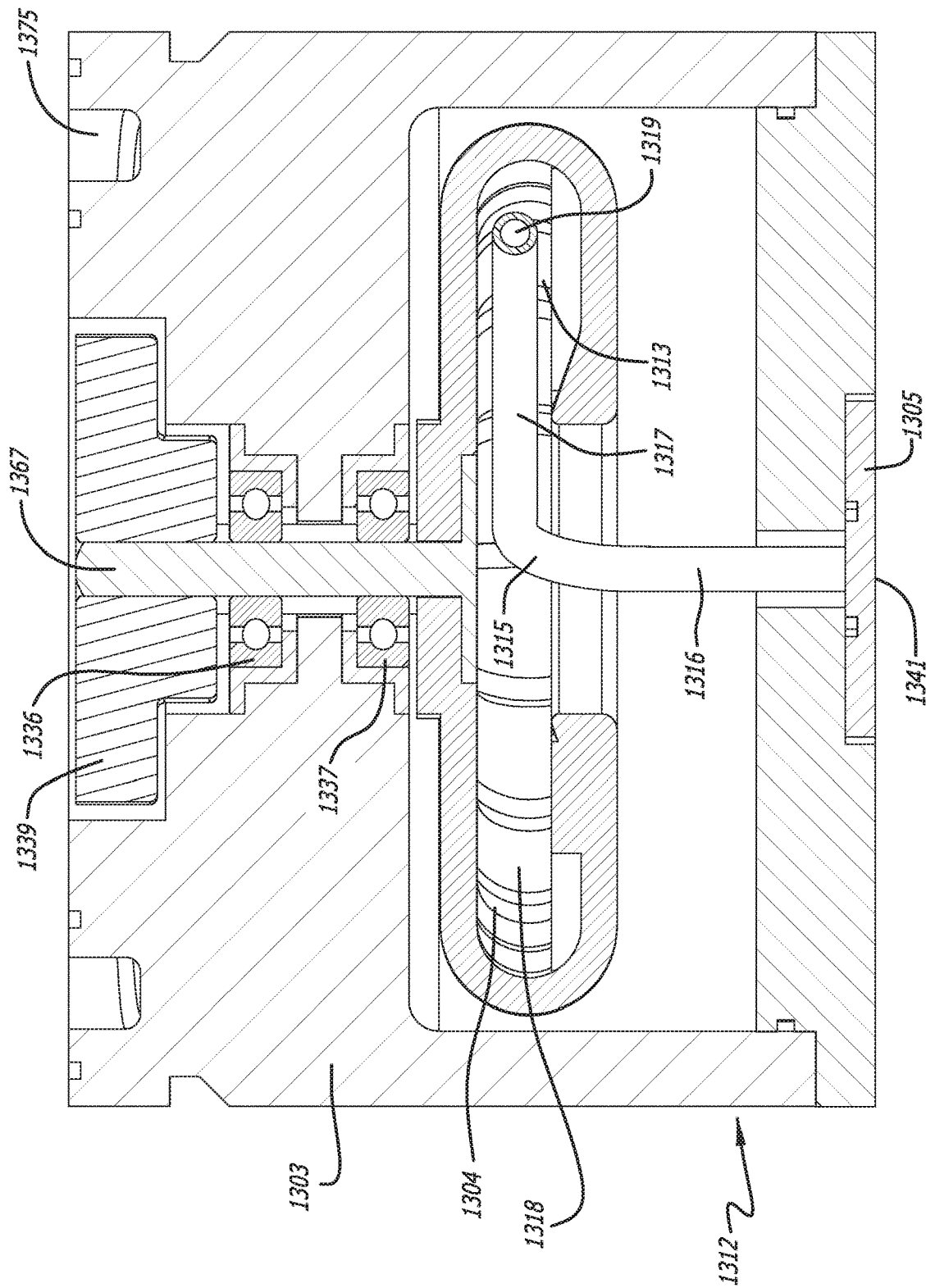
FIG. 22 is another cutaway perspective view of the pitot pump in FIG. 21 looking from a different direction.

For the wastewater pitot pump 1722, the wastewater flowing though opening 1744 reaches channel 1745 around the wastewater pitot pump (FIGS. 11 and 15). Water pressure raised by the head of wastewater in channel 1745 causes the wastewater to flow though inlet 1459 (FIG. 11). Pressure from water in the conduit directs the water into the pitot pump's chamber 1772. The chamber rotates using components like those rotating chamber 1717 of pitot pump 1712 for freshwater (FIGS. 11, 15 and 21). Chamber rotation causes the wastewater to rotate and move into pitot tube 1781. The water is pressurized in the pitot tube to 14.7 psia or higher and exits outlet 1782. A check valve (not shown) could prevent flow back into the outlet.

The angular orientation of pitot pumps 1712 and 1722 in lower housing 1002 changes depending on the lateral positions of gears 1770 and 1771. After adjusting the off-center arrangements of upper shaft 1724, gear 1770 and bearings 1756 and 1757 and of upper shaft 1754, gear 1771 and bearings 1756 and 1757 to tension drive belt 1700, pitot pumps 1712 and 1722 center themselves magnetically— upper magnetic disk 1738 to lower disk 1739 and magnetic disk 1768 to disk 1769 (FIGS. 11 and 13). Regardless of each pitot pump's angular position, the slanted ring grooves 1775 and 1469 in the respective pitot pump always are under the upstream source of freshwater or wastewater so the fluids flow into the pitot pump's entrance.

Seals: During operation, seals contain the pressure differentials between the compressed vapor from the blower in the condensing chambers like chamber 1124 and the pressure in the boiling chambers like chamber 1038. The sealing requirements are not stringent because of the low-pressure difference. Under normal operation, the pressure differential Δp may be about 0.04 psia to 0.14 psia (≈0.28 kPa to 0.97 kPa). As with the other designs discussed earlier, applicants use special rotary seals like seal 190 in FIG. 4 to hold that pressure differential.

The first or upper seal 1160 comprises ring 1162 (FIGS. 11, 12, 13 and 25), which is fixed to center post 1050. The ring extends into channel member 1164, which is at the top of innermost shell 1010. The channel member rotates with the shells. By diverting contaminated water otherwise flowing into feed input 1070 into another conduit 1165 through the center post, the channel member fills with contaminated water. See FIG. 13. The top of conduit 1165 intersects short piece of Tygon® or other appropriate flexible polymer tubing 1166, which empties into the seal's channel member 1164 and fills it. When the processor is working and the seal is filled, the user can block flow into the seal. Letting contaminated water always flow into the seal should be acceptable because any overflow from the seal flows onto the boiler side of shell 1010 for processing. Especially if the system uses one shell only, the system could eliminate tubes such as tube 1090 and their associated structure and just use overflow contaminated water from the upper seal. The flow rate of contaminated water into the seal would be modified.

The pressure differential (Δp) between vapor boiled from boiler surface 1022 and the compressed vapor from the blower exerts different pressure forces on the rotary seal's fluid. The pressure difference creates a differential height column in the rotary seal's channel member 1171 (See FIG. 13). The pressure on the fluid above ring 1162 (FIGS. 11 and 13) is greater than the pressure below the ring due to pressure forces from vapor after the blower raises its pressure. The pressure difference displaces the column of fluid, but the channel member rotates during system operation, so centrifugal force acts on the fluid above and below ring 1162 to retain fluid in the channel member. Enough fluid remains above and below the ring to prevent vapor flow through the seal.

Lower or second rotary seal 1181 (FIGS. 10, 11, 13 and 15) operates on similar principles. A stationary ring extends into a channel, which contains water. The pressure above and below the ring is different. Rotation of the channel generates centrifugal force on the water in the channel. The pressure difference above and below the ring provides a different force on the water above and below the ring, but the centrifugal force on the water forces the water into the channel to retain the water in the channel. The water blocks vapor from passing beyond the seal.

The structure for lower seal 1181 includes ring 1186, which is pinned between vertical support 1743 of lower diverter 1740 (FIGS. 15 and 16) and annular fitting 1192. The vertical support and annular fitting are threaded together at 1194. The ring extends outward into channel member 1185 at the bottom of rotating bearing support 1063. See FIGS. 16 and 26. Applicants use one or more short lengths of Tygon or other appropriate flexible polymer tubing (not shown) extending between conduit 1165 through center post 1050 and small hole 1174 (FIG. 24) through lower diverter 1740 to add water to the channel. Wastewater flowing out the tubing flows into channel member 1185.

FIG. 16 shows a single conduit through annular fitting 1192, but the fitting could have several conduits to provide wastewater at spaced-apart locations of channel member 1185. If so, lower diverter 1740 could have multiple holes, each attaching to Tygon tubing. Each piece of tubing would connect to conduit such as conduit 1195 in fitting 1192. Wastewater flows through the tubes and through opening 1174 in ring 1175 (FIG. 23).

Water in the channel member above ring encounters lower-pressure vapor from the shells' boiler sides like boiler side 1022 of shell 1020 than the water below the ring, which is higher-pressure vapor from the blower. Centrifugal force from bearing support's rotation urges liquid above and below ring 1186 to hold the liquid in the channel member and create a seal. The effective radius of lower seal 1181 is greater than the radius of upper seal 1160 so g-force on the liquid in seal 1181 could be greater than the g-force on the liquid in seal 1160. The designs of the two seals can account for the different radii and g-forces.

The vapor pressure differential that can be sealed depends upon the fluid density ($\rho$ (slightly less than 1 g/cm$^2$ for 70° F. (21° C.) water), the fluid height differential ($\Delta r$) on opposite sides of stationary rings 1162 or 1162 and the g-force applied to the fluid in the channel. The g-force is a function of the rotational speed ($\omega$) and the radius from the channel to axis of rotation 1052. Proper design of channel members 1171 and 1185 provides flexibility over the allowable pressure differences ($\Delta p$) and operating spin speeds ($\omega$) required to achieve a rotating vapor seal.

Lower rotary seal 1181 receives contaminated water while the processor runs so some water overflows the lower seal. Any overflowing contaminated water flows onto upper surface 1793 of lower diverter 1740. The surface is inclined and contoured to direct the overflow water to hole 1794 (FIG. 26). Stand-off tube 1451 (FIGS. 23 and 26) projects downward from the diverter below hole 1794. Surrounding ring 1452 creates a seal between the stand-off tube and the bottom of lower diverter. Excess contaminated water flows into the stand-off tube. The stand-off tube is a port to the bottom of the lower housing for creating the process's near-vacuum by evacuating the entire processor.

The contaminated water flowing through stand-off tube 1451 cannot drain directly while the system operates because the top of the stand-off tube is at near-vacuum pressure and cannot flow outside where the pressure is atmospheric (14.7 psia). Draining the stand-off tube while the system is not in operation and the internal pressure is atmospheric allows removal of water in the system. The stand-off tube could drain to a valve, and a tube leading downstream from the valve could be S-shaped. The S-shape acts as a trap to prevent fluid and vacuum flow.

The stand-off tube also connects to a vacuum pump to evacuate the vacuum housing and to apply a vacuum occasionally to account for small pressure increases. The vacuum pump would not run if any water were trapped in the S-shaped drain tube. If fluid accumulates inside the drain tube, the user would close a valve (not shown), and the tube would be detached and then drained.

Applicants could provide a container downstream from stand-off tube 1451. The container captures the drained water, but the tube leading to the container remains above the drained water. A valve would be provided between the stand-off tube and the container. A tube connects the vacuum pump to the container above the drained water. When the vacuum housing requires additional vacuum, the valve between the stand-off tube opens. Because the tube to the vacuum pump and the stand-off tube are above the water in the container, the vacuum pump can draw vacuum directly through the stand-off tube. When the container has too much water, the valve to the stand-off tube is closed, and a second valve on a drain tube from the container opens to drain the container.

Operating the System: Before operation begins, vacuum chamber 1002 is evacuated. Standoff tube 1451 is attached to a vacuum pump to lower the pressure in vacuum housing 1008 to near vacuum, ≈0.5 psia. The tube is one of the few parts crossing through the housing between vacuum and atmospheric pressure. Therefore, the seal between the tube and the housing must be good enough for the vacuum. The system may not operate during the initial evacuation so boiler-condenser housing 1008 and blower 1210 remain stationary. This system also may use vacuum seals (discussed below) that only seal when the boiler-condenser assembly 1000 rotates. Air and vapor inside the housing pass through the seals during the initial evacuation. The boiler chambers like chamber 1028 and condenser chambers like chamber 1031 are at the same vacuum during initial evacuation.

Motor 1214 activates to rotate blower/compressor 1200. Seals are re-activated with fluid to seal the low vapor pressure difference developed by the blower between condenser chambers like chamber 1124 and the boiler chambers like chamber 1128 (FIG. 14) of boiler-condenser assembly 1000.

The vacuum pump shuts off when the vacuum chamber reaches its normal operating near-vacuum pressure. The incoming contaminated water may contain dissolved $O_2$, $N_2$, Ar, $CO_2$ or other non-condensable gases. When the water boils, the non-condensable gases become a component of the vapor, but they don't condense and remain in the vapor. Their presence adds to the internal pressure, i.e., decreases the vacuum. Occasional, later evacuations may be needed during the system's operation to maintain the desired vacuum.

When the stand-off tube it is not being used to evacuate the housing, it can act as a drain for incoming contaminated water overflowing lower rotary seal 1181. Any excess contaminated water drips onto the top-side of lower diverter 1740. The diverter's top surface directs water to opening 1744 (FIG. 26), which aligns with stand-off tube 1451.

Housing 1000 and its internal boiler-condenser assembly (including the bearings, seals, wipers, inlet feeds, and central axis) may be removable as a unit from its FIGS. 10 and 11 operating orientation for replacement or maintenance.

The system also could use a housing that accepts one, two or more boiler-condenser shells and components. Such variation could provide varying amounts of potable water throughputs. The compressor chosen for different numbers of shells should be capable of operating over a range of operating conditions, i.e., speeds of rotation to accommodate the increased vapor flow rates.

Continuous thinning of the boiling fluid from the rotational induced g-forces on the fluid as enhanced by the wiper blades increases the boiling heat transfer coefficient by an order of magnitude or more over conventional boiling distillation. Likewise, g-forces throw condensate from the condenser surfaces, and the wiper blades remove liquid that g-forces don't throw off. These combined actions create fresh, exposed metal surfaces for condensation, which should enhance the heat transfer coefficient of the condenser by an order of magnitude or more. Applicants' system should have heat transfer values between 2,000 to 6,000

$$\frac{Btu}{hr\, ft^2\, °F}$$

($\approx 1.1 \times 10^4$ to $3.4 \times 10^4$ W/m²° C.). 1 Btu/hr≈0.29 watts. The heat transfer values are about an order of magnitude greater than values for conventional boiler-condenser systems.

Figure 31:
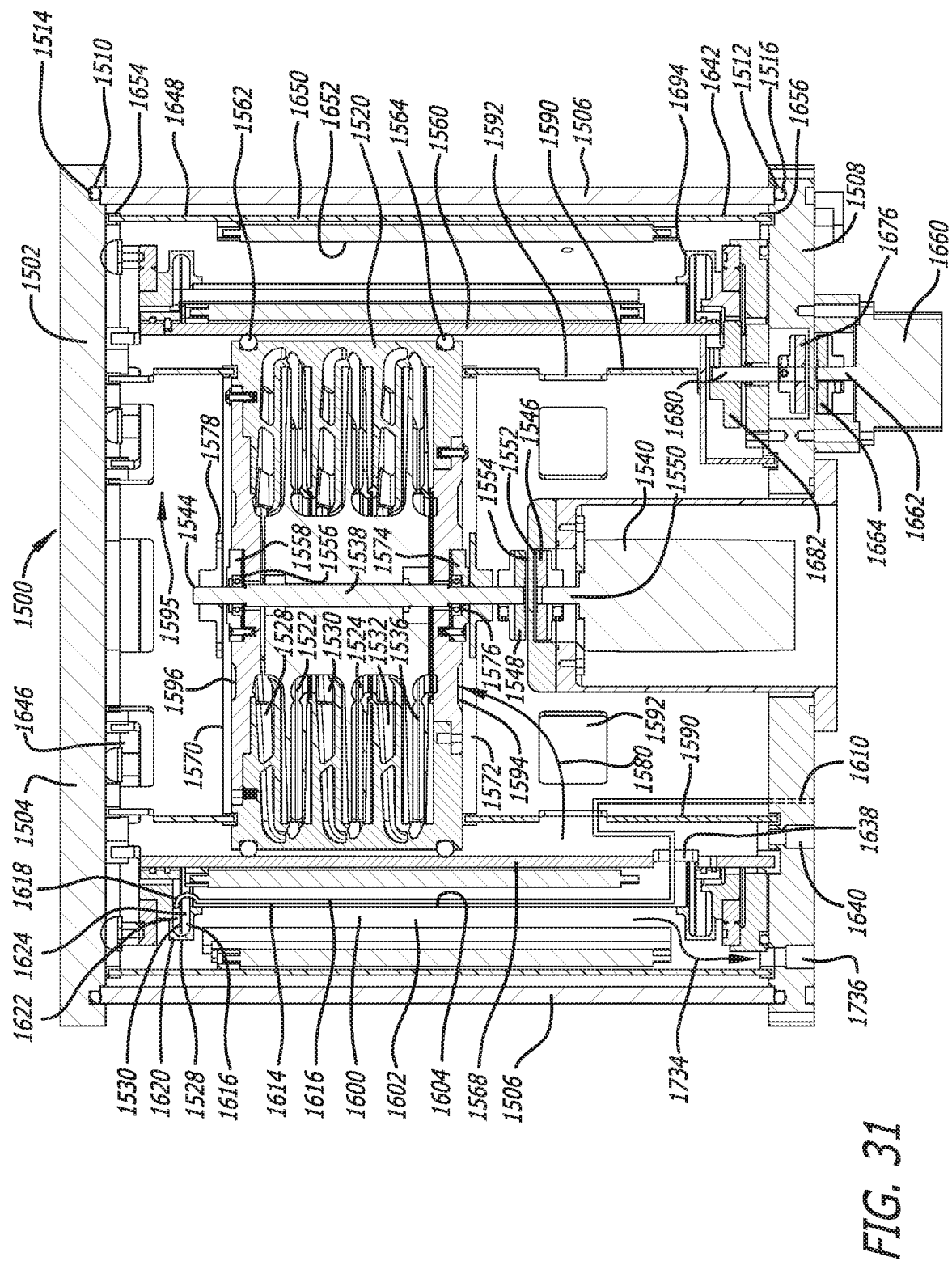
FIG. 31 is a plan view of different version of the processor.

FIGS. 31-39 show another version of the processor. The drawings show a single boiler/condenser shell. The system could be modified, however, to use multiple shells. Most components of this version 1500 are within housing 1502 (FIG. 31). The housing includes upper housing plate 1504, cylindrical housing wall 1506 and bottom housing plate 1508. The top and bottom of the cylindrical housing wall seats in grooves 1510 and 1512 of the housing plates. O-rings 1514 and 1516 seat in the grooves so that the inside of the housing is sealed. The housing connects to a vacuum pump (not shown) to lower the pressure in the housing to near-vacuum. The vacuum pump only operates during the initial evacuation. but it also may operate occasionally if the incoming contaminated water contains dissolved $O_2$, $N_2$ or $CO_2$. These gasses do not condense, so they may raise the pressure. The occasional vacuum pump operation may have to decrease the pressure within the housing back to desired levels.

Blower/compressor 1520 is inside compressor housing 1560 (FIG. 31), which mounts within housing 1502 (FIG. 31). Three-stage compressor 1520 is fixed inside compressor housing 1560 (FIG. 31), which is formed from cylindrical support 1568 with top and bottom cylindrical walls 1595 and 1590. O-rings 1562 and 1564 prevent backflow of compressed vapor from the compressor. The top and bottom cylindrical walls attach to the top and bottom compressor housing 1520. The three-stage compressor has three rotors 1522, 1524 and 1526 mounted in respective stators 1528, 1530 and 1532. A three-stage compressor is used because it fits in this version of the processor, but different numbers of stages could be used. Blower motor 1540 rotates the compressor's rotors. The motor mounts within motor housing 1542, which is open to atmospheric pressure. The motor rotates compressor shaft 1544 through a magnetic coupling comprising magnets 1546 and 1548. The motor rotates shaft 1550, which connects to and rotates magnet 1546. Rotation of magnet 1546 rotates magnet 1548, which attaches to and rotates compressor shaft 1538. Air gaps 1552 and 1554 surround the magnets to prevent friction from other structure acting on the magnets. Using the magnetic drive avoid potential leaks caused by conventional rubber or plastic seals around the compressor shaft.

The top 1544 of compressor shaft 1538 extends through upper bearing 1556 inside bearing support 1558. One or more pins or screws (not shown) may secure the bearing support to top of blower 1520. Lower bearing support 1574 holds bearing 1576. The upper and lower bearings 1556 and 1576 allow the compressor shaft to rotate freely. Balance ring nut 1578 at top 1544 of the shaft allows rotational balancing of shaft 1544 and rotors 1522, 1524 and 1526 in compressor 1520. The motor may rotate about 2,000 rpm depending upon the chosen configuration and operating conditions. These small motors are efficient and normally waste little electrical power.

Boiling and condensing of water vapor on the boiling/condenser shell is discussed later. Limiting the discussion to compressor 1520 and its related structure, arrow 1580 shows the vapor path from the shell to the compressor. Lower cylindrical support 1590 has spaced-apart vapor passage windows 1592. Vapor passing through the windows is at a pressure lower than vapor exiting compressor 1520. FIG. 31 has eight such windows though not all are visible. The vapor from the window passes though openings 1594 into the compressor, which raises the pressure of the vapor.

Compressor 1520 may raise the pressure of the vapor Δp 0.04 psia to 0.14 psia (0.28 kPa to 0.97 kPa). The corresponding temperature rises ΔT will be about 2° F. to 13° F. (≈1° C. to 5° C.) under normal operating conditions. The elevated-pressure vapor flows from blower 1210 through openings 1596 in top wall 1570. From there, the vapor flows along paths following arrow 1598.

The vapor contacts condenser surface 1602 of shell 1600. Contaminated water boils from the boiler surface 1604 as discussed below. Heat transferred across the shell by vapor condensation on the condenser side is the sole energy source to cause boiling and phase change on the boiler side. As the boiled vapor evaporates from the filmed wastewater, heat energy is removed at the same rate that heat energy is transferred across the shell from vapor condensation. The rate of evaporation (in gallons per day or liters/hour) is linearly proportional to, and governed by, the excess temperature difference, $\Delta T_{BC}$, generated by the added compression energy generated by the blower. The temperature of the shell remains fixed at the constant temperature of the input wastewater. The shell is colder than the compressed vapor exiting the blower, which causes condensation to occur on the shell condenser surface. Shell 1600 also is thin, e.g., 0.004 in. to 0.015 in. (≈0.10 mm to 0.38 mm) and formed of material with a high heat-conductivity. When higher temperature vapor from compressor 1520 contacts the colder-temperature condenser surface, the vapor changes phase and condenses as pure water on the surface. Wipers for removing condensate from the condenser surface and components for collecting the pure water are discussed later.

Contaminated water enters the processor from inlet 1610. The inlet connects to a Tygon® tube 1614 or another conduit. The inlet in FIG. 31 can be positioned at different circumferential positions that do not interfere with other structure. The tube extends upward at 1616 and bends downward at bend 1618 into upper seal 1620. The seal uses principals similar to those used by seal 190 (FIG. 4).

Contaminated water from the end of the bend top 1616 flows into bottom 1624 of channel 1616 below blade 1628. Seal 1620 extends outward from the blower support cylinder 1568 (FIG. 31) so the channel revolves around the axis of this cylinder. Contaminated water below the blade flows over the blade and into top 1624 of the channel Centrifugal force from the shell's rotation urges contaminated water to the outside (left in FIG. 31). The top 1622 of channel 1616 is subjected to the higher pressure of vapor from compressor 1520, so the sum or the pressure force and the centrifugal force acting above the blade is greater than the centrifugal force alone acting below the blade. The size of channel 1616 and the length of blade 1638 prevent the inside edge of water above the blade to pass the blade's outer edge so seal 1620 maintains a seal when the shell rotates. Paragraph [0124] describes the seal's mathematics.

Channel 1622 containing the "plug" of water above the blade is longer than the channel 1616 below the blade. The incoming water, therefore, overflows the seal. The inside of channel 1616 is positioned close to the top of boiler surface 1604 of shell 1600 allowing the overflow of water to spread and reach the boiling surface. "Centrifugal" force keeps the contaminated water on the boiling surface, and gravity and the centrifugal forces spread the contaminated water along the boiling surface.

Some water of the contaminated water boils, and the resulting vapor will become pure water. What remains from the contaminated water that doesn't boil remains as liquid wastewater where it becomes more concentrated with contaminants as water vapor exits the contaminated water.

Gravity and centrifugally assisted forces from contaminated water at the top of shell 1600 cause the wastewater to flow downward toward the shell's bottom.

The wastewater reaches lower seal 1630 and contacts blade 1632, which extends radially inward beyond shell 1600. See FIG. 32. The wastewater flows around the outside edge of the blade in upper part 1634 of the seal and into the lower part 1636 of the seal. Centrifugal force from shell rotation causes the wastewater above and below the blade to form a plug. The lower part of the seal is under higher pressure from the compressor than the upper part of the seal, which is subject to the lower pressure from the boiler surface of the shell. The centrifugal force on the water forms a plug of wastewater to act as a seal, preventing vapor from flowing through the seal.

The inside edge of wastewater in the upper part 1634 of the seal becomes aligned with the boiler surface because the full seal cannot accept more wastewater. The wastewater flows off the inside diameter portion of the blade extending radially inside shell 1600. To facilitate wastewater flow, the blade may be angled downward on the inside diameter of the blade.

Like upper seal 1620, the top and bottom of lower seal 1630 are subjected to different pressures (top under pressure from boiler and bottom under higher pressure from compressor). The seals size, the lengths of upper part 1634 and lower part 1636 of the seal, and the length of blade 1632 are designed so water will not flow through the seal when shell 1600 rotates.

Wastewater that flows off blade 1632 passes through an opening 1638 cutout at the bottom of lower cylindrical support 1568. FIG. 31 has eight such openings, but not all are visible in FIG. 31. The wastewater collects between the outside of lower cylindrical support 1590 and the cylindrical wall 1568 of compressor housing 1560 where it can flow into wastewater outlet 1640. Removal of wastewater from the outlet is discussed below.

Figure 32:
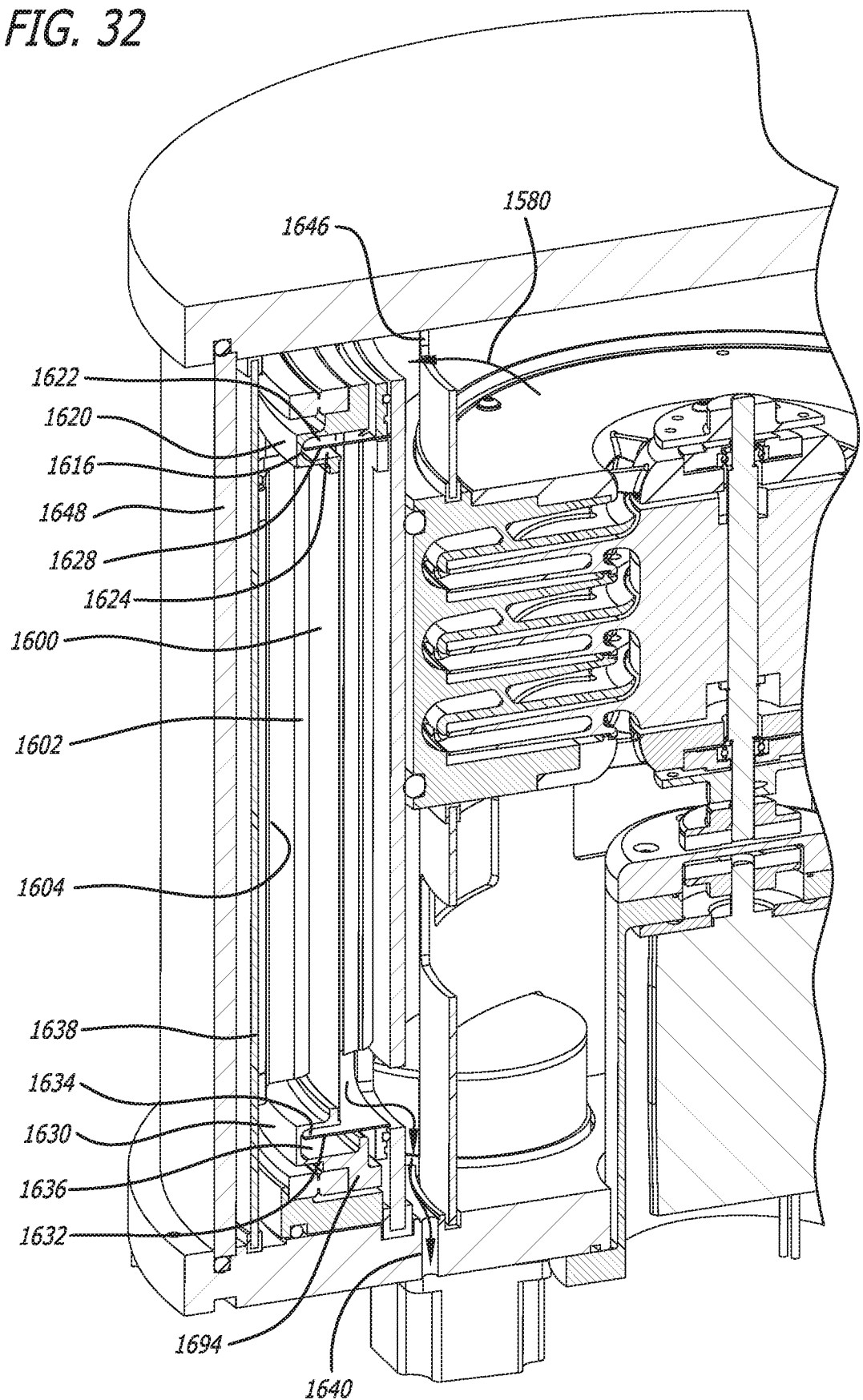
FIG. 32 is partial front cutaway, perspective view of the FIG. 31 processor.
Figure 33:
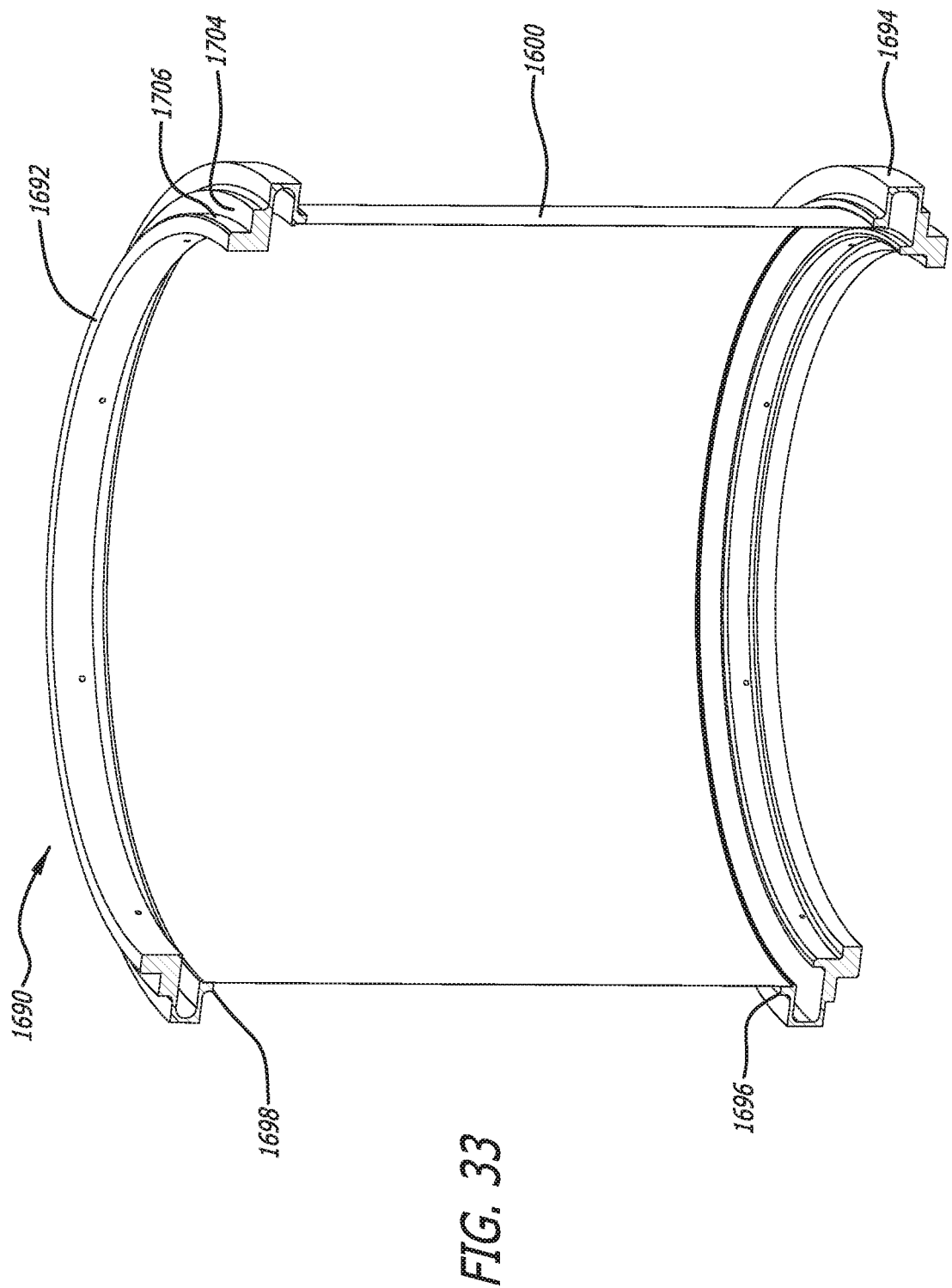
FIG. 33 is a cutaway, perspective view of the shell used with the processor of FIG. 31.
Figure 34:
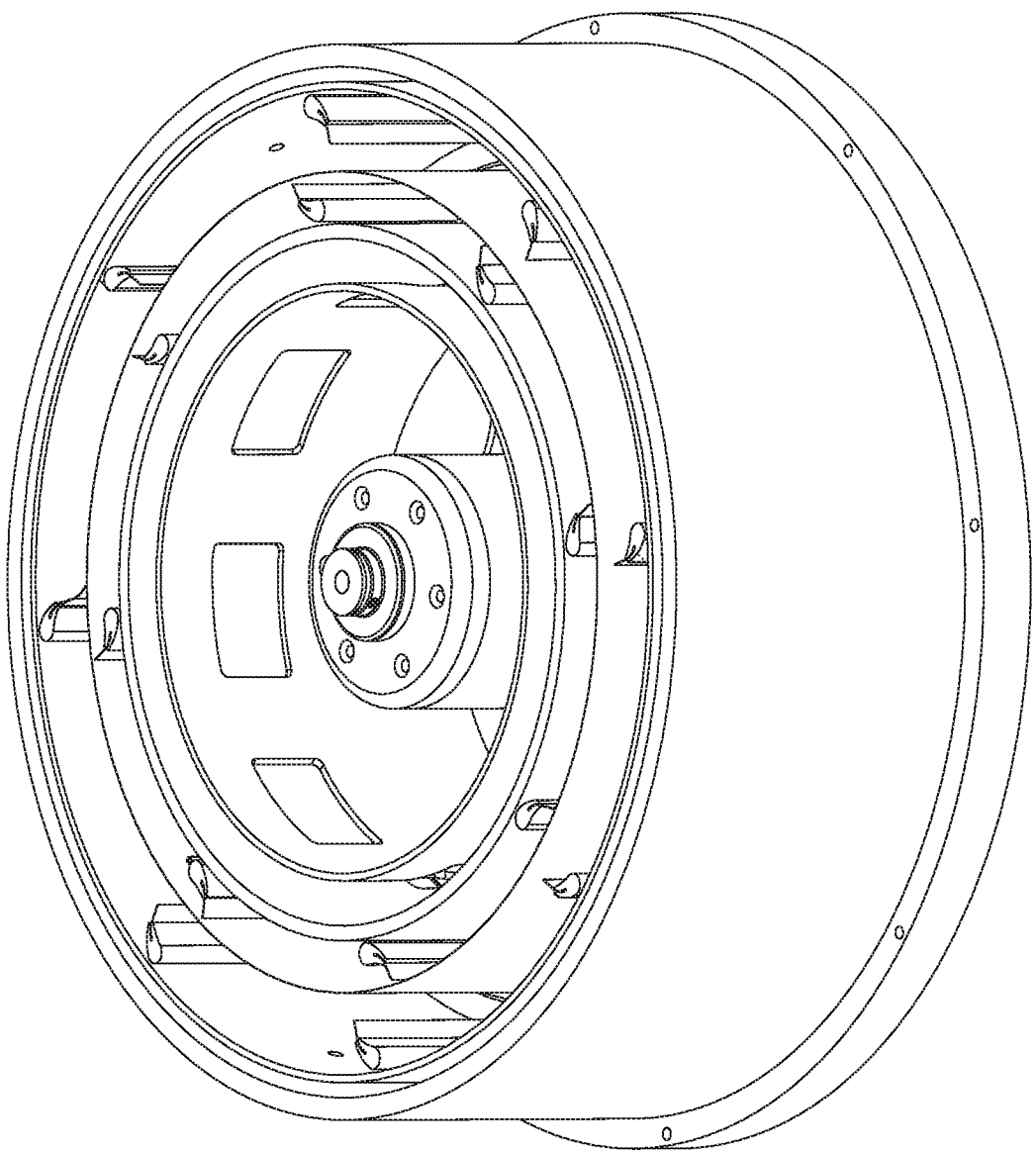
FIG. 34 is a top cutaway, perspective view of the FIG. 31 processor with the compressor removed.

Returning to the pure water vapor boiled from boiler surface 1604 of shell 1600, the vapor follows the path shown by arrow 1580 though the compressor 1520. FIG. 32 show the continuation of the arrow. The vapor passes though cutouts 1646 at the top of support 1595. The support structure 1648 holds wipers facing and in contact with the shell's condenser surface 1602. The wipers are discussed below. The vapor condensing on the condenser surface will form droplets, that fling off the surface from the shell's rotational g forces, but the condenser surface retains at least some thin condensate. Surface tension holds this condensed water on the shell. Wipers help remove condensate from the shell and leave exposed metal surface for forming new condensate. This considerably enhances the condensing heat transfer coefficient and improves overall thermodynamic efficiency, so the processor uses less energy per each unit mass of freshwater produced.

External wipers 1650 mount on wiper support 1648. In FIGS. 31 and 32, the eight wipers extend vertically the length of the condenser surface 1602. Each external wiper has an inward facing wiper blade 1652 in contact with the condenser surface. As with other versions of the processor, the wiper blades could be angled or divided into sections. To decrease friction between the wiper blades and the condenser surface, the blades may be formed of Teflon® or another low-friction material. The external wiper also may present a sharp edge instead of a flat surface facing the condenser surface. Internal wipers, which spread contaminated water along the boiler surface, are not shown in FIG. 31 or 32, but they could be added.

Figure 35:
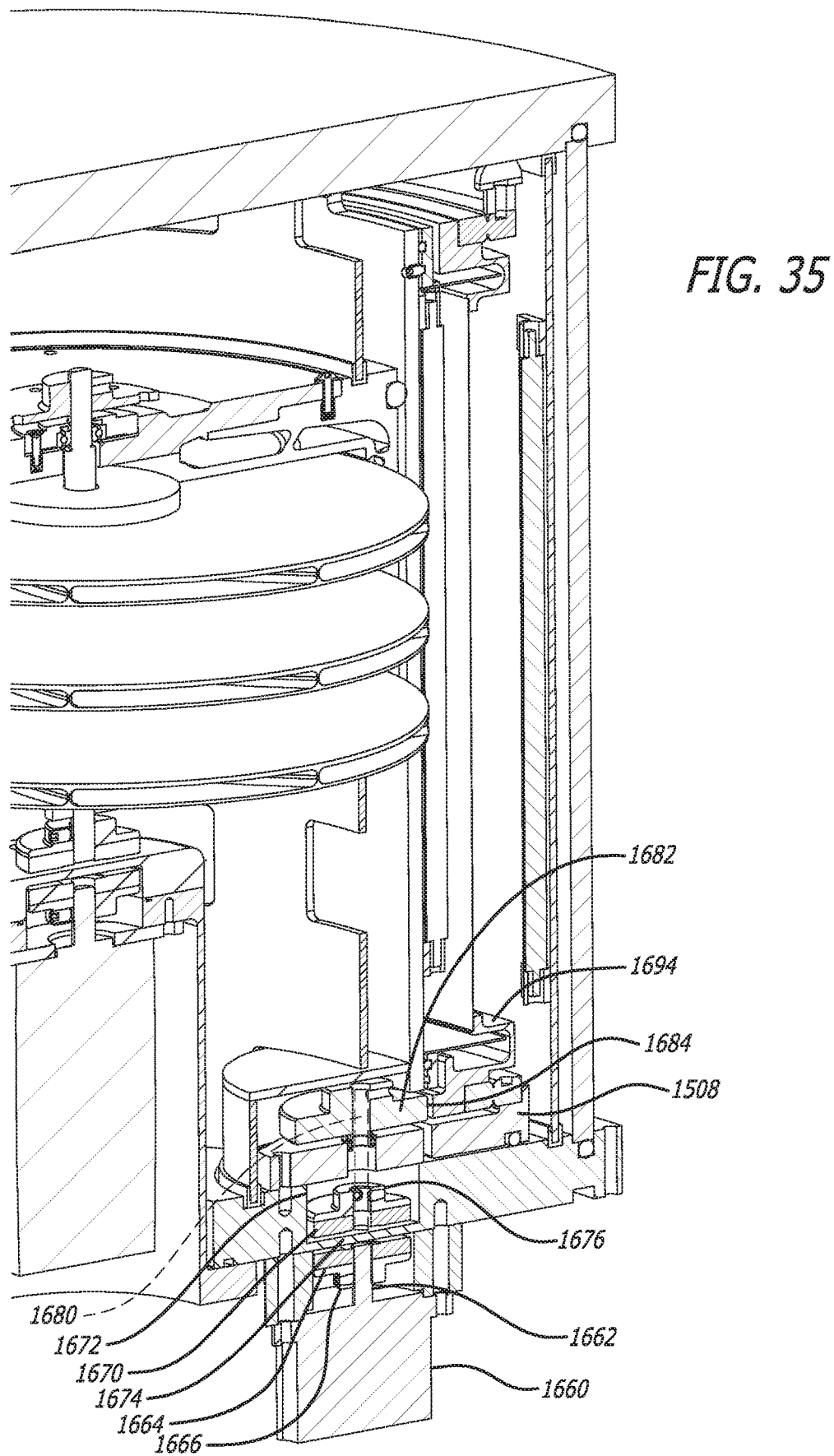
FIG. 35 is a partial cutaway perspective of the processor of FIG. 31, which shows details of the drive for the shell.
Figure 36:
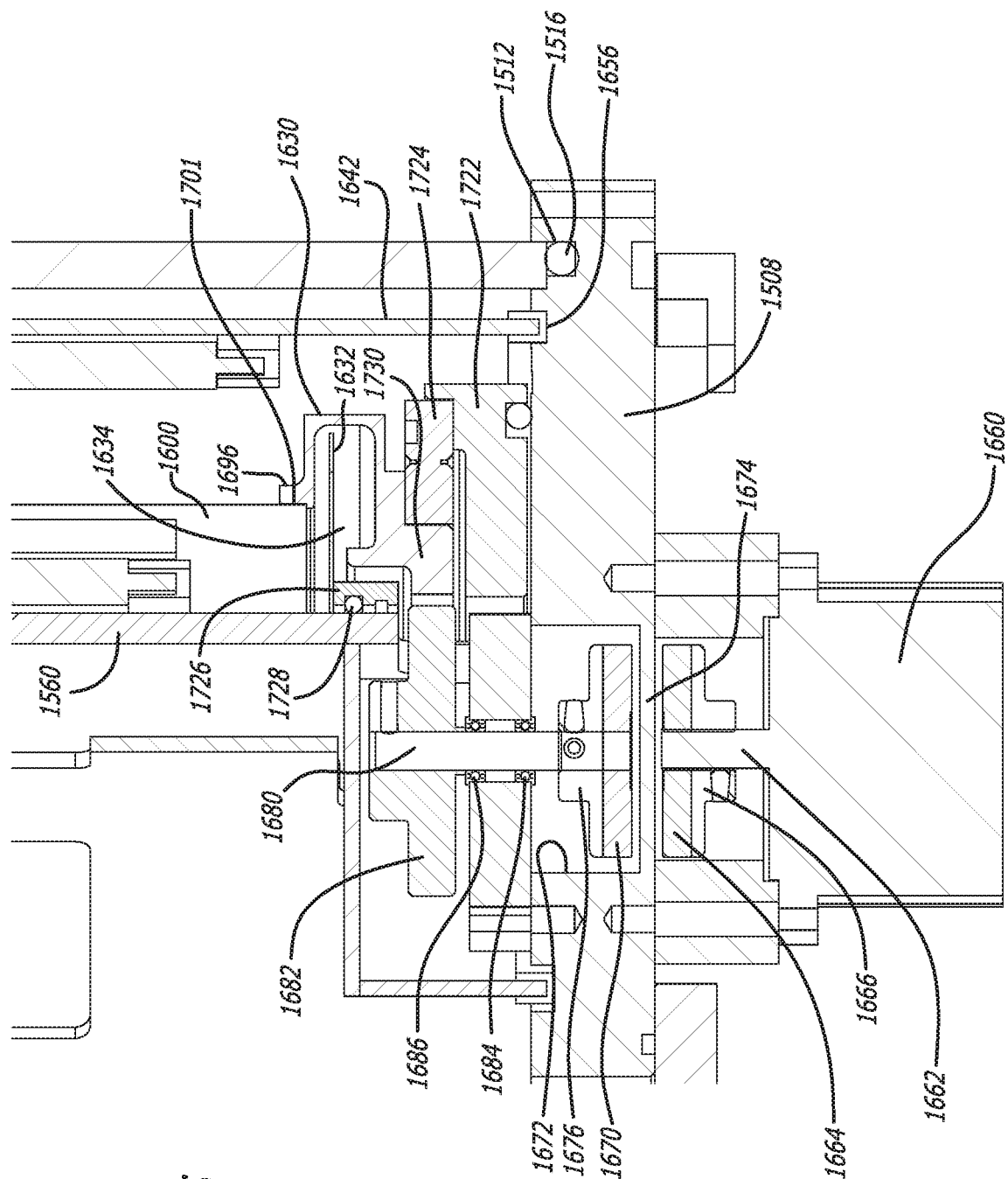
FIG. 36 is a partial front sectional view of the processor of FIG. 31, which shows details of the drive for the shell and the lower seal.

Other versions of the water processor used one motor to drive all rotating parts. this version uses two separate motors, one, motor 1540, drives the compressor and the other, motor 1660 drives the shell's rotation and other structure. Motor 1660 is best seen in FIGS. 35 and 36.

Motor 1660 mounts below lower outer housing plate 1508. The motor rotates shaft 1662, which rotates lower magnetic coupler 1664. Bolt 1666 secures the magnetic coupler to the shaft. Upper magnetic coupler 1670 mounts in slot 1672 of housing plate 1508. The slot leaves thin wall 1674 between the magnetic couplers. Bolt 1676 secures the upper magnetic coupler to shaft 1680. Shaft 1680 extends upward from the upper magnetic coupler through bearing 1684 and 1686 and attaches to and rotates driver 1682.

Before describing that driver rotates shell 1600, the shell subassembly (FIG. 33) is discussed. Shell subassembly 1690 includes the thin, high heat conductive shell and upper 1692 and lower 1694 shell supports, which add rigidity to the thin shell. Circular rim 1696 in the lower shell support attaches to the bottom of the shell and complementary circular rim 1698 in the upper shell support attaches to the top of the shell. The rims may have small shoulders 1701 and 1702 to provide more support for the shell. See FIGS. 36 and 37.

Figure 37:
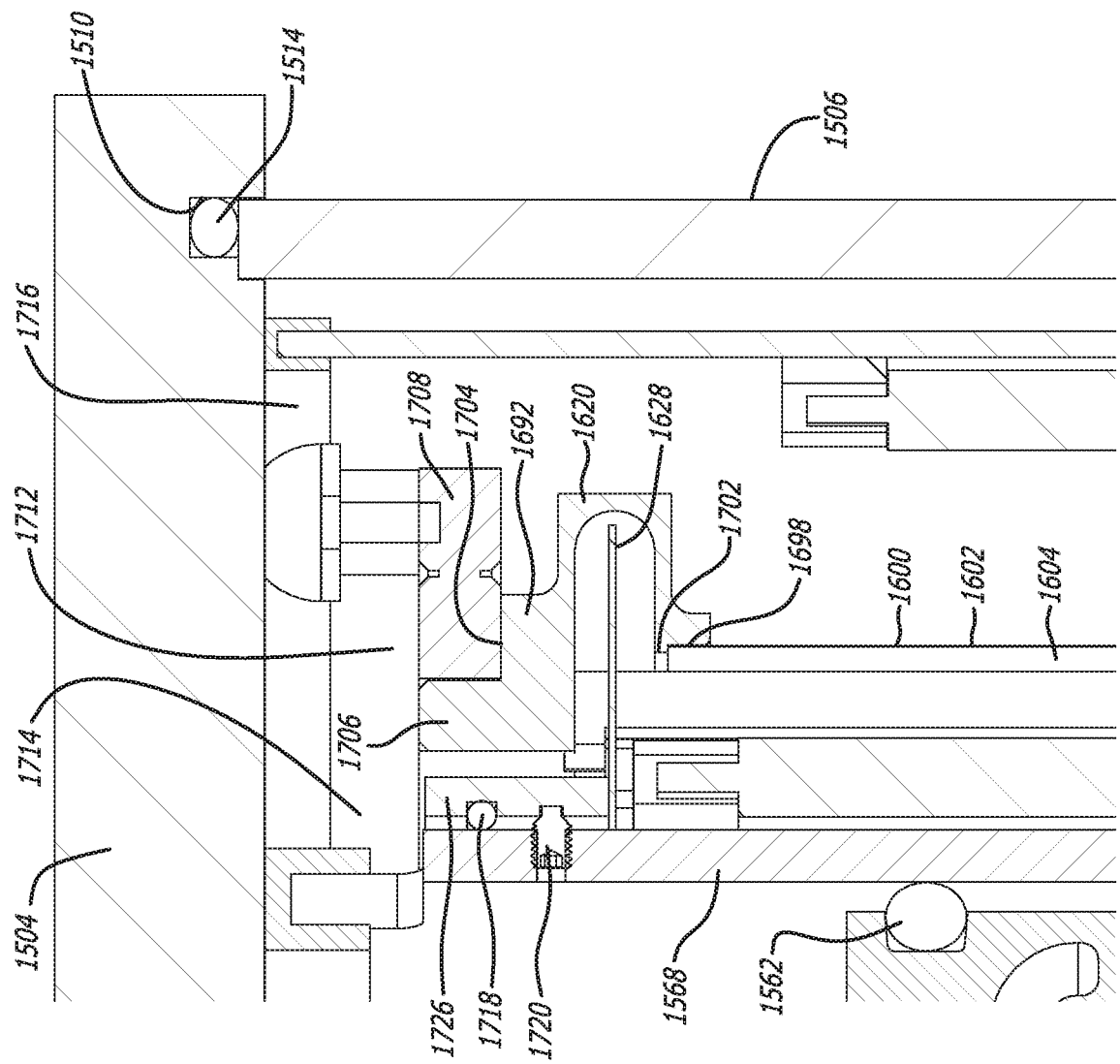
FIG. 37 is a partial front sectional view of the processor of FIG. 31, which shows details of the upper seal.

Upper shell support 1692 also forms the structure of upper, rotating, U-channel seal 1620 that receives blade 1628 (FIGS. 31, 32 and 37). Lip 1704 and rim 1706, which are above the seal receive ring bearing 1708 (FIGS. 31 and 37). The right side of the bearing is stationary, and the left side rotates as the upper shell support revolves with the shell. Upper ring bearing supports 1712 and 1714 are stationary. An annular piece of foam 1716 is between upper outer housing plate 1504 and the upper ring bearing supports. FIG. 37 also shows O-ring 1718 between the condenser and boiler sides of the shell preventing vapor from flowing between them. Stationary ring support 1726 is glued or otherwise attached to the upper seal's blade 1628. Set screw 1720 attaches the stationary ring support to cylindrical wall 1568 of compressor housing 1560.

Lower shell support 1694 (FIGS. 31, 32, 33 and 36) shares similarities with upper shell support 1692. Rim 1696 attaches to the bottom of shell 1600 (FIG. 36). The rim is at the top of lower seal 1630. Bearing support 1722 supports bearing 1724. The outside of the bearing is stationary; the inside rotates. The outside of structure 1726 below the lower seal receives the top of bearing 1724, and the inside of the structure is an annular ring 1730 that extends around the lower shell support.

When shell motor 1660 rotates driver 1682 through magnetic coupler 1664 and 1670, the driver engages the vertical surface of annular ring 1730 to cause shell 1600 and its associated structure to rotate. The outside of driver 1682 may be rubber or other substance with high friction to prevent slipping between the annular ring and the driver. Other connections between the drive and the annular ring such as teeth and gears are contemplated, but applicants think the friction drive will be quieter.

FIG. 36 also shows stationary ring support 1726. O-ring 1728 preventing vapor from flowing between the condenser and boiler sides of the shell. Set screw 1732 may attach the stationary ring support and cylindrical wall 1568 of compressor housing 1560 together.

Contaminated water inlet 1610 and wastewater outlet 1640 have been discussed. Freshwater from the shell's condenser surface 1602 and condenser wipers 1650 flows downward following the path of arrow 1734 to freshwater outlet 1736. But the vacuum inside the processor prevents wastewater from flowing through wastewater outlet 1640 or freshwater flowing through freshwater outlet 1736 because the ends of the outlets are at atmospheric pressure. Applicants use pitot pumps 1740 and 1742 (FIG. 39) to pull the freshwater and wastewater through the outlets. The pitot pumps are similar to pumps 1712 and 1722 in FIGS. 10 and 11. The pitot pumps in FIG. 39 mount to rotate about the same horizontal axis, but they can mount differently, such as rotating about vertical axes like the pumps in FIGS. 10 and 11.

Pitot pumps 1740 and 1742 are similar enough so only pump 1740 is discussed. One of ordinary skill can modify pump 1742 is necessary.

The housing for pitot pump 1740 includes base 1746 and cylindrical upper housing 1748 attached to the base. See FIG. 38 Groove 1750 receives an O-ring (not shown) to seal the base and upper housing. One side 1752 of a magnetic coupler mounts for rotation with rotating shaft 1754 in recess 1756. Bearing 1758 and 1760, which are supported by the bearing support structure 1762, support the shaft for rotation. One or more screws 1764 attach the bearing support structure to the cylindrical upper housing.

Figure 38:
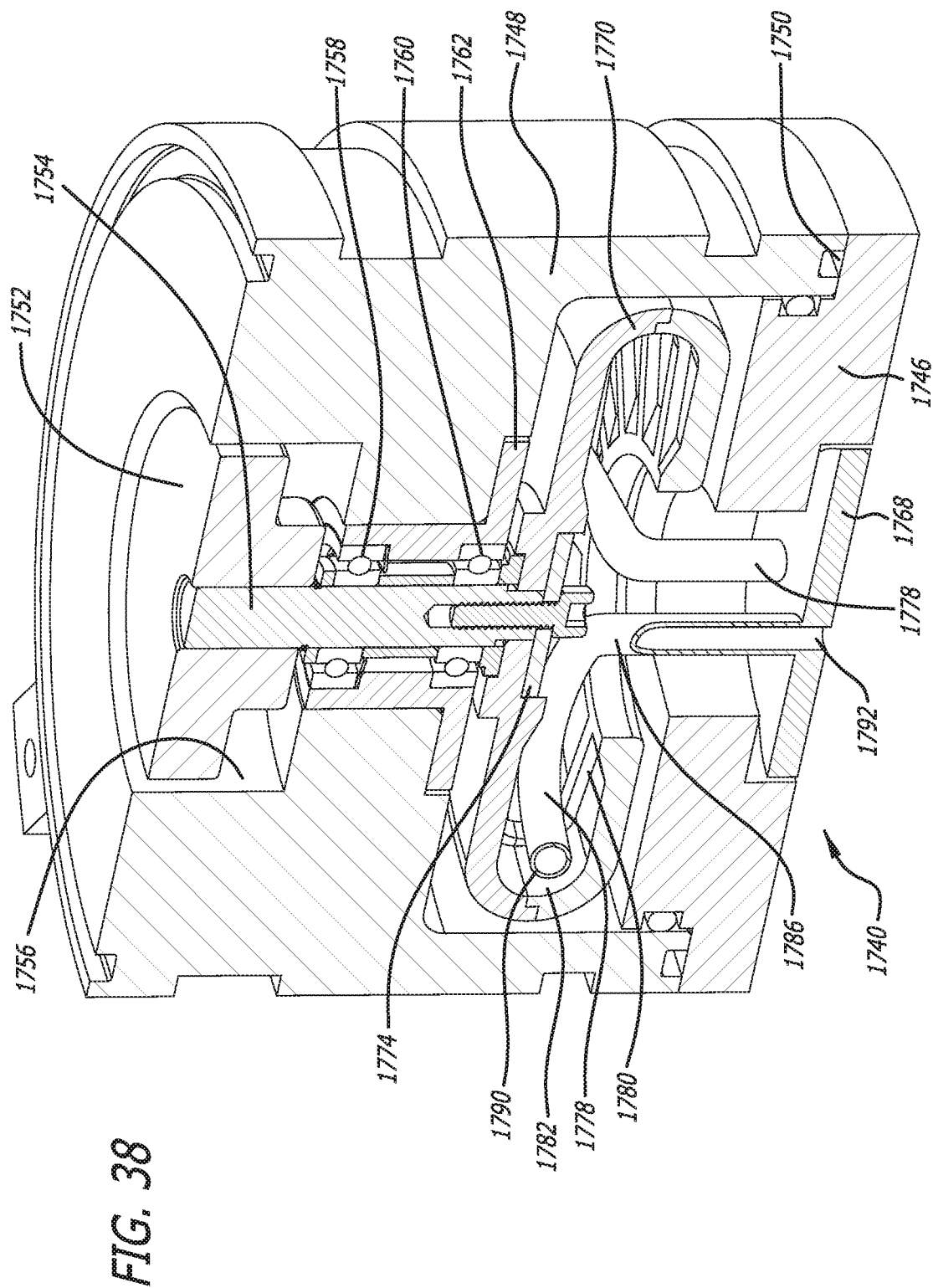
FIG. 38 is a perspective view in cross-section of one pitot pump used with the processor of FIG. 31.

Pitot pump 1740 includes rotating cavity 1770 in space 1772 (FIG. 38). Washer 1774 is in the rotating cavity, and screw 1776 attaches the rotating cavity through washer 1774 to shaft 1774. Shaft rotation causes cavity 1770 to rotate.

Rotating cavity 1770 is at the near-vacuum pressure inside housing 1502. Water from the freshwater outlet 1736 (FIG. 31) flows into pitot tube inlet 1778 (FIG. 38). The pressure in inlet 1778 and rotating cavity 1770 is the same—near vacuum—so pressure differences do not prevent flow. Rotation of cavity 1770 causes water collected there to rotate with the cavity, and centrifugal force urges the water against the outside 1782 of the rotating cavity. Vanes 1780 aid water in the cavity to rotate at or near the velocity cavity wall's 1718 velocity.

Pitot tube 1786 has an upright section 1778 extending through plate 1768 and into rotating cavity 1770. The upright section bends into horizontal, curved section 1788. As FIG. 38 shows, the circular, open end 1790 of the curved section is near the cavity's inner wall 1718. The open end may be tapered, and it should be aligned with the axis of the rotating cavity.

As cavity 1770 and the water inside the cavity rotates, the water reaches the pitot tube's open end 1770 and flows into pitot tube 1786, which causes the pressure to increase. The water pressure can rise to atmospheric pressure (14.7 psia or 101 kPa) if the cavity's rotational velocity and the radii of curved section 1778 and opening 1790 are designed properly. When the water pressure is above atmospheric pressure, it can flow through the pitot tube's upright section 1786 and through opening 1792 and into a container or other collector (not shown).

Ideally, freshwater outlet 1736 (FIG. 31) is positioned to connect with inlet 1778 of freshwater pitot pump 1740. Wastewater outlet 1640 (FIG. 31) also would be positioned to connect with the inlet for wastewater pitot pump 1742. Tygon® or other tubing could carry freshwater and wastewater form their outlets to the respective pitot pump inlet.

Figure 39:
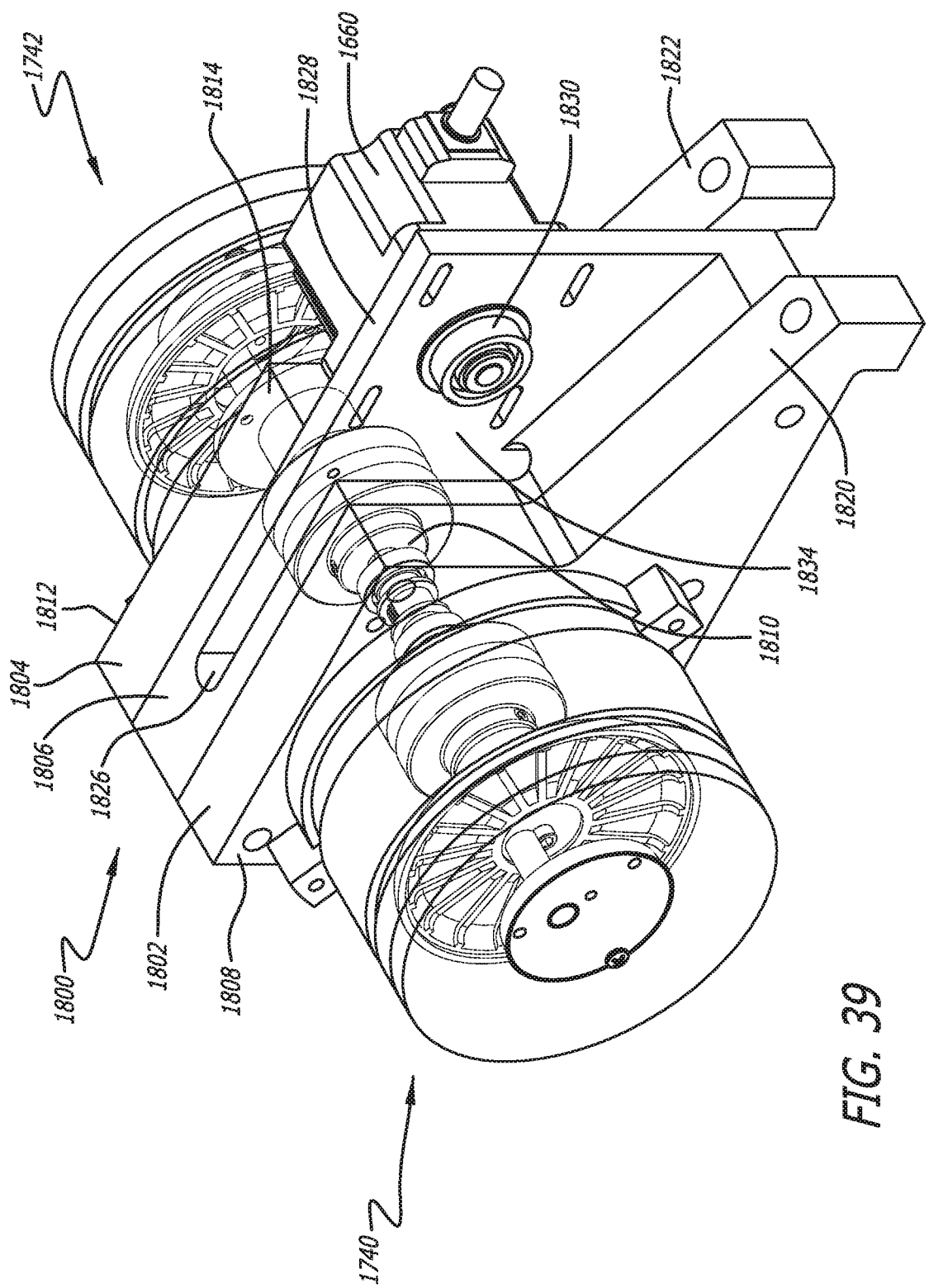
FIG. 39 is front sectional view showing a mounting for the pitot pumps for the processor of FIG. 31.

FIG. 39 shows how pitot pumps 1740 and 1742 mount together on pitot pump assembly 1800. The assembly includes left-side (FIG. 39) plate 1802 associated with freshwater pitot pump 1740 and right-side plate 1804 associated with wastewater pitot pump 1742. Screws of other fasteners 1808, 1810, 1812 and 1814 attach the plates to opposite sides of center plate 1806. Each end 1820 and 1822 can be attached to the bottom of the processor (not shown in FIG. 39).

Center plate 1806 has a center groove 1826. Motor 1660, which also drives rotating shell 1600 (FIG. 31), attaches to one side 1828. First pulley 1830, which is aligned with center groove 1826, mounts of a shaft (not shown) that extends through the center plate. The motor rotates the first pulley. Belt 1834 around the first pulley extends to second pulley 1832 on shaft 1838 in the groove. FIG. 39 does not show the second pulley, but see FIG. 40, which shows it. The components in FIGS. 39 and 40 can be positioned so motor 1660 also can rotate disk 1682 to rotate the shell subassembly 1690. If required, mechanisms could be provided to transfer the motor's rotation to rotate the disk and the pitot pumps.

Figure 40:
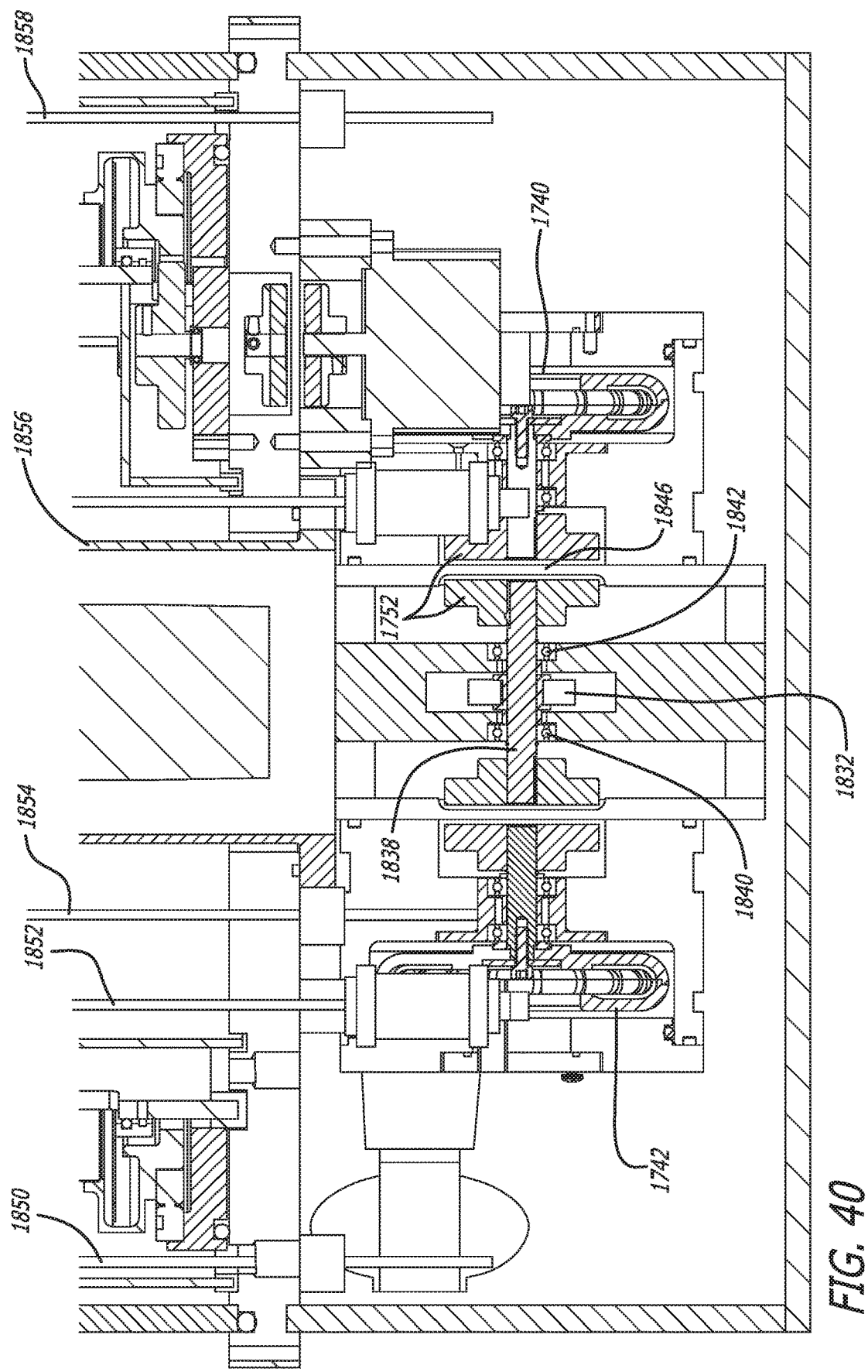
FIG. 40 shows the drive components for the pitot pump assemblies.

Bearings 1840 and 1842 support shaft 1838 for rotation. See FIG. 40. The left side of the shaft connects to and rotates one side 1844 of a magnetic coupler. The other side 1752 (FIGS. 38, 39 and 40) of the magnetic coupler is on the other side of wall 1846 (FIG. 40). That side rotates rotating cavity 1770 as discussed. Shaft 1838 also rotates the rotating cavity of wastewater pitot pump 1742.

Like other embodiments, the outlets from the pitot pumps such as outlet 1792 from pitot pump 1740 may have a reed valve (not shown) like valves 330 and 331 in FIG. 5 or another type of check valve. They can prevent atmospheric pressure air from flowing back through the pitot pump and into the processor if the pitot pump has no freshwater or wastewater or if the pump is off. They may be a pressure drop through the reed or check valve—5 or 10 psia—so the pitot pump's design must account for the pressure drop. Any energy to raise the pressure 5 or 10 psia should not affect the system's efficiency and power usage significantly.

The processor may have sensors to measure the pressure and temperature at different locations. Production models may not include sensors. They may be more useful in test versions. FIG. 40 has four sensors, sensors 1850 and 1852 are used to compute the differential pressure between the boiler side and condenser side of the processor. Sensor 1854 measures the temperature of the boiler side of the shell, and sensor 1858 measure the condenser-side temperature. Sensor 1856 measures the boiler-side pressure. The sensors may connect wirelessly to a computer.

When the housing is being evacuated, internal structure may prevent or slow full evacuation. some areas may not be evacuated fully. The region between wiper support 1648 and cylindrical wall 1506 (FIG. 31) is an example. The processor may have a vaporizing equalizing passage 1880 between condenser surface 1602 of shell 1600 and the outside of wiper support 1648. The passage allows the vacuum on both sides of the wiper support to be equal.

The processor may require regular disassembling for maintenance and cleaning. Over time, contaminants may accumulate on the shell, especially boiler surface 1604. Wastewater passing through pitot tube 1740 and outlet 1792 also may clog with contaminants. To facilitate assembly, repair, cleaning and reassembly, components may be designed for those tasks.

Wiper support 1648 extends into the open ends of U-shaped seals 1654 and 1656 (FIG. 31). The other ends of the U-shaped seals contact top 1502 and bottom 1508 of processor housing 1500. The top and bottom may have grooves to receive the U-shaped seals' other end. The cylindrical wall 1568 also may mount in U-shaped seals 1658 and 1659 (FIG. 32).

Unlike FIG. 1 and other embodiments that use a support extending between upper and lower housing components, the FIG. 31 embodiment uses no central shaft support between the upper and lower housing end plates to support internal components. That structure is advantageous because structures supporting internal components are self-supporting. They can be "placed" as subsystems inside outer cylindrical housing 1500. This allows the use of thinner material for outer cylinder 1506 and the upper and lower housing plates 1049 and 1596. Tolerance variations of the housing and internal components from fabrication errors or by vacuum induced deflections of the housing avoid a mismatching of internal components. Housing deflections do not translate to tolerance variations or stress on the internal parts.

The FIG. 31 embodiment is constructed as a separate outer housing subsystem with a self-contained boiler/condenser subsystem unit inserted into the outer cylinder housing subsystem for assembly or replacement. The outer housing may be one-piece sealed at the bottom with a screw-down lid on top or similar arrangement. The boiler-condenser subsystem could contain the boiler-condenser bearings, boiler-condenser shells (single or multi-shell), boiler-condenser wipers (inner and outer for either single or multi-shells), boiler-condenser dividers (between each boiler-condenser chamber), and stationary boiler-condenser top and bottom support structure to hold the bearings, wipers, and inlet feed water tubes. This allows the boiler-condenser subsystem to be assembled externally and become a replaceable modular item for maintenance.

The bottom stationary support structure of this boiler-condenser subsystem would be fastened to the bottom of the vacuum housing 1508. Blower subsystem 1520 also would be a separate unit with support structure that could be placed into the outer housing and clamped into place to support the blower subsystem. The fresh and waste output streams exit the bottom of the purifier under low-pressure conditions, and flow into the external pitot pump subsystems. The pitot pumps pressurize the freshwater and wastewater outputs, so they can exit to atmospheric conditions. A check valve or reed valve prevents backflow into the processor. A separate motor or a belt system drives the pitot pumps. The pitot pumps may be mounted side-by-side or co-linear.

The description is illustrative, not limiting and is for example only. Although this application shows and describes examples, those having ordinary skill in the art will find it apparent they can make changes, modifications or alterations. Many examples involve specific combinations of method acts or system elements, but those acts and those elements may be combined in other ways to achieve the same objectives. Acts, elements and features discussed only with one embodiment are not intended to be excluded from a similar role in other embodiments.

"Plurality" means two or more. A "set" of items may include one or more of such items. The terms "comprising," "including," "carrying," "having," "containing," "involving," and similar words in the written description or the claims are open-ended, i.e., each means, "including but not limited to." Only the transitional phrases "consisting of" and "consisting essentially of" are closed or semi-closed transitional phrases regarding claims. The ordinal terms like "first," "second," "third," etc., in the claims don't by themselves connote any priority, precedence, or order of one claim element over another or the temporal order in which acts of a method are performed. Instead, they merely are labels to distinguish one claim element having a certain name from another element having a same name (but for the ordinal term's use). Alternatives like "or" include one or any combination of the listed items.

The invention claimed is:

1. A processor for removing contaminates from contaminated water to generate potable water, the processor comprising:
    a) a boiler-condenser assembly and a compressor unit mounted in at least one sealed housing;
    b) the boiler-condenser assembly comprising at least one shell, each shell being cylindrical and formed of a thin wall of heat conductive material, each shell having a top, a bottom, an inside, boiler surface and an outside, condenser surface, and each shell rotating about a longitudinal axis of rotation;
    c) a contaminated water inlet positioned to direct contaminated water from a source to each inside, boiler surface, whereby water may boil on the inside, boiler surface to be converted to vapor when the boiler-condenser assembly is rotating, and any contaminated water not boiling and becoming vapor becomes wastewater, each shell rotating at a sufficient rotational velocity so that contaminated water reaching the inside, boiler surface is held against the inside, boiler surface;
    d) the compressor unit having a compressor with a lower-pressure inlet and a higher-pressure outlet;
    e) the lower-pressure inlet of the compressor communicating with the inside, boiler surface of each shell, the compressor being adapted to raise the pressure of vapor from each inside, boiler surface, the higher-pressure outlet of the compressor communicating with the outside, condenser surface of each shell, whereby vapor condenses on the outside, condenser surface of the shell as potable water, and the energy from condensation transfers heat and raises the temperature of each shell sufficiently to boil water on the inside, boiler surface;
    f) at least one wiper positioned to contact the outside, condenser surface to remove condensate from the outside, condenser surface.

2. The processor of claim 1 wherein the at least one sealed housing comprises a housing having an upper region and a lower region, the compressor unit being mounted in the upper region, the boiler-condenser assembly being mounted in the lower region, and the compressor unit being above the boiler-condenser assembly.

3. The processor of claim 1, wherein the at least one sealed housing is a single housing, a motor mounting outside the single housing and further comprising a magnetic coupler having a first rotating member outside the at least one housing and operably connected to the motor and a second rotating member mounted inside of the single housing, the second rotating member operably connected to the compressor.

4. The processor of claim 1 further comprising at least two concentric shells, each shell being operatively connected to at least one other shell, so the shells rotate together.

5. The processor of claim 1, further comprising at least one boiler wiper in contact with the inside, boiler surface of at least one shell.

6. The processor of claim 1, further comprising at least one rotating vapor seals that blocks the passage of boiling and condensing vapors.

7. The processor of claim 1, wherein the compressor is configured to raise the pressure of the vapor exiting the compressor to a pressure higher than the pressure of the vapor as the vapor was boiled on the inside, boiler surface; at least one seal separating the higher-pressure vapor from the lower-pressure vapor, the at least one seal comprising a channel mounted for rotation with rotation of the boiler-condenser assembly, the channel having a distal portion extending away from the axis of rotation and a proximal portion opposite the distal portion, the channel containing liquid, a stationary disk extending away from the axis of rotation into the channel and dividing the liquid in the channel into a first portion and a second portions in fluid communication with each other, the first portion being exposed to the lower-pressure vapor and the second portion being exposed to the higher-pressure vapor, wherein rotation of the channel holds the liquid against the distal portion of the channel, the channel having enough length from the proximal to the distal portion to maintain the first and second portions of liquid on both sides of the disk when the shell rotates.

8. The processor of claim 7, wherein the contaminated water inlet has an end positioned near the channel of the at least one seal for directing contaminated water near the proximal portion of the channel.

9. The processor of claim 1, further comprising a first framework assembly between the at least one shell and the axis of rotation, the first framework assembly creating a boiling chamber between the first framework assembly and the boiling surface of the at least one shell, the first framework assembly mounted for blocking the flow of vapor in the boiling chamber above the at least one shell but allowing the flow of vapor in the boiling chamber below the at least one shell, a second framework assembly mounted radially outside the at least one shell and the axis of rotation, the second framework assembly creating a condenser chamber between the second framework assembly and the outside, condenser surface of the at least one shell, the second framework assembly mounted for allowing vapor to flow into the condenser chamber from above the at least one shell but blocking the flow of vapor in the condenser chamber below the at least one shell.

10. The processor of claim 1, wherein the at least one sealed housing is a single housing, a canister surrounding at least a portion of the single housing and forming a space between the single housing and the canister, the canister connected to the source of contaminated water.

11. The processor of claim 1, further comprising a second seal comprising a channel mounted for rotation with rotation of the boiler-condenser assembly, the channel having a distal portion extending away from the axis of rotation and a proximal portion opposite the distal portion, the channel containing liquid, a stationary disk extending away from the axis of rotation into the channel and dividing the liquid in the channel into a first portion and a second portions in fluid communication with each other, the first portion being exposed to the lower-pressure vapor and the second portion being exposed to the higher-pressure vapor, the second seal being positioned so that wastewater from the inside, boiler surface vapor passes over the proximal portion when the first portion and the second portions are full of liquid, wherein rotation of the channel directs the water toward the channel.

12. The processor of claim 1 further comprising a freshwater outlet, the freshwater outlet having one end positioned to receive freshwater removed from the outside, condenser surface, freshwater pressurizing means attached to the other end of the freshwater outlet for raising the pressure of the freshwater in the freshwater outlet to at least ambient pressure.

13. The processor of claim 12 wherein the freshwater pressurizing means comprises a freshwater pitot pump, the freshwater pitot pump comprising a rotating chamber receiving freshwater from the freshwater outlet, a pitot tube inside the rotating chamber having two ends, the first end facing freshwater moving in the rotating chamber as the rotating chamber rotates to raise the pressure of the freshwater in the pitot tube, the second end of the pitot tube extending outside the processor so the freshwater can flow at at least ambient pressure.

14. The processor of claim 1 further comprising a wastewater outlet, the wastewater outlet having one end positioned to receive wastewater removed from the outside, condenser surface, wastewater pressurizing means attached to the other end of the wastewater outlet for raising the pressure of the wastewater in the wastewater outlet to at least ambient pressure.

15. The processor of claim 14 wherein the wastewater pressurizing means comprises a wastewater pitot pump, the wastewater pitot pump comprising a rotating chamber receiving wastewater from the wastewater outlet, a pitot tube inside the rotating chamber having two ends, the first end facing wastewater moving in the rotating chamber as the rotating chamber rotates to raise the pressure of the wastewater in the pitot tube, the second end of the pitot tube extending outside the processor so the wastewater can flow at at least ambient pressure.

16. The processor of claim 12 further comprising a freshwater pitot pump connected to the freshwater outlet, the freshwater pitot pump comprising a chamber revolving about an axis of rotation, the pitot pump receiving freshwater from the freshwater outlet, a pitot tube inside the rotating chamber having two ends, the first end facing freshwater moving in the rotating chamber as the rotating chamber rotates to raise the pressure of the freshwater in the pitot tube, the second end of the pitot tube extending outside the processor so the freshwater can flow at at least ambient pressure, the processor further comprising a wastewater outlet, a wastewater pitot pump connected to the wastewater outlet, the wastewater pitot pump comprising a chamber rotating about an axis of rotation, the chamber of the wastewater pitot pump receiving wastewater from the wastewater outlet, a pitot tube inside the rotating chamber having two ends, the first end facing wastewater moving in the rotating chamber as the rotating chamber rotates to raise the pressure of the wastewater in the pitot tube, the second end of the pitot tube extending outside the processor so the wastewater can flow at at least ambient pressure, the axis of rotation of the freshwater chamber being parallel with the axis of rotation of the wastewater chamber.

17. The processor of claim 1 wherein the compressor unit comprises a compressor housing and a compressor mounted in the compressor housing, the compressor housing having a base, a cylindrical outer wall and a top, the cylindrical outer wall having openings to allow vapor pressurized by the compressor to flow out of the cylindrical outer wall.

18. The processor of claim 17 wherein the sealed housing comprises a lower housing plate, an upper housing plate and an outer wall extending between the lower housing plate and the upper housing plate, the processor further comprising a compressor housing support between the base of the compressor housing and the lower housing plate, the compressor housing support having at least on opening in the path of vapor from the inside boiler surface to the compressor.

19. The processor of claim 1, further comprising a motor, a transmission for transferring motion from the motor to the compressor and from the blower to the at least one shell.

20. The processor of claim 19, wherein the transmission comprises gears of varying diameters operably connected to each other, the gears being sized to rotate the compressor at a rotational velocity greater than the rotational velocity of the boiler-condenser assembly.

21. The processor of claim 1 further comprising a center post and wherein the boiler-condenser assembly comprises:

a cylindrical sidewall, a dome and a disk-shaped bearing support, the bearing support having an inside near the center post and an outside spaced from the inside, the cylindrical sidewall extending upright from the outside of the disk-shaped bearing support;

a hub, at least one arm attaching and spacing the hub proximally from the bearing support, the hub being mounted for rotation about the center post;

a diverter fixed to the center post and mounted below the at least one shell in a position in the path of wastewater from the inside, boiler surface of the shells;

the diverter having at least one opening through the diverter, each opening through the diverter positioned above the space between the hub and the inside of the bearing support.

22. The processor of claim 1 wherein the boiler-condenser assembly further comprises:

a cylindrical sidewall, a dome and a disk-shaped bearing support, the disk-shaped bearing support having an inside near a center post and an outside spaced from the inside, the cylindrical sidewall extending upright from the outside of the disk-shaped bearing support;

a framework assembly mounted radially outside relative to the axis of rotation of a shell, the framework assembly creating a condenser chamber between the framework assembly and the outside, condenser surface of the shell;

the framework assembly having an angled brace being farther from the bottom of the shell and closer to the top of the shell;

an opening in the cylindrical sidewall positioned to receive water from the framework assembly; and a channel positioned to receive water from the opening in the cylindrical sidewall.

23. The processor of claim 1, further comprising a source of heat acting on the at least one sealed housing.

24. The processor of claim 1, wherein the compressor raises the pressure of the vapor exiting the compressor to a pressure higher than the pressure of the vapor as the vapor was boiled on the inside, boiler surface;

a) at least one seal separating the higher-pressure vapor from the lower-pressure vapor, the at least one seal comprising a channel mounted for rotation with rotation of the boiler-condenser assembly, the channel having a distal portion extending away from the axis of rotation and a proximal portion opposite the distal portion, the channel containing liquid, a stationary disk extending away from the axis of rotation into the channel and dividing the liquid in the channel into a first portion and a second portions in fluid communication with each other, the first portion being exposed to the lower-pressure vapor and the second portion being exposed to the higher-pressure vapor, wherein rotation of the channel holds the liquid against the distal portion of the channel, the channel having enough length from the proximal to the distal portion to maintain the first and second portions of liquid on both sides of the disk when the shell rotates b) a tube extending from the source of contaminated water into at least one seal for providing liquid to the channel.

25. A processor for removing contaminates from contaminated water comprising:

a) a hermetically sealed housing capable of holding a near-vacuum pressure up to above atmospheric pressure at which contaminated water boils at the near-vacuum pressure up to above atmospheric pressure;

b) a boiler-condenser unit mounted in the hermetically sealed housing, the boiler-condenser unit having at least one shell of heat-conductive material mounted for rotation about a longitudinal axis of rotation, each of the at least one shell being generally parallel to the longitudinal axis of rotation, each of the at least one shell having an inside, boiler surface facing toward the longitudinal axis of rotation and an outside, condenser surface facing away from longitudinal axis of rotation;

c) a source of contaminated water flowing inside the boiler-condenser unit to the inside, boiler surface of each shell, the inside, boiler surface of each shell boiling contaminated water from the inside, boiler surface at the vacuum pressure in the hermetically sealed housing to convert at least some contaminated water into vapor;

d) a compressor having a lower-pressure side and a higher-pressure side, the compressor being mounted to receive vapor boiled on the inside, boiler surface of each shell to raise the vapor's pressure from the lower-pressure side to a higher-pressure side, the compressor being mounted to direct the higher-pressure vapor to the outside, condenser surface of each shell so vapor striking the outside, condenser surface condenses on the outside, condenser surface of each shell;

e) a framework assembly mounted radially outside relative to the axis of rotation of a shell, the framework assembly creating a condenser chamber between the framework assembly and the outside, condenser surface of the shell;

f) a motor operably connected to each shell for rotating each shell; and g) at least one wiper positioned in contact with at least one condenser surface, the at least one wiper removing condensate from the outside, condenser surface as the outside, condenser surface rotates past the at least one wiper.

h) at least one wiper positioned in contact with at least one boiler surface, the at least one wiper filming the boiling fluid and removing wastewater from the inside, boiler surface as the inside, boiler surface rotates past the at least one wiper.

26. A process for removing contaminates from contaminated water comprising:

a) evacuating a housing to a near-vacuum pressure at which water boils at ambient temperature;

b) rotating a boiler-condenser shell mounted in the housing about a longitudinal axis of rotation, the boiler-condenser shell having an inside, boiler surface and an outside, condenser surface, the inside boiler surface being closer than the outside, condenser surface to the longitudinal axis of rotation;

c) directing the vapor generated from boiling inside the boiler- condenser shell to a compressor;

d) raising the pressure of the vapor within the compressor;

e) directing the elevated-pressure vapor from the compressor to the outside of the boiler-condenser shell whereby the vapor condenses on the outside of the boiler-condenser shell, the condensation transferring heat energy to the boiler-condenser shell;

f) wiping at least some of the condensate from the outside of the boiler-condenser shell;

g) collecting the condensate from the boiler-condenser shell; and h) collecting any contaminated water that did not boil from the inside boiler surface.

27. The process of claim 26, further comprising injecting steam at atmospheric pressure into the housing before evacuating the housing.

28. A processor for obtaining potable water from contaminated water comprising:
  a) a vacuum housing capable of holding a near vacuum;
  b) a boiler-condenser assembly in the vacuum housing subjected to the near vacuum in the vacuum housing, the boiler-condenser assembly comprising at least two concentrically mounted shells of heat-conductive material rotating together about a longitudinal axis of rotation, each shell of the at least two concentrically mounted shells having an inside, boiler surface and an outside, condenser surface;
  c) a compressor mounted in the vacuum housing, the compressor having a lower-pressure side and a higher-pressure side, the compressor being mounted to receive vapor boiled on the inside, boiler surface of each shell, the compressor being mounted to direct the higher-pressure vapor to the outside, condenser surface of each shell so vapor striking the outside, condenser surface condenses on the outside, condenser surface of each shell;
  d) an inlet extending from a source of contaminated water to at least one outlet close enough to the inside, boiler surface of each shell so contaminated water exiting the inlet can reach the inside, boiler surface, the inside, boiler surface of each shell being capable of boiling contaminated water from the inside, boiler surface at the vacuum pressure in the housing to covert contaminated water into vapor;
  e) the compressor increasing the vapor's temperature passing through the compressor sufficiently to supply enough energy through each shell to boil water on the inside, boiler surface of the shells; and
  f) a motor operably connected to each shell and the compressor for rotating the compressor and shell.

29. The processor of claim 28, further comprising at least one condenser wiper in contact with and removing at least some condensed water from the outside condenser surface of each shell.

30. The processor of claim 28, further comprising at least one boiler wiper in contact with and spreading at least water on the inside, boiler surface of each shell.

* * * * *